(12) United States Patent
Cho et al.

(10) Patent No.: US 9,178,981 B2
(45) Date of Patent: Nov. 3, 2015

(54) MOBILE TERMINAL AND METHOD OF SHARING INFORMATION THEREIN

(75) Inventors: Hyunah Cho, Goyang-si (KR); Hyehyun Kim, Seoul (KR); Ki Seo Kim, Seoul (KR); Dongwoo Kim, Goyang-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 13/169,777

(22) Filed: Jun. 27, 2011

(65) Prior Publication Data

US 2012/0166997 A1 Jun. 28, 2012

Related U.S. Application Data

(60) Provisional application No. 61/425,756, filed on Dec. 22, 2010.

(30) Foreign Application Priority Data

Feb. 28, 2011 (KR) .................... 10-2011-0018236

(51) Int. Cl.
| | |
|---|---|
| G06F 3/0482 | (2013.01) |
| G06F 3/0481 | (2013.01) |
| G06F 3/0483 | (2013.01) |
| H04M 1/725 | (2006.01) |
| G06F 21/62 | (2013.01) |
| G06F 21/71 | (2013.01) |

(52) U.S. Cl.
CPC ....... *H04M 1/72563* (2013.01); *G06F 21/6218* (2013.01); *G06F 21/71* (2013.01); *G06F 2221/2105* (2013.01)

(58) Field of Classification Search
CPC ... G06F 3/0486; G06F 3/0481; G06F 3/0482; G06F 3/0483; G06F 9/543; G06F 9/4443; G06F 3/04817; G09G 5/14; G09G 1/16; G09G 1/165
USPC .......................................... 715/810, 764, 778
See application file for complete search history.

(56) References Cited

U.S. PATENT DOCUMENTS

| | | | | |
|---|---|---|---|---|
| 5,287,444 | A | * | 2/1994 | Enescu et al. .................. 715/234 |
| 5,483,647 | A | * | 1/1996 | Yu et al. ......................... 713/100 |
| 6,735,765 | B1 | * | 5/2004 | Schumacher .................. 717/164 |
| 7,424,601 | B2 | * | 9/2008 | Xu ..................................... 713/1 |

(Continued)

FOREIGN PATENT DOCUMENTS

| | | |
|---|---|---|
| EP | 1677190 A2 | 7/2006 |
| WO | WO 2010/024986 A2 | 3/2010 |

*Primary Examiner* — Amy Ng
*Assistant Examiner* — Erik Stitt
(74) *Attorney, Agent, or Firm* — Birch, Stewart, Kolasch & Birch, LLP

(57) ABSTRACT

A mobile terminal including a communication unit configured to communicate with at least one other terminal; a memory configured to store at least first and second operating systems including at least first and second modes, respectively; and a controller configured to execute the first and second operating systems, to simultaneously display first and second information screens on a display unit of the mobile terminal corresponding to the first and second modes, to receive a sharing signal requesting information from one of the first and second information screens be shared with the other of the first and second information screens, and to selectively share the requested information between the first and second information screens based on a predetermined criterion.

20 Claims, 68 Drawing Sheets

(56) References Cited

U.S. PATENT DOCUMENTS

| | | | |
|---|---|---|---|
| 7,479,949 B2* | 1/2009 | Jobs et al. | 345/173 |
| 7,757,185 B2* | 7/2010 | Paquette et al. | 715/827 |
| 8,291,344 B2* | 10/2012 | Chaudhri | 715/838 |
| 8,719,836 B2* | 5/2014 | Groschel et al. | 718/108 |
| 2004/0205755 A1* | 10/2004 | Lescouet et al. | 718/100 |
| 2005/0015355 A1* | 1/2005 | Heller et al. | 707/1 |
| 2005/0210476 A1* | 9/2005 | Wu et al. | 719/310 |
| 2007/0079249 A1* | 4/2007 | Pall et al. | 715/758 |
| 2007/0128899 A1* | 6/2007 | Mayer | 439/152 |
| 2008/0165151 A1* | 7/2008 | Lemay et al. | 345/173 |
| 2008/0270910 A1* | 10/2008 | Lukasik et al. | 715/740 |
| 2008/0318616 A1 | 12/2008 | Chipalkatti et al. | |
| 2009/0265662 A1* | 10/2009 | Bamford | 715/800 |
| 2009/0328033 A1* | 12/2009 | Kohavi et al. | 718/1 |
| 2010/0070980 A1 | 3/2010 | Tanaka et al. | |

* cited by examiner (a)

| A | B | C | D |
|---|---|---|---|
| E | .. | .. | .. |
| .. | .. | .. | .. |
| .. | .. | .. | Z |

P mode (a)

| Q | W | E | .. | .. | P |
|---|---|---|---|---|---|
| A | S | .. | .. | .. | L |
| Z | X | .. | .. | .. | M |
| 1 | 2 | .. | .. | .. | O |

B mode (b)

(a)

(b)

(a)

(b)

(a)

(b)

(a)

(b)

(a)

(b)

(a)

(b)

(a)

(b)

(a)

(b)

(a)

(b)

(a)

(b)

(a)

(b)

(a)

(b)

(a)

(b)

(a)

(b)

(a)

(b)

(a)

(b)

(a)

(b)

(a)

(b)

(a)

(b)

(a)

(b)

MOBILE TERMINAL AND METHOD OF SHARING INFORMATION THEREIN

Pursuant to 35 U.S.C. §119(e), this application claims the benefit of U.S. Provisional Application Ser. No. 61/425,756, filed on Dec. 22, 2010, which is hereby incorporated by reference as if fully set forth herein. Pursuant to 35 U.S.C. §119(a), this application claims the benefit of earlier filing date and right of priority to Korean Application No. 10-2011-0018236, filed on Feb. 28, 2011, the contents of which are hereby incorporated by reference herein in their entirety.

BACKGROUND OF THE INVENTION

1. Field of the Invention

The present invention relates to a mobile terminal, and more particularly, to a mobile terminal and method of sharing information therein. Although the present invention is suitable for a wide scope of applications, it is particularly suitable for implementing a plurality of modes.

2. Discussion of the Related Art

Generally, terminals can be classified into mobile/portable terminals and stationary terminals. The mobile terminals can be classified into handheld terminals and vehicle mount terminals again according to possibility of user's direct portability.

As functions of the terminal are diversified, the terminal is implemented as a multimedia player provided with composite functions such as photographing of photos or moving pictures, playback of music or moving picture files, game play, broadcast reception and the like for example.

Recently, a mobile terminal tends to be used for a business need as well as a personal need. In addition, it is necessary to implement the mobile terminal suitable for both of the personal need and the business need. Moreover, the demand for using the mobile terminal for the purpose of the personal need or the business need separately keeps rising.

However, a mobile terminal according to a related art fails in providing an environment in which the mobile terminal can be separately used for the purpose of the personal need or the business need.

SUMMARY OF THE INVENTION

Accordingly, the present invention is directed to a mobile terminal and method of sharing information therein that substantially obviate one or more problems due to limitations and disadvantages of the related art.

An object of the present invention is to provide a mobile terminal and method of sharing information therein, by which a plurality of modes can be implemented and activated for user's convenience and data security in a manner of being discriminated from each other.

Another object of the present invention is to provide a mobile terminal and method of sharing information therein, by which information corresponding to a first or second mode can be shared with another mode when implementing the first and second modes.

A further object of the present invention is to provide a mobile terminal and method of sharing information therein, by which information can be shared to correspond to a prescribed level when sharing the information between a first mode and a second mode.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a mobile terminal according to an embodiment of the present invention includes at least one operating system capable of implementing a plurality of modes including a first mode and a second mode, at least one application running in at least one of a plurality of the modes, a display unit displaying a first information of the first mode and a second information of the second mode, and a controller detecting a signal for sharing the first information, the controller, if detecting the signal, sharing the first information with the second mode.

In another aspect of the present invention, a method of sharing information in a mobile terminal, which implements a plurality of modes including a first mode and a second mode, includes the steps of activating the first mode and the second mode selectively, displaying a first information of the first mode and a second information of the second mode, detecting a signal for sharing the first information, and if the signal is detected, sharing the first information with the second mode. Moreover, the mobile terminal includes at least one operating system capable of implementing a plurality of the modes and at least one application executable in at least one of a plurality of the modes.

In still another aspect, the present invention provides a mobile terminal including a communication unit configured to communicate with at least one other terminal; a memory configured to store at least first and second operating systems including at least first and second modes, respectively; and a controller configured to execute the first and second operating systems, to simultaneously display first and second information screens on a display unit of the mobile terminal corresponding to the first and second modes, to receive a sharing signal requesting information from one of the first and second information screens be shared with the other of the first and second information screens, and selectively share the requested information between the first and second information screens based on a predetermined criteria. The present invention also provides a corresponding method of controlling a mobile terminal.

Accordingly, the present invention provides the following effects and/or advantages.

First of all, when implementing a first mode and a second mode in a single terminal, the present invention can share information corresponding to either the first mode or the second mode with the second mode or the first mode, thereby raising utilization of information.

Secondly, the present invention enables information to be shared between a first mode and a second mode to correspond to a prescribed level, thereby maintaining information security in accordance with a level of an inter-mode information sharing.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

First of all, mobile terminals described in this disclosure can include a mobile phone, a smart phone, a laptop computer, a digital broadcast terminal, a PDA (personal digital assistants), a PMP (portable multimedia player), a navigation system and the like.

Except a case applicable to a mobile terminal only, it is apparent to those skilled in the art that the configurations according to an embodiment described in this disclosure is applicable to such a stationary terminal as a digital TV, a desktop computer and the like.

Figure 1:
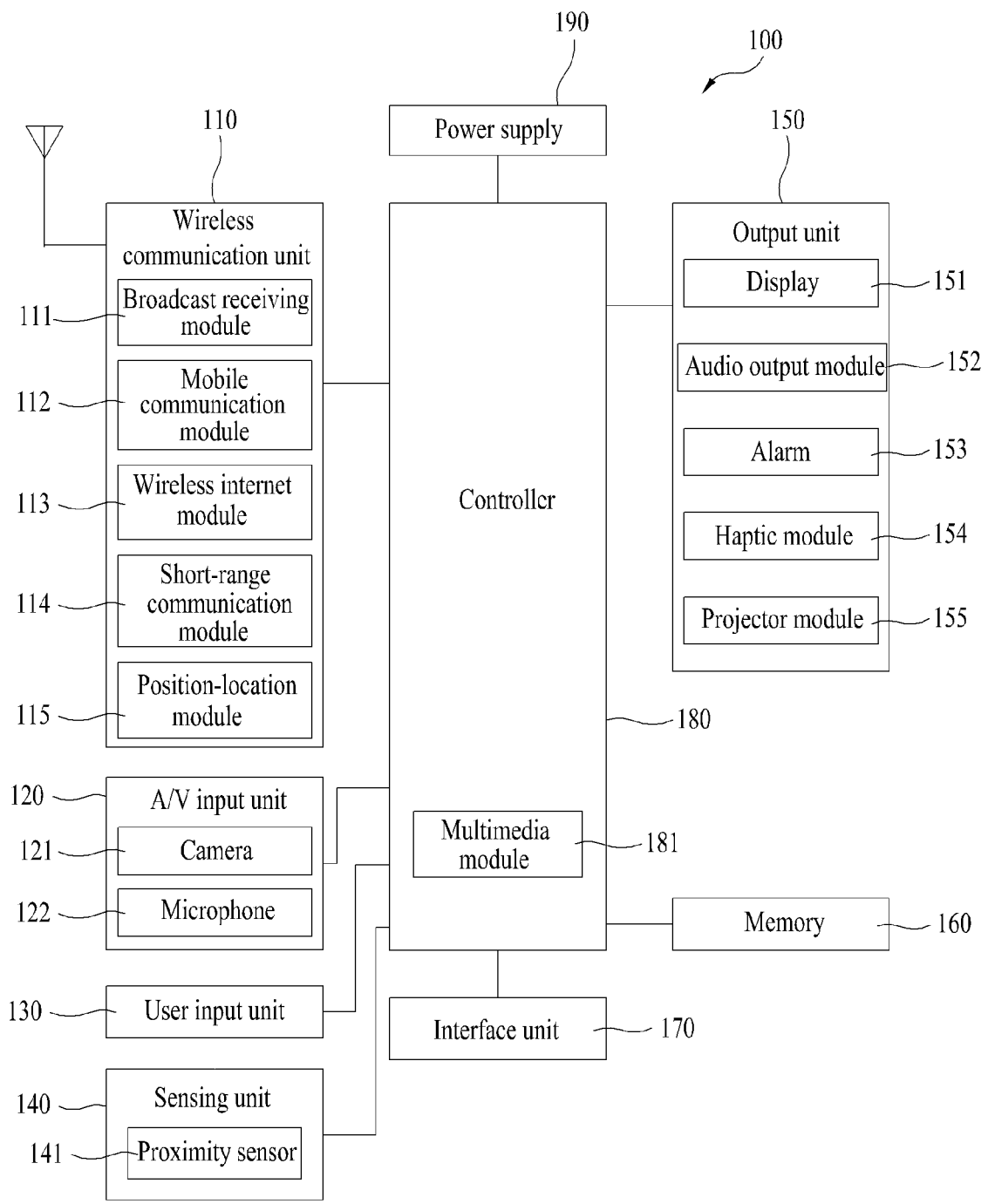
FIG. 1 is a block diagram of a mobile terminal according to one embodiment of the present invention.

FIG. 1 is a block diagram of a mobile terminal according to one embodiment of the present invention.

Referring to FIG. 1, a mobile terminal 100 according to one embodiment of the present invention includes a wireless communication unit 110, an A/V (audio/video) input unit 120, a user input unit 130, a sensing unit 140, an output unit 150, a memory 160, an interface unit 170, a controller 180, a power supply unit 190 and the like. FIG. 1 shows the mobile terminal 100 having various components, but it is understood that implementing all of the illustrated components is not a requirement. Greater or fewer components may alternatively be implemented.

In the following description, the above elements of the mobile terminal 100 are explained in sequence.

First of all, the wireless communication unit 110 typically includes one or more components which permits wireless communication between the mobile terminal 100 and a wireless communication system or network within which the mobile terminal 100 is located. For instance, the wireless communication unit 110 can include a broadcast receiving module 111, a mobile communication module 112, a wireless interne module 113, a short-range communication module 114, a position-location module 115 and the like.

The broadcast receiving module 111 receives a broadcast signal and/or broadcast associated information from an external broadcast managing server via a broadcast channel.

The broadcast channel may include a satellite channel and a terrestrial channel.

The broadcast managing server generally refers to a server which generates and transmits a broadcast signal and/or broadcast associated information or a server which is provided with a previously generated broadcast signal and/or broadcast associated information and then transmits the provided signal or information to a terminal. The broadcast signal may be implemented as a TV broadcast signal, a radio broadcast signal, and a data broadcast signal, among others. If desired, the broadcast signal may further include a broadcast signal combined with a TV or radio broadcast signal.

The broadcast associated information includes information associated with a broadcast channel, a broadcast program, a broadcast service provider, etc. In addition, the broadcast associated information can be provided via a mobile communication network. In this instance, the broadcast associated information can be received by the mobile communication module 112.

The broadcast associated information can be implemented in various forms. For instance, broadcast associated information may include an electronic program guide (EPG) of digital multimedia broadcasting (DMB) and electronic service guide (ESG) of digital video broadcast-handheld (DVB-H).

The broadcast receiving module 111 may be configured to receive broadcast signals transmitted from various types of broadcast systems. By non-limiting example, such broadcasting systems include digital multimedia broadcasting-terrestrial (DMB-T), digital multimedia broadcasting-satellite (DMB-S), digital video broadcast-handheld (DVB-H), the data broadcasting system known as media forward link only (MediaFLO®) and integrated services digital broadcast-terrestrial (ISDB-T). Optionally, the broadcast receiving module 111 can be configured suitable for other broadcasting systems as well as the above-explained digital broadcasting systems.

The broadcast signal and/or broadcast associated information received by the broadcast receiving module 111 may be stored in a suitable device, such as a memory 160.

The mobile communication module 112 transmits/receives wireless signals to/from one or more network entities (e.g., base station, external terminal, server, etc.). Such wireless signals may represent audio, video, and data according to text/multimedia message transceivings, among others.

The wireless internet module 113 supports Internet access for the mobile terminal 100. This module may be internally or externally coupled to the mobile terminal 100. In this instance, the wireless Internet technology can include WLAN (Wireless LAN) (Wi-Fi), Wibro (Wireless broadband), Wimax (World Interoperability for Microwave Access), HSDPA (High Speed Downlink Packet Access), etc.

The short-range communication module 114 facilitates relatively short-range communications. Suitable technologies for implementing this module include radio frequency identification (RFID), infrared data association (IrDA), ultra-wideband (UWB), as well at the networking technologies commonly referred to as Bluetooth and ZigBee, to name a few.

The position-location module 115 identifies or otherwise obtains the location of the mobile terminal 100. If desired, this module may be implemented with a global positioning system (GPS) module.

Referring to FIG. 1, the audio/video (A/V) input unit 120 is configured to provide audio or video signal input to the mobile terminal 100. As shown, the A/V input unit 120 includes a camera 121 and a microphone 122. The camera 121 receives and processes image frames of still pictures or video, which are obtained by an image sensor in a video call mode or a photographing mode. In addition, the processed image frames can be displayed on the display unit 151.

The image frames processed by the camera 121 can be stored in the memory 160 or can be externally transmitted via the wireless communication unit 110. Optionally, at least two cameras 121 can be provided to the mobile terminal 100 according to environment of usage.

The microphone 122 receives an external audio signal while the portable device is in a particular mode, such as phone call mode, recording mode and voice recognition. This audio signal is processed and converted into electric audio data. The processed audio data is transformed into a format transmittable to a mobile communication base station via the mobile communication module 112 when in a call mode. The microphone 122 typically includes assorted noise removing algorithms to remove noise generated in the course of receiving the external audio signal.

The user input unit 130 generates input data responsive to user manipulation of an associated input device or devices. Examples of such devices include a keypad, a dome switch, a touchpad (e.g., static pressure/capacitance), a jog wheel, a jog switch, etc.

The sensing unit 140 provides sensing signals for controlling operations of the mobile terminal 100 using status measurements of various aspects of the mobile terminal. For instance, the sensing unit 140 may detect an open/close status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, orientation or acceleration/deceleration of the mobile terminal 100. As an example, consider the mobile terminal 100 being configured as a slide-type mobile terminal. In this configuration, the sensing unit 140 may sense whether a sliding portion of the mobile terminal is open or closed. Other examples include the sensing unit 140 sensing the presence or absence of power provided by the power supply 190, the presence or absence of a coupling or other connection between the interface unit 170 and an external device. In addition, the sensing unit 140 can include a proximity sensor 141.

The output unit 150 generates outputs relevant to the senses of sight, hearing, touch and the like. In addition, the output unit 150 includes the display unit 151, an audio output module 152, an alarm unit 153, a haptic module 154, a projector module 155 and the like.

The display unit 151 is typically implemented to visually display (output) information associated with the mobile terminal 100. For instance, if the mobile terminal is operating in a phone call mode, the display will generally provide a user interface (UI) or graphical user interface (GUI) which includes information associated with placing, conducting, and terminating a phone call. As another example, if the mobile terminal 100 is in a video call mode or a photographing mode, the display unit 151 may additionally or alternatively display images which are associated with these modes, the UI or the GUI.

The display module 151 may be implemented using known display technologies including, for example, a liquid crystal display (LCD), a thin film transistor-liquid crystal display (TFT-LCD), an organic light-emitting diode display (OLED), a flexible display and a three-dimensional display. The mobile terminal 100 may include one or more of such displays.

Some of the above displays can be implemented in a transparent or optical transmittive type, which can be named a transparent display. As a representative example for the transparent display, there is TOLED (transparent OLED) or the like. A rear configuration of the display unit 151 can be implemented in the optical transmittive type as well. In this configuration, a user can see an object in rear of a terminal body via the area occupied by the display unit 151 of the terminal body.

At least two display units 151 can be provided to the mobile terminal 100 in accordance with the implemented configuration of the mobile terminal 100. For instance, a plurality of display units can be arranged on a single face of the mobile terminal 100 in a manner of being spaced apart from each other or being built in one body. Alternatively, a plurality of display units can be arranged on different faces of the mobile terminal 100.

When the display unit 151 and a sensor for detecting a touch action (hereinafter called 'touch sensor') configures a mutual layer structure (hereinafter called 'touchscreen'), it can use the display unit 151 as an input device as well as an output device. In this instance, the touch sensor can be configured as a touch film, a touch sheet, a touchpad or the like.

The touch sensor can be configured to convert a pressure applied to a specific portion of the display unit 151 or a variation of a capacitance generated from a specific portion of the display unit 151 to an electric input signal. Moreover, it can configure the touch sensor to detect a pressure of a touch as well as a touched position or size.

If a touch input is made to the touch sensor, signal(s) corresponding to the touch is transferred to a touch controller. The touch controller processes the signal(s) and then transfers the processed signal(s) to the controller 180. Therefore, the controller 180 can know whether a prescribed portion of the display unit 151 is touched.

Referring to FIG. 1, a proximity sensor 141 can be provided to an internal area of the mobile terminal 100 enclosed by the touchscreen or around the touchscreen. The proximity sensor is the sensor that detects a presence or non-presence of an object approaching a prescribed detecting surface or an object existing around the proximity sensor using an electromagnetic field strength or infrared ray without mechanical contact. Hence, the proximity sensor has durability longer than that of a contact type sensor and also has utility wider than that of the contact type sensor.

The proximity sensor 141 can include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor and the like. When the touchscreen includes the electrostatic capacity proximity sensor, it is configured to detect the proximity of a pointer using a variation of electric field according to the proximity of the pointer. In this instance, the touchscreen (touch sensor) can be classified as the proximity sensor.

In the following description, for clarity, an action that a pointer approaches without contacting with the touchscreen to be recognized as located on the touchscreen is named 'proximity touch'. In addition, an action that a pointer actually touches the touchscreen is named 'contact touch'. The meaning of the position on the touchscreen proximity-touched by the pointer means the position of the pointer which vertically opposes the touchscreen when the pointer performs the proximity touch.

The proximity sensor 141 detects a proximity touch and a proximity touch pattern (e.g., a proximity touch distance, a proximity touch duration, a proximity touch position, a proximity touch shift state, etc.). In addition, information corresponding to the detected proximity touch action and the detected proximity touch pattern can be output to the touchscreen.

The audio output module 152 functions in various modes including a call-receiving mode, a call-placing mode, a recording mode, a voice recognition mode, a broadcast reception mode and the like to output audio data which is received from the wireless communication unit 110 or is stored in the memory 160. During operation, the audio output module 152 outputs audio relating to a particular function (e.g., call received, message received, etc.). The audio output module 152 is often implemented using one or more speakers, buzzers, other audio producing devices, and combinations thereof.

The alarm unit 153 is output a signal for announcing the occurrence of a particular event associated with the mobile terminal 100. Typical events include a call received event, a message received event and a touch input received event. The alarm unit 153 can output a signal for announcing the event occurrence by way of vibration as well as video or audio signal. The video or audio signal can be output via the display unit 151 or the audio output unit 152. Hence, the display unit 151 or the audio output module 152 can be regarded as a part of the alarm unit 153.

The haptic module 154 generates various tactile effects that can be sensed by a user. Vibration is a representative one of the tactile effects generated by the haptic module 154. Strength and pattern of the vibration generated by the haptic module 154 are controllable. For instance, different vibrations can be output in a manner of being synthesized together or can be output in sequence.

The haptic module 154 can generate various tactile effects as well as the vibration. For instance, the haptic module 154 generates the effect attributed to the arrangement of pins vertically moving against a contact skin surface, the effect attributed to the injection/suction power of air though an injection/suction hole, the effect attributed to the skim over a skin surface, the effect attributed to the contact with electrode, the effect attributed to the electrostatic force, the effect attributed to the representation of hold/cold sense using an endothermic or exothermic device and the like.

The haptic module 154 can be implemented to enable a user to sense the tactile effect through a muscle sense of finger, arm or the like as well as to transfer the tactile effect through a direct contact. Optionally, at least two haptic modules 154 can be provided to the mobile terminal 100 in accordance with the corresponding configuration type of the mobile terminal 100.

The projector module 155 is the element for performing an image projector function using the mobile terminal 100. In addition, the projector module 155 can display an image, which is identical to or partially different at least from the image displayed on the display unit 151, on an external screen or wall according to a control signal of the controller 180.

In particular, the projector module 155 can include a light source generating light (e.g., laser) for projecting an image externally, an image producing means for producing an image to output externally using the light generated from the light source, and a lens for enlarging to output the image externally in a predetermined focus distance. In addition, the projector module 155 can further include a device for adjusting an image projected direction by mechanically moving the lens or the whole module.

The projector module 155 can be classified into a CRT (cathode ray tube) module, an LCD (liquid crystal display) module, a DLP (digital light processing) module or the like according to a device type of a display means. In particular, the DLP module is operated by the mechanism of enabling the light generated from the light source to reflect on a DMD (digital micro-mirror device) chip and can be advantageous for the downsizing of the projector module 151.

Preferably, the projector module 155 can be provided in a length direction of a lateral, front or backside direction of the mobile terminal 100. In addition, it is understood that the projector module 155 can be provided to any portion of the mobile terminal 100 according to the necessity thereof.

The memory unit 160 is generally used to store various types of data to support the processing, control, and storage requirements of the mobile terminal 100. Examples of such data include program instructions for applications operating on the mobile terminal 100, contact data, phonebook data, messages, audio, still pictures, moving pictures, etc. In addition, a recent use history or a cumulative use frequency of each data (e.g., use frequency for each phonebook, each message or each multimedia) can be stored in the memory unit 160. Moreover, data for various patterns of vibration and/or sound output when a touch input to the touchscreen can be stored in the memory unit 160.

The memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory, XD memory, etc.), or other similar memory or data storage device. In addition, the mobile terminal 100 can operate in association with a web storage for performing a storage function of the memory 160 on Internet.

The interface unit 170 is often implemented to couple the mobile terminal 100 with external devices. The interface unit 170 receives data from the external devices or is supplied with the power and then transfers the data or power to the respective elements of the mobile terminal 100 or enables data within the mobile terminal 100 to be transferred to the external devices. The interface unit 170 may be configured using a wired/wireless headset port, an external charger port, a wired/wireless data port, a memory card port, a port for coupling to a device having an identity module, audio input/output ports, video input/output ports, an earphone port and/or the like.

The identity module is the chip for storing various kinds of information for authenticating a use authority of the mobile terminal 100 and can include User Identify Module (UIM), Subscriber Identify Module (SIM), Universal Subscriber Identity Module (USIM) and/or the like. A device having the identity module (hereinafter called 'identity device') can be manufactured as a smart card. Therefore, the identity device is connectible to the mobile terminal 100 via the corresponding port.

When the mobile terminal 110 is connected to an external cradle, the interface unit 170 becomes a passage for supplying the mobile terminal 100 with a power from the cradle or a passage for delivering various command signals input from the cradle by a user to the mobile terminal 100. Each of the various command signals input from the cradle or the power can operate as a signal enabling the mobile terminal 100 to recognize that it is correctly loaded in the cradle.

The controller 180 typically controls the overall operations of the mobile terminal 100. For example, the controller 180 performs the control and processing associated with voice calls, data communications, video calls, etc. The controller 180 may include a multimedia module 181 that provides multimedia playback. The multimedia module 181 may be configured as part of the controller 180, or implemented as a separate component.

Moreover, the controller 180 can perform a pattern recognizing process for recognizing a writing input and a picture drawing input carried out on the touchscreen as characters or images, respectively.

The power supply unit 190 provides power used by the various components for the mobile terminal 100. The power may be internal power, external power, or combinations thereof.

Various embodiments described herein may be implemented in a computer-readable medium using, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory such as the memory 160, and executed by a controller or processor, such as the controller 180.

Figure 2A:
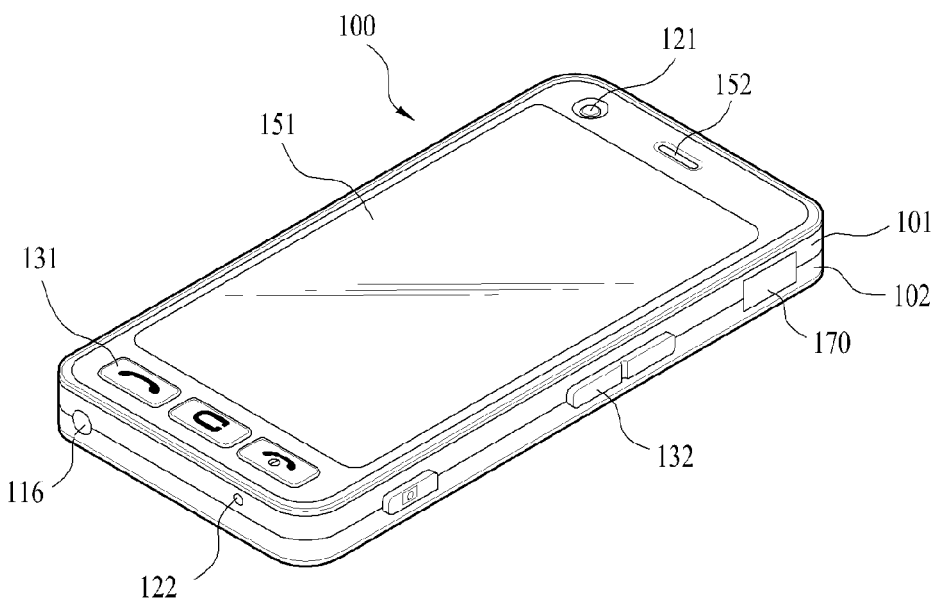
FIG. 2A is a front perspective diagram of a mobile terminal according to one embodiment of the present invention.

FIG. 2A is a front perspective diagram of a mobile terminal according to one embodiment of the present invention.

The mobile terminal 100 shown in the drawing has a bar type terminal body. Yet, the mobile terminal 100 may be implemented in a variety of different configurations. Examples of such configurations include folder-type, slide-type, rotational-type, swing-type and combinations thereof. For clarity, further disclosure will primarily relate to a bar-type mobile terminal 100. However such teachings apply equally to other types of mobile terminals.

Referring to FIG. 2A, the mobile terminal 100 includes a case (casing, housing, cover, etc.) configuring an exterior thereof. In the present embodiment, the case can be divided into a front case 101 and a rear case 102. Various electric/electronic parts are loaded in a space provided between the front and rear cases 101 and 102. Optionally, at least one middle case can be further provided between the front and rear cases 101 and 102 in addition.

The cases 101 and 102 are formed by injection molding of synthetic resin or can be formed of metal substance such as stainless steel (STS), titanium (Ti) or the like for example.

The display unit 151, the audio output unit 152, the camera 121, user input units 130/131 and 132, the microphone 122, the interface 190 and the like can be provided to the terminal body, and more particularly, to the front case 101.

The display unit 151 occupies most of a main face of the front case 101. The audio output unit 151 and the camera 121 are provided to an area adjacent to one of both end portions of the display unit 151, while the user input unit 131 and the microphone 122 are provided to another area adjacent to the other end portion of the display unit 151. The user input unit 132 and the interface 170 can be provided to lateral sides of the front and rear cases 101 and 102.

The input unit 130 is manipulated to receive a command for controlling an operation of the terminal 100. In addition, the input unit 130 can include a plurality of manipulating units 131 and 132. The manipulating units 131 and 132 can be named a manipulating portion and may adopt any mechanism of a tactile manner that enables a user to perform a manipulation action by experiencing a tactile feeling.

Content input by the first or second manipulating unit 131 or 132 can be diversely set. For instance, such a command as start, end, scroll and the like is input to the first manipulating unit 131. In addition, a command for a volume adjustment of sound output from the audio output unit 152, a command for a switching to a touch recognizing mode of the display unit 151 or the like can be input to the second manipulating unit 132.

Figure 2B:
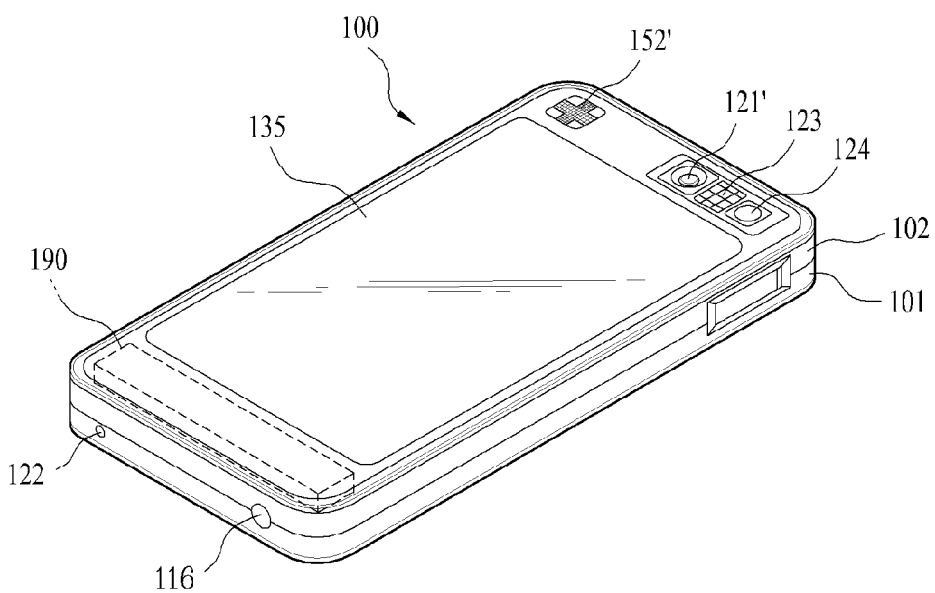
FIG. 2B is a rear perspective diagram of a mobile terminal according to one embodiment of the present invention.

FIG. 2B is a perspective diagram of a backside of the terminal shown in FIG. 2A.

Referring to FIG. 2B, a camera 121' can be additionally provided to a backside of the terminal body, and more particularly, to the rear case 102. The camera 121 has a photographing direction that is substantially opposite to that of the former camera 121 shown in FIG. 21A and may have pixels differing from those of the firmer camera 121.

Preferably, for instance, the former camera 121 has low pixels enough to capture and transmit a picture of user's face for a video call, while the latter camera 121' has high pixels for capturing a general subject for photography without transmitting the captured subject. In addition, each of the cameras 121 and 121' can be installed at the terminal body to be rotated or popped up.

A flash 123 and a mirror 124 are additionally provided adjacent to the camera 121'. The flash 123 projects light toward a subject when photographing the subject using the camera 121'. When a user attempts to take a picture of the user (self-photography) using the camera 121', the mirror 124 enables the user to view user's face reflected by the mirror 124.

An additional audio output unit 152' can be provided to the backside of the terminal body. The additional audio output unit 152' can implement a stereo function together with the former audio output unit 152 shown in FIG. 2A and may be used for implementation of a speakerphone mode in talking over the terminal.

A broadcast signal receiving antenna 124 can be additionally provided to the lateral side of the terminal body as well as an antenna for communication or the like. The antenna 124 constructing a portion of the broadcast receiving module 111 shown in FIG. 1 can be retractably provided to the terminal body.

The power supply unit 190 for supplying a power to the terminal 100 is provided to the terminal body. In addition, the power supply unit 190 can be configured to be built within the terminal body. Alternatively, the power supply unit 190 can be configured to be detachably connected to the terminal body.

A touchpad 135 for detecting a touch can be additionally provided to the rear case 102. The touchpad 135 can be configured in a light transmittive type like the display unit 151. In this instance, if the display unit 151 is configured to output visual information from its both faces, it can recognize the visual information via the touchpad 135 as well. The information output from both of the faces can be entirely controlled by the touchpad 135. Alternatively, a display is further provided to the touchpad 135 so that a touchscreen can be provided to the rear case 102 as well.

The touchpad 135 is activated by interconnecting with the display unit 151 of the front case 101. The touchpad 135 can be provided in rear of the display unit 151 in parallel. The touchpad 135 can have a size equal to or smaller than that of the display unit 151.

First of all, a mobile terminal mentioned in the following description can include at least one of the components shown in FIG. 1. In addition, in order to perform an operation using the components (e.g., touchscreen, wireless communication unit, memory, etc.), the controller 180 can control an individual operation of each of the components or interconnected operations among a plurality of the components.

Applications mentioned in this disclosure are software programs drivable in a mobile terminal. If the application is driven, it can execute a corresponding function or operation. The application is basically stored in the mobile terminal (particularly, memory 160) or can be downloaded from an external server of an external terminal.

For example, the applications can include a compass, an augmented reality, a camera, a video player, a music player, a game, a news, a web browser, a message, a phonebook, a memo, a schedule management, and the like. Of course, the allocations are non-limited by this example and can be implemented in more various ways. Contents or data associated with the applications can exist as well. In this instance, the associated content or data is stored in the memory 160 or can be stored in an external server having a storage space.

For instance, the contents can include an audio file (associated with the music player), a video file (associated with the video player), a document file (associated with an e-book), and the like. In addition, the data can include a message content (associated with the message), a memo content (associated with the memo), a counterpart information (associated with the phonebook), a schedule content (associated with the schedule management), and the like.

According to an embodiment of the present invention, a mobile terminal can configure a plurality of modes differing from each other in application configuration for data security for one mode against another mode or data security between different modes. In addition, the mobile terminal according to an embodiment of the present invention can implement a plurality of the modes selectively or simultaneously (or sequentially).

When a specific application is executed in a prescribed mode, at least one application interoperable with the specific application can be executed in the prescribed mode. For instance, if a specific application is a voice call, an application interoperable with the voice call can include a phonebook, a message and the like.

Regarding mode discrimination in application configuration, an application executable in each of a plurality of modes can include at least one application (hereinafter named a dedicated application) executable by being dedicated to each of a plurality of the modes or at least one application (hereinafter named a common application) executable in any one of a plurality of the modes. In particular, the common application can change at least one feature in each of a plurality of the modes in which the corresponding application is executable. For instance, at least one of configuration, representation, security and the like of the common application is changeable. This shall be described in detail later.

Of course, the common application may not change its feature in each of a plurality of the modes in which the corresponding application is executable. For instance, if the common application includes such a basic terminal application as a voice call, a message and the like, it may not change its feature. For example, if first to third applications are executed in a first mode and if the third application, a fourth application and a fifth application are executed in a second mode, the first and second applications, the third application and the fourth and fifth application can be called the dedicated applications of the first mode, the common application of the first and second modes and the dedicated applications of the second mode, respectively.

A plurality of modes can include a first mode (i.e., a private mode) facilitating user's personal life, a second mode (i.e., a business mode) facilitating a user's work life, and the like. This enables a mobile terminal to be discriminatively used in consideration of a user's personal life (e.g., privacy) and a user's public life (e.g., work life). In particular, in aspect of security reinforcement, when either a private mode or a business mode is implemented, restriction can be put on an access to information corresponding to the other mode.

The above-described private mode and the business mode are just the examples for describing a plurality of the modes. If the above-described private mode and the business mode are suitable for the mode discrimination reference mentioned in this disclosure, they are non-limited by their names. Although the mode discrimination of a plurality of the modes is explained in the above description based on the application configuration, it shall be described in detail with reference to the accompanying drawings later.

Implementation and activation of a plurality of modes mentioned in the description of the present invention shall be defined as follows.

First of all, according to an embodiment of the present invention, a mobile terminal can implement a plurality of modes all and is also able to activate one of a plurality of the currently implemented modes. For instance, if a plurality of the modes include a first mode and a second mode, the mobile terminal boots an operating system capable of implementing both of the first and second modes to implement and can then activate the implemented first or second mode selectively.

In particular, if both of the first and second modes are already implemented, the mode for displaying an executed screen on a current screen, the mode for designating the currently executed application, the mode having a high priority or the like can be called an activated mode. In this instance, a non-activated mode (or a deactivated mode) can be regarded as operating as a background despite being implemented in the mobile terminal. In more particular, if an executed screen of the first mode and an executed screen of the second mode are being displayed on a first region and a second region of the screen through screen partition, respectively, the mode selected by a user, the mode for activating the corresponding region currently, the mode for designating a currently executed application, the mode having a high priority or the like can be regarded as activated.

Occasionally, after the mobile terminal has implemented and activated one mode, if the mobile terminal attempts to switch the current mode to the other mode, the mobile terminal can implement and activate the other mode (i.e., selective implementation and activation of mode).

In the following description, implementation of a plurality of modes and operations of components used for inter-mode switching for a plurality of the modes are explained in detail with reference o FIGS. 3A to 4C.

Figure 3A:
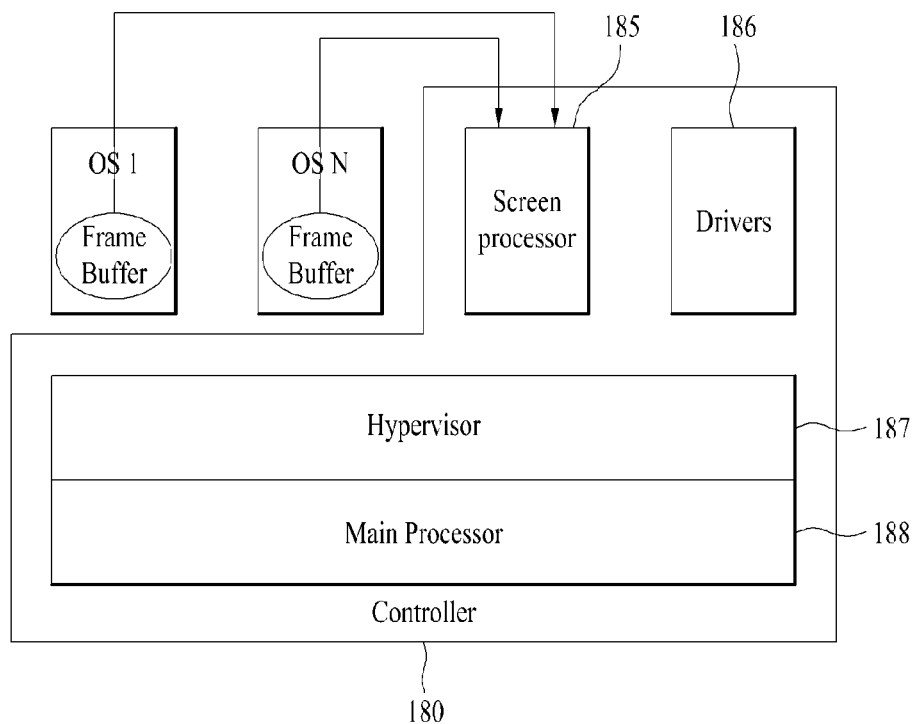
FIGS. 3A to 3C are block diagrams of components used for implementation of a plurality of modes and a mode switching among a plurality of the modes according to an embodiment of the present invention.
Figure 3B:
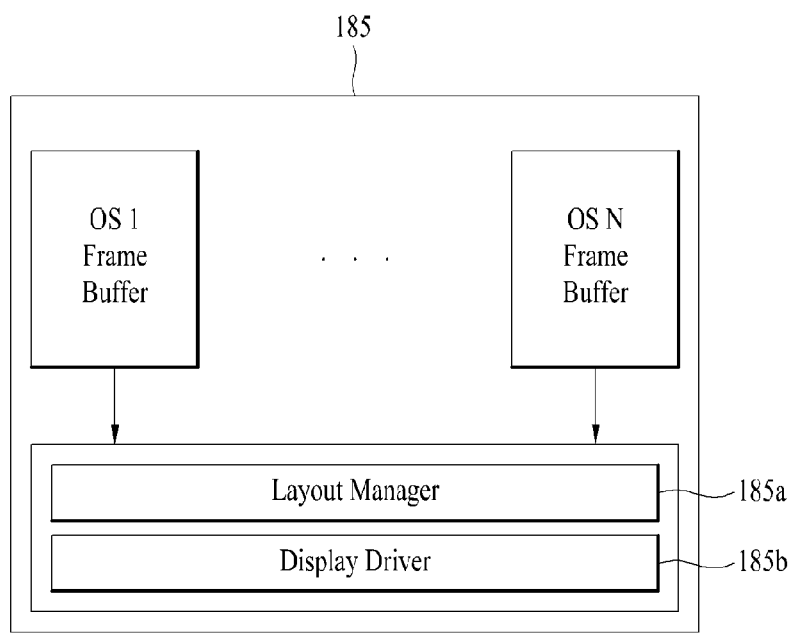
Figure 3C:
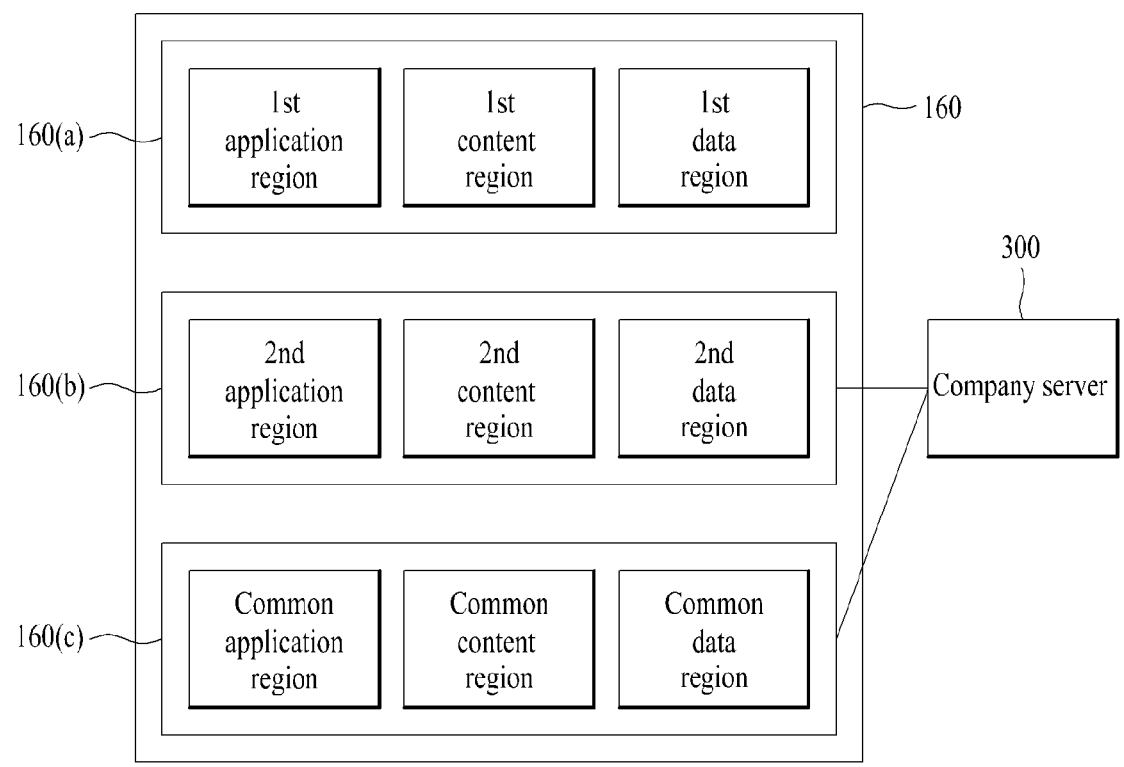

FIGS. 3A to 3C are block diagrams of components used for implementation of a plurality of modes and a mode switching among a plurality of the modes according to an embodiment of the present invention. FIG. 3A is a block diagram of a controller 180 for driving a plurality of operating systems (OSs) and configuring a dedicated screen of a plurality of operating systems. In addition, FIG. 3B is a block diagram of a screen processor 185 shown in FIG. 3A. In particular, FIGS. 3A and 3B show a case that a plurality of the operating systems are provided in parallel with each other (cf. FIG. 4A(a), FIG. 4B).

According to an embodiment of the present invention, a plurality of the modes can be implemented by a plurality of the operating systems, respectively. In particular, the operating system for supporting implementation can differ per mode.

Referring to FIG. 3A, a controller 180 can include a screen processor 185, a driver 186, a hypervisor 187 and a main processor 188. In this instance, the hypervisor 187 can be called such a terminology as a virtual engine (virtual machine), a virtualizing module (virtualization), a virtual engine monitor (virtual machine monitor), a virtualization module monitor (virtualization monitor) and the like. This terminology is just exemplary. In addition, a component capable of performing the same function of the hypervisor 187 is non-limited by the corresponding terminology.

A frame buffer is provided to each of a plurality of the operating systems stored in the memory 160. If a plurality of the operating systems are driven, the screen processor 185 receives a frame corresponding to a dedicated screen of the corresponding operating system from each of the frame buffers and then determines whether to display the dedicated screen of a prescribed one of the operating systems on a screen of the display unit 151 under the control of the main processor 188.

Under the control of the main processor 188, the screen processor 185 displays the dedicated screen of the specific operating system on the whole screen of the display unit 151 (e.g., when implementing one mode only). Alternatively, the screen processor 185 generates one integrated frame by combining and/or editing the frames received from the frame buffers and can then display an integrated dedicated screen including all the dedicated screens of a plurality of the operating systems (e.g., when implementing a plurality of the modes).

Referring to FIG. 3A, a plurality of the operating systems OS1, . . . OS N are prepared in parallel with each other, which can be described in detail with reference to FIGS. 4A(a) and 4B as follows.

Figure 4A:
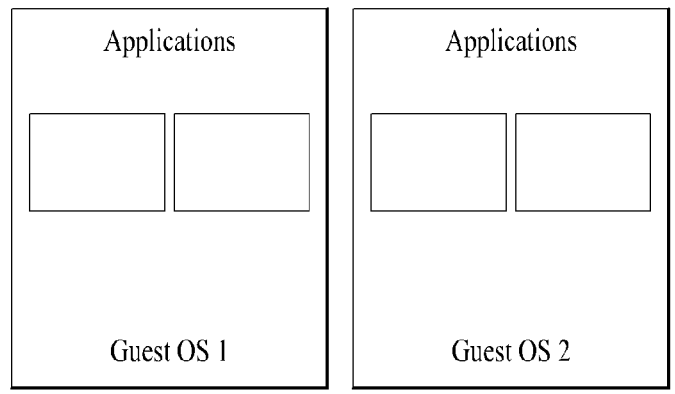
FIGS. 4A to 4C are block diagrams of components used for operating a plurality of operating system for implementing a plurality of modes according to an embodiment of the present invention.
Figure 4A:
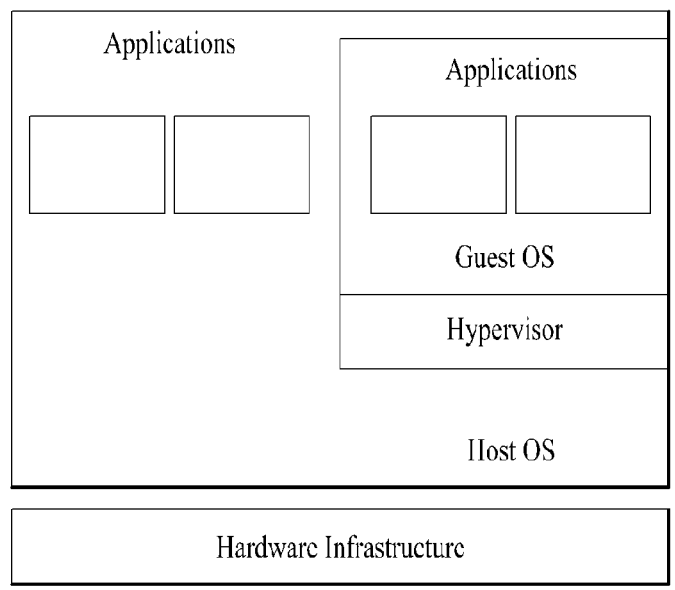
Figure 4B:
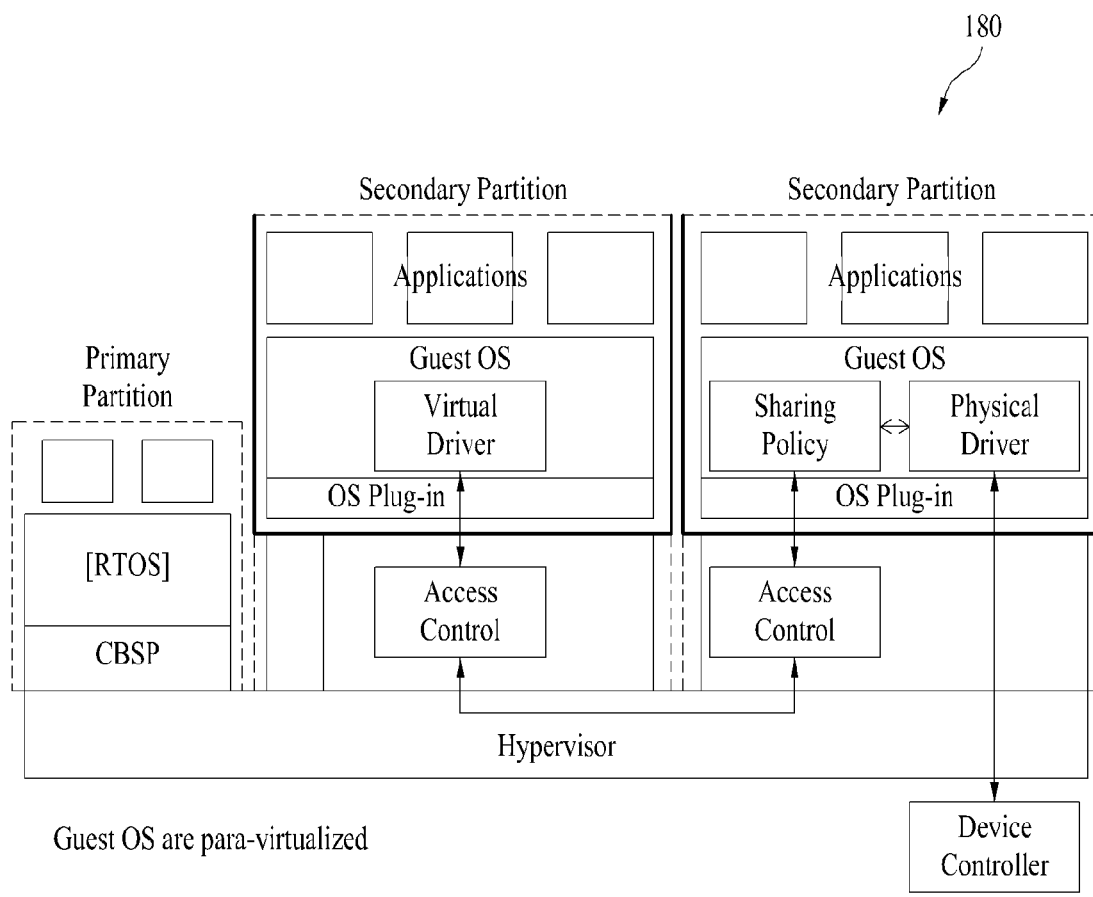

FIGS. 4A(a) and 4B show a scheme of booting a plurality of operating systems Guest OS 1 and Guest OS 2 respectively supporting different modes in parallel by loading a hypervisor (hereinafter named a first scheme). Referring to FIGS. 4A(a) and 4B, the mobile terminal 100 can implement Guest OS 1 and Guest OS 2 selectively, sequentially or simultaneously. In addition, a different mode can be designated to each of the Guest OS 1 and the Guest OS 2. In this instance, the operation of the Guest OS 1 and the Guest OS 2 and the corresponding mode activation can be performed by the hypervisor. The components shown in FIG. 4B can perform general operations related to the virtualization engine technology.

Multi-OS booting and mode activation corresponding to the multi-OS booting are described in detail as follows. First of all, in case (1) of activating a mode corresponding to the currently booted Guest OS 1 or Guest Os 2 or in case (2) of booting the Guest OS 1 corresponding to first mode and the Guest OS 2 corresponding to a second mode sequentially or simultaneously, the controller 180 (particularly, the hypervisor) implements and activates either the first mode or the second mode (2-1) or can activate either the first or second mode despite implementing both of the first and second modes (2-2).

Referring now to FIG. 3, the screen processor 185, includes a layout manager 185a and a display driver 185b (FIG. 3B). Under the control of the main processor 188, the layout manager 185a generates one integrated frame by combing or editing the frames received from the frame buffers and the display driver 185b then controls the frame generated by the layout manager 185a to be displayed on the display unit 151.

The driver 186 controls the entire operating systems to be driven. The hypervisor 187 is a middleware between the main processor 188 and each of the operating systems and includes a virtualization engine configured to a plurality of the operating systems to be usable in the mobile terminal 100 according to an embodiment of the present invention. In addition, the main processor 188 controls all operations related to the driving of a plurality of the operating systems according to an embodiment of the present invention.

As mentioned in the above description, the screen processor 185, the driver 186, the hypervisor 187 and the main processor 188 can be included in the controller 180 or can be stored as software in the memory 160.

FIG. 3C is a block diagram of the memory 160 having a database storage region corresponding to each of a plurality of the modes.

According to an embodiment of the present invention, the mobile terminal can manage the database storage regions of a plurality of the modes discriminatively. In particular, when a plurality of the modes are implemented by the different operating systems, respectively, the mobile terminal can manage the database storage regions of a plurality of the modes discriminatively.

Generally, when at least one operating system capable of implementing a first mode and a second mode is provided, the memory 160 is ale to store an application corresponding to each of the at least one operating system. Therefore, the provided at least one or more operating systems can be booted selectively or simultaneously under the control of the controller 180.

For instance, the operating system can include such a commercial OS as Android OS, Linux based OS, Windows Mobile OS, Apple OS and the like. In addition, a dedicated application can be differently set for each of the operating systems. In addition, a multi-OS can include different kinds of operating systems (e.g., Android OS, Apple OS, etc.) and the same kinds of operating systems (e.g., 2.1 version of Android OS, 2.2 version of Android OS, etc.) differing from each other in version.

According to an embodiment of the present invention, assuming that both of the first mode and the second mode can be implemented, the memory 160 can include a first database storage region 160(a) corresponding to the first mode, a second database storage region 160(b) corresponding to the second mode, and a common database storage region 160(c) in common with the first mode and the second mode. Occasionally, the common database storage region 160(c) can be omitted. In this instance, a commonly-designated application and content or data associated with the corresponding application can be stored in the database storage region of the corresponding mode.

In particular, in configuring the first, second and common database storage regions, the mobile terminal 100 uses memories different from each other in hardware as the storage regions, puts restriction on accessing the storage regions per mode despite providing the storage regions within a same memory, or can discriminate the storage regions from each other using a storage partition per mode.

In this instance, the same operating system implements the first mode and the second mode or different operating systems can implement the first mode and the second mode, respectively. Moreover, at least two or modes can be implemented by the mobile terminal 100. If so, the database storage regions can be further subdivided.

In particular, the first database storage region 160(a) can include a region (i.e., a first application region) for storing at least one first application executable in the first mode, a region (i.e., a first content region) for storing a content associated with the first application and a region (i.e., a first data region) for storing data associated with the first application.

In addition, the second database storage region 160(b) can include a region (i.e., a second application region) for storing at least one second application executable in the second mode, a region (i.e., a second content region) for storing a content associated with the second application and a region (i.e., a second data region) for storing data associated with the second application.

Moreover, the common database storage region 160(c) can include a region (i.e., a common application region) for storing at least one common application executable in both of the first mode and the second mode, a region (i.e., a common content region) for storing a content associated with the common application and a region (i.e., a common data region) for storing data associated with the common application.

When the second mode is a business mode that facilitates a user's public life, information stored in the second database storage region 160(b) and information corresponding to the second mode in the common database storage region 160(c) can be utilized only if the corresponding information is stored in a manner of being shared with a company server 300, the corresponding information is stored in the company server 300 (i.e., the second database storage region 160(b) is not needed) or the company server 300 is accessed. In this instance, the company server 300 can include a server of a company, for which a user works, a server of a specific company designated by a user (or a company where the user works), or the like.

While the first mode is activated, the mobile terminal 100 can utilize the information stored in the first database storage region 160(a) and the information corresponding to the first mode in the common database storage region 160(c). While the second mode is activated, the mobile terminal 100 can utilize all the information stored in the first, second and common database storage regions 160(a), 160(b) and 160(c).

Alternatively, while the second mode is activated, the mobile terminal 100 can utilize the information stored in the first database storage region 160(a) and the information corresponding to the second mode in the common database storage region 160(c). While the first mode is activated, the mobile terminal 100 can utilize all the information stored in the first, second and common database storage regions 160 (a), 160(b) and 160(c).

Optionally, it can control the mobile terminal 100 not to utilize the information on the first mode in the course of the activated second mode.

Besides, although the drawing shows that the application region, the content region and the data region are situated in the database storage region, the application region, the content region and the data region can be integrated together if desired.

FIGS. 4A(b) and 4C show a scheme of driving a hypervisor on a Host OS for supporting one mode to boot a Guest OS for supporting another mode (hereinafter named a second scheme). In particular, a mode supported by the Host OS can include a private mode. In addition, a mode supported by the Guest OS can include a business mode.

Figure 4C:
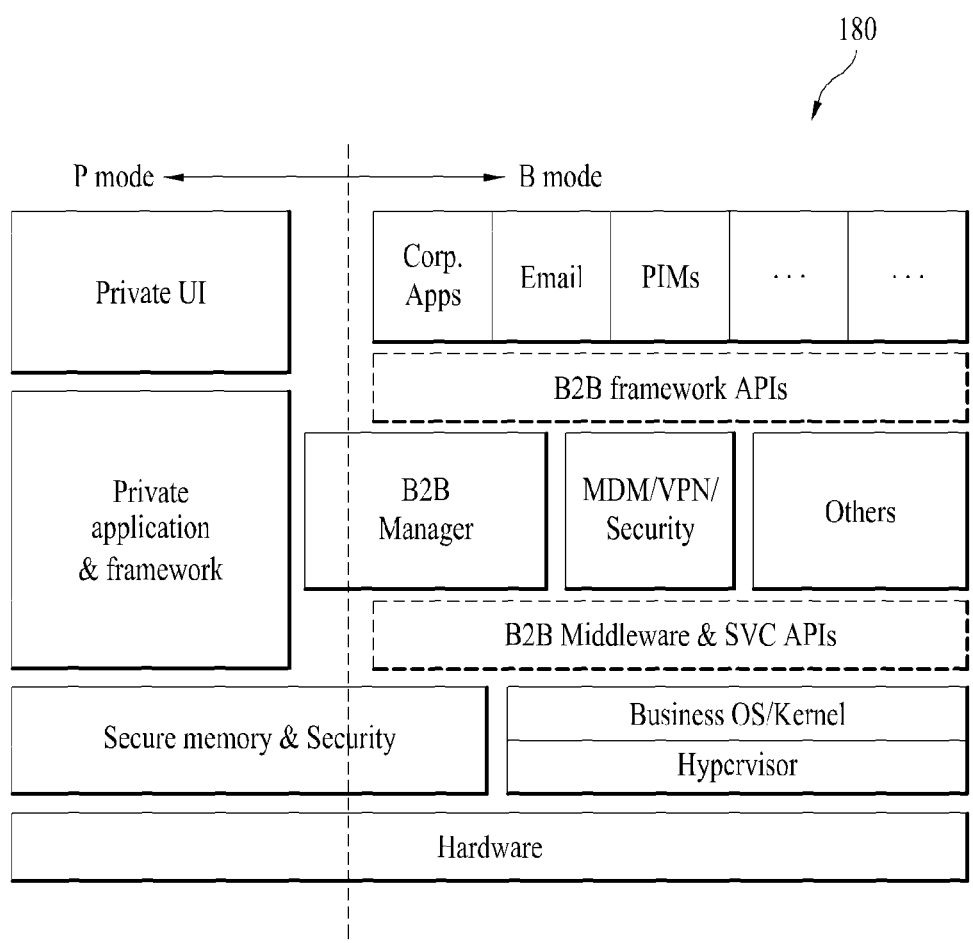

In more particular, referring to FIG. 4C, a B2B manager can perform a switching operation between a private mode (hereinafter abbreviated a P mode) and a business mode (hereinafter abbreviated a B mode). Components shown in a P mode region of the two regions partitioned by a dotted line can operate when the private mode is implemented, components shown in the B mode region can operate when the business mode is implemented, and components included in both of the modes can operate in both of the modes.

According to an embodiment of the present invention, the mobile terminal 100 can implement a plurality of modes on an operating system selectively, simultaneously or sequentially. A different operating system (hereinafter named an individual operating system) is designated to each of a plurality of the modes or a common operating system can be designated to a plurality of the modes. Specifically, implementation of a plurality of the modes can be controlled by the hypervisor 187.

In particular, a currently implemented or activated mode in accordance with an individual or common operating system is defined as follows. For clarity and convenience of the following description, assume that a plurality of modes include a first mode and a second mode. Of course, at least two or more modes can exist if desired.

First of all, when a common operating system is booted, the controller 180 implements and activates either the first mode or the second mode (1) or can activate either the first mode or the second mode despite implementing both of the first and second modes.

When an individual operating system is booted, the controller implements and activates a mode corresponding to a currently booted individual operating system (1), implements and activates a mode corresponding to one of the first mode and the second mode when booting a first operating system corresponding to the first mode and a second operating system corresponding to the second mode sequentially or simultaneously (2-1), or activates either the first mode or the second mode despite implementing both of the first mode and the second mode (2-2).

In the following description, how to discriminate a plurality of modes from each other is explained in detail.

First of all, according to an embodiment of the present invention, each of a plurality of modes can be discriminated by at least one of a mode indicator, a database storage region, an operating system, a user access authority, an application configuration, a content configuration, a data configuration, an application feature, an application group, a group identifier and the like.

A case of discriminating a plurality of modes using a mode indictor according to a first embodiment is explained as follows.

First of all, each of a plurality of modes can have an indicator different to indicate a corresponding mode. An indicator per mode is basically stored in the mobile terminal 100 or can be downloaded from an external server or an external terminal. The indicator per mode is set or selected by a user or can be randomly set by the controller 180.

For instance, each of a plurality of the modes can have a different one of a mode icon, a mode image, a background image, a background color/brightness, a letter font/color/size, a home screen picture (number of pages and page indicator included), an application arrangement structure (e.g., the number of applications included in one home screen, etc.), an application identifier, an LED color, an alarm sound such as a bell sound and the like, a keypad type (backlight color of keypad included), a mode switching key zone, a group identifier (described later) and the like. Of course, those examples of the mode indicator are just exemplary and can include all display elements for discriminating a mode.

This is explained in detail with reference to FIGS. 5A to 5D. For clarity and convenience of the following description, assume that a first mode and a second mode include a private mode and a business mode, respectively. In addition, assume that either the private mode or the business mode is in an active state.

FIGS. 5A to 10C are diagrams for discriminating a plurality of modes according to an embodiment of the present invention.

Figure 5A:
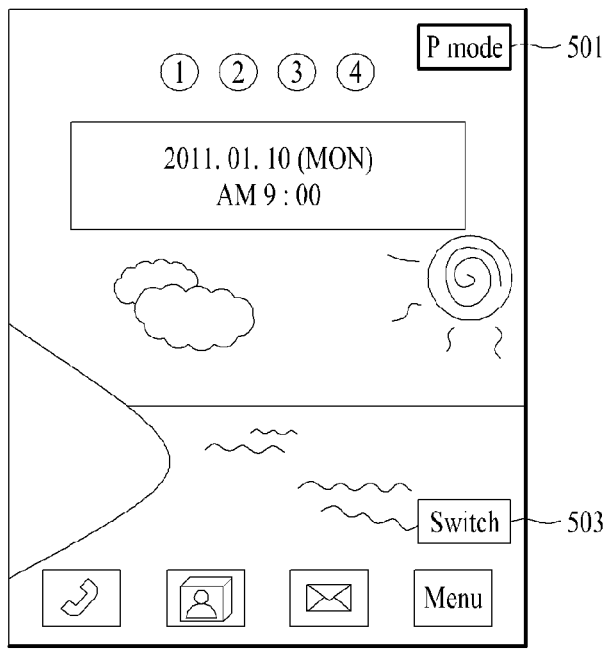
FIGS. 5A to 10C are diagrams for discriminating a plurality of modes according to an embodiment of the present invention.
Figure 5A:
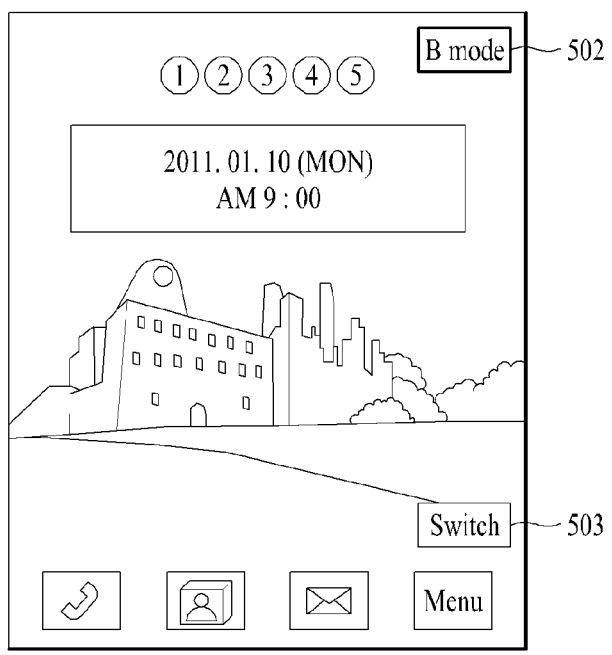

Referring to FIG. 5A, if a personal mode is currently activated, the mobile terminal 100 can display an icon (P mode) 501 corresponding to the private mode on a prescribed region of a screen (FIG. 5A(a)). If a business mode is currently activated, the mobile terminal 100 can display an icon (B mode) 502 corresponding to the business mode on a prescribed region of a screen (FIG. 5A(b)).

Figure 5B:
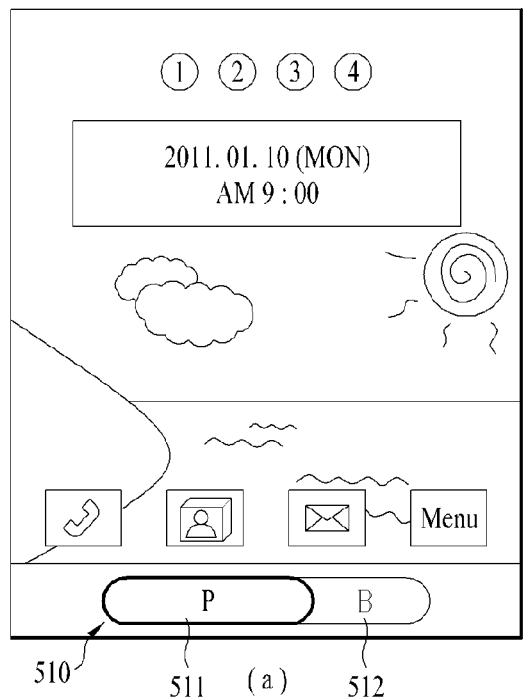
Figure 5B:
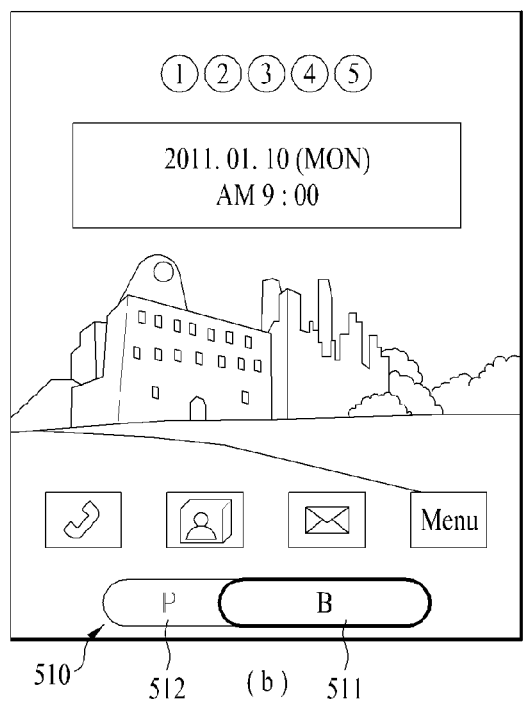

Referring to FIG. 5B, the mobile terminal 100 includes a mode switching key region 510 provided to a prescribed region of the screen. If the private mode is currently activated, the mobile terminal 100 can discriminatively display a zone (P) 511 corresponding to the private mode in the mode switching key region 510 (FIG. 5B(a)). If the business mode is currently activated, the mobile terminal 100 can discriminatively display a zone (B) 512 corresponding to the business mode in the mode switching key region 510 (FIG. 5B(b)).

Figure 5C:
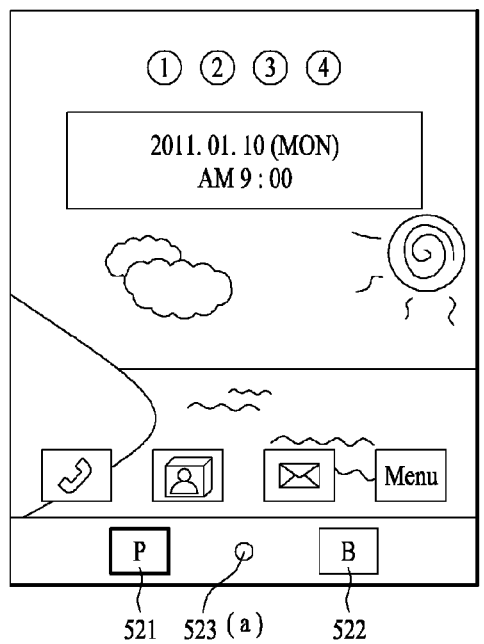
Figure 5C:
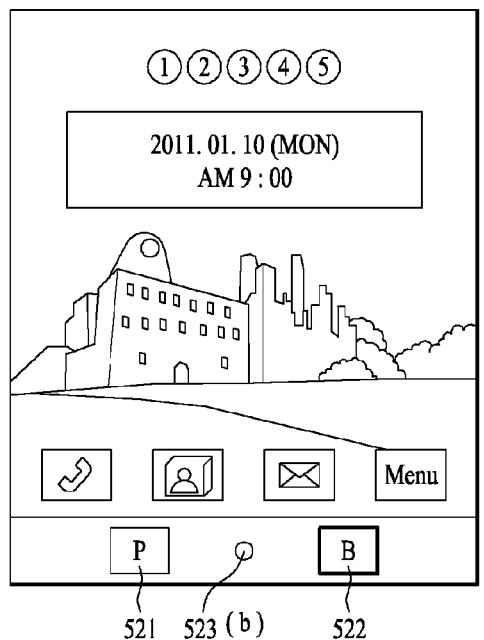

Referring to FIG. 5C, a private mode zone 521, a business mode zone 522 and a switching command zone 523 are provided to the screen of the mobile terminal 100. If the private mode is currently activated, the mobile terminal 100 can discriminatively display the private mode zone (P) 521 (FIG.

5C(a)). If the business mode is currently activated, the mobile terminal 100 can discriminatively display the business mode zone (B) 522 (FIG. 5C(b)).

Figure 5D:
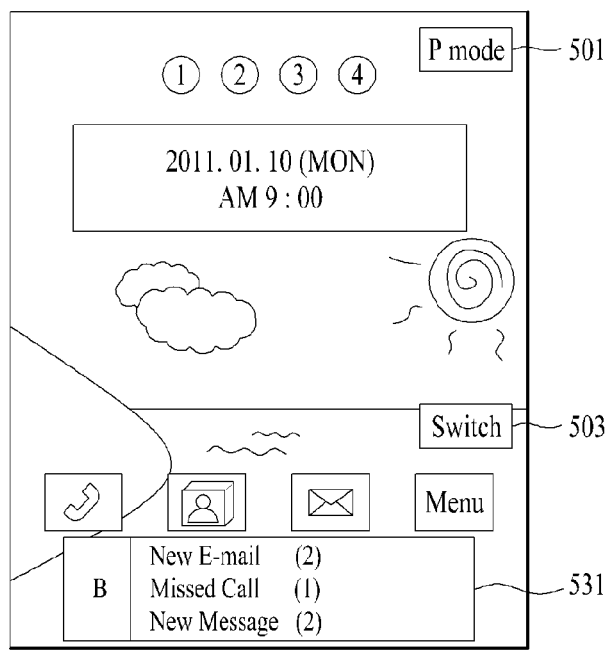
Figure 5D:
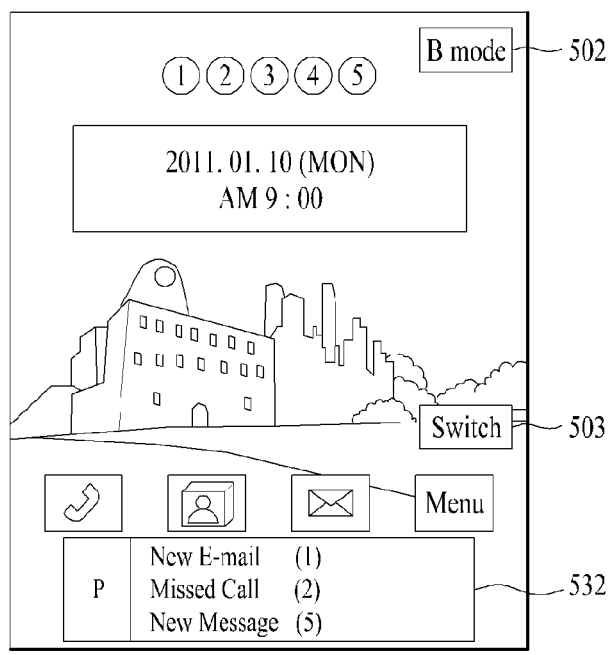

Referring to FIG. 5D, if the private mode is currently activated, the mobile terminal 100 can display an announcement window 531 for announcing events (e.g., email, message, call, etc.) occurring in association with the business mode or the number of the events (or, occurrence time, counterpart information, etc.) on a prescribed region of the screen (FIG. 5D(a)). If the business mode is currently activated, the mobile terminal 100 can display an announcement window 532 for announcing events (e.g., email, message, call, etc.) occurring in association with the private mode or the number of the events (or, occurrence time, counterpart information, etc.) on a prescribed region of the screen (FIG. 5D(b)).

In the following description, a case of discriminating a plurality of modes using a database storage region according to a second embodiment is explained.

First of all, a plurality of the modes can discriminatively have database storage regions within the memory 160, respectively (cf. FIG. 3C).

Each of a plurality of the modes can utilize the information stored in the corresponding database storage region or the corresponding information stored in the common database storage region only. Moreover, it can set the information on one mode not to be utilized in other modes. Besides, one (e.g., business mode) of a plurality of the modes can utilize information on another mode (e.g., private mode), whereas the latter mode can be set not to use the information on the former mode.

If the information on the first mode can be utilized in the second mode (yet, the first mode is unable to utilize the information on the second mode), it can be said that an access restriction is put on the second mode or that a higher security level is set on the second mode (described later).

This is explained in detail with reference to FIGS. A to 7B as follows. For clarity and convenience of the following description, assume that a first mode and a second mode include a private mode and a business mode, respectively. Assume that either the private mode or the business mode is in an active state. In addition, assume that a common application of the first and second modes is currently executed.

Figure 6A:
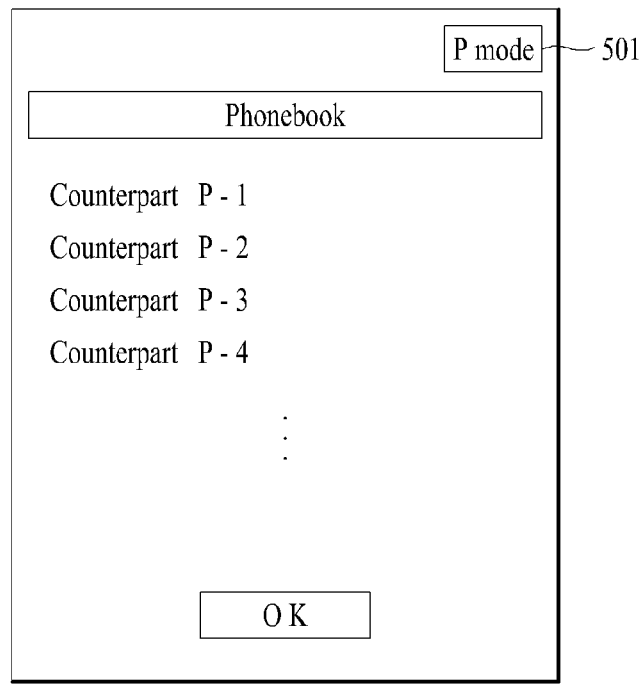

Referring to FIG. 6A, when a phonebook (example of a common application) is being executed in the private mode, the mobile terminal 100 extracts counterpart information corresponding to the private mode from counterpart information associated with the phonebook only and can then display the extracted counterpart information.

Figure 6B:
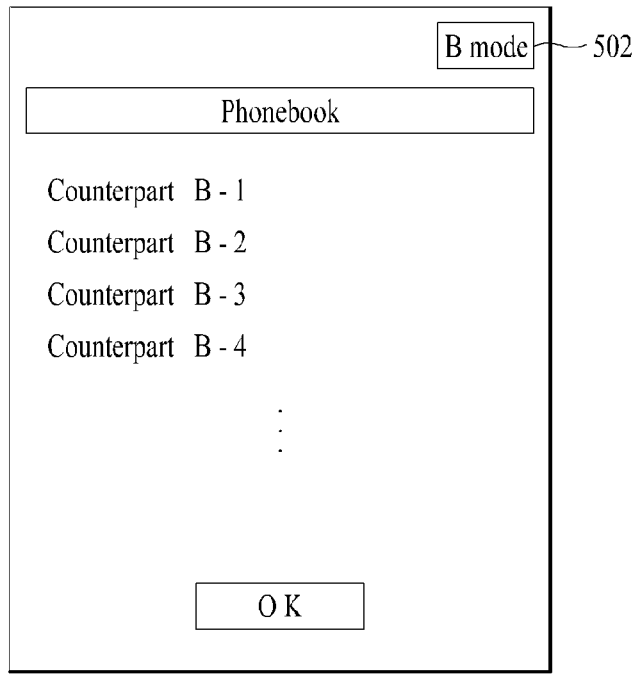
Figure 6B:
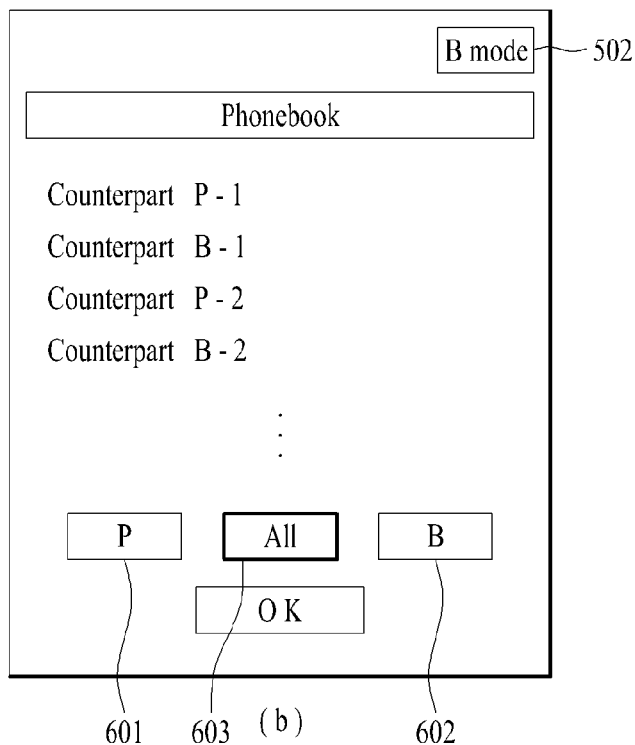

Referring to FIG. 6B, when executing a phonebook in the private mode, the mobile terminal 100 extracts counterpart information corresponding to the business mode from counterpart information associated with the phonebook and then displays the extracted counterpart information (FIG. 6B(a)). Alternatively, the mobile terminal 100 extracts counterpart information corresponding to either the private mode or the business mode and can then display the extracted counterpart information (FIG. 6B(b)).

In particular, FIG. 6B(b) shows a case that a zone (All) 603 is activated. If a privacy zone (P) 601 is activated, the mobile terminal 100 can selectively display the counterpart information corresponding to the private mode only. If a business zone (B) 602 is activated, the mobile terminal 100 can selectively display the counterpart information corresponding to the business mode only.

Figure 7A:
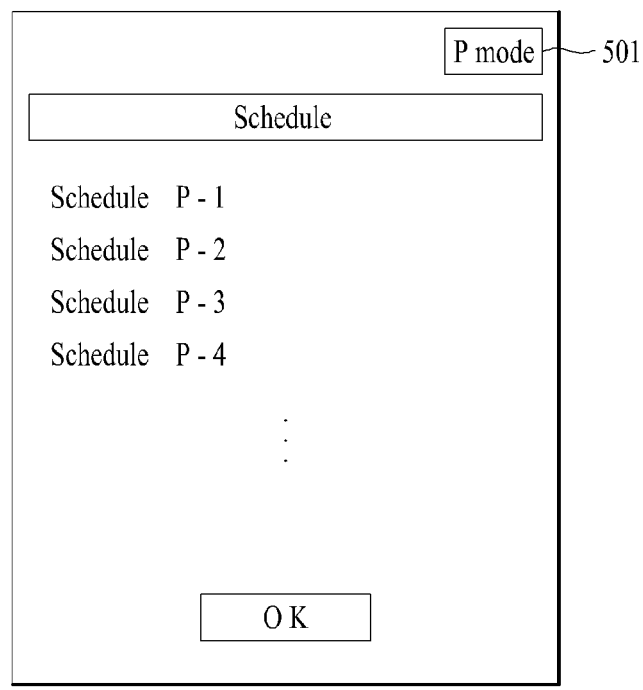

Referring to FIG. 7A, when a schedule management (example of a common application) is being executed in the private mode, the mobile terminal 100 extracts schedules corresponding to the private mode from schedules associated with the schedule management only and can then display the extracted schedules.

Figure 7B:
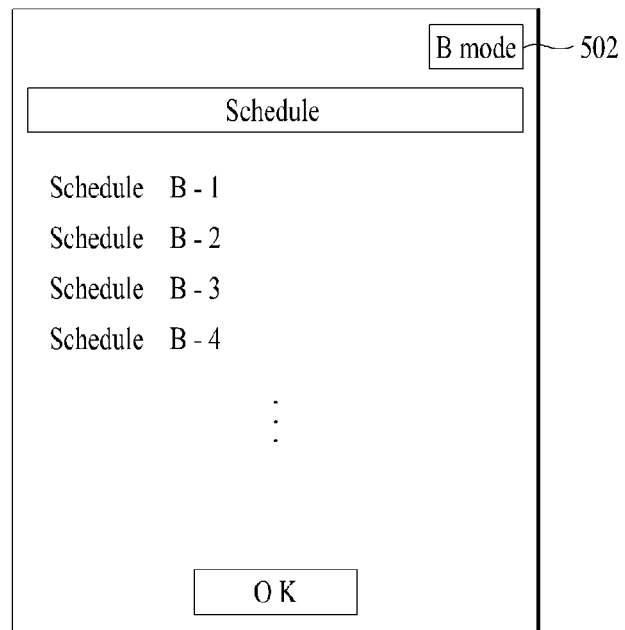
Figure 7B:
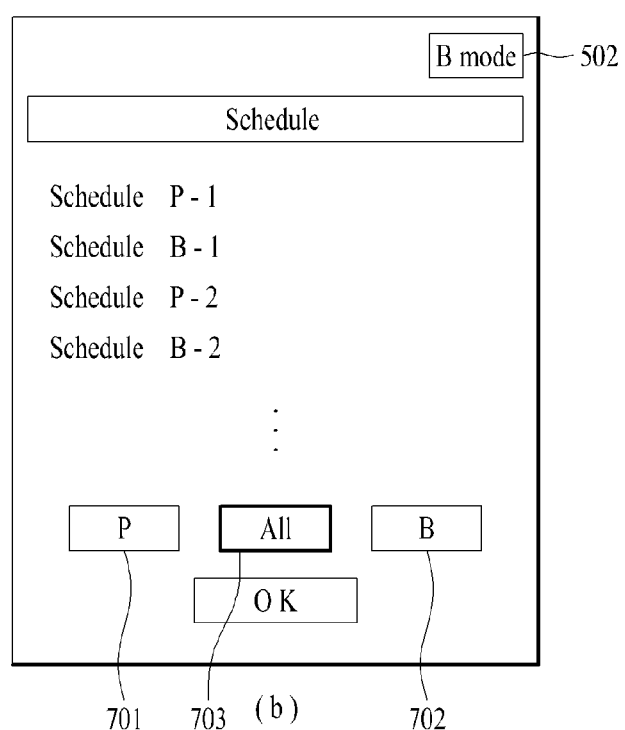

Referring to FIG. 7B, when executing a schedule management in the private mode, the mobile terminal 100 extracts schedules corresponding to the business mode from schedules associated with the schedule management and then displays the extracted schedules (FIG. 7B(a)). Alternatively, the mobile terminal 100 extracts schedules corresponding to either the private mode or the business mode and can then display the extracted schedules (FIG. 7B(b)).

In particular, FIG. 7B(b) shows a case that a zone (All) 703 is activated. If a privacy zone (P) 701 is activated, the mobile terminal 100 can selectively display the schedules corresponding to the private mode only. If a business zone (B) 702 is activated, the mobile terminal 100 can selectively display the schedules corresponding to the business mode only.

Specifically, referring to FIGS. 6A to 7B, although the private mode is unable to access the information on the business mode or the database storage region storing the information on the business mode, the business mode can freely access the information on the private mode or the database storage region storing the information on the private mode.

According to a third embodiment, each of a plurality of modes can be discriminated by a corresponding user access authority. For clarity and convenience of the following description, assume that a plurality of the modes include a first mode and a second mode.

Regarding each of a plurality of the modes, as a different security level is set, a user access authority can be changed (1). Regarding each of a plurality of the modes, if an access restriction is put on one mode but an access restriction is not put on the other mode, a user access authority can be changed (2).

For this, in order to enter a specific one of a plurality of the modes, an authentication procedure can be requested. Hence, the specific mode can be entered only if a valid authentication procedure is performed to enter the specific mode. In particular, if an access restriction or a security level over a predetermined reference is put on the specific mode, an authentication procedure can be requested.

For instance, in a mode having a high user access authority, information corresponding to a mode having a low user access authority or a database storage region of the corresponding information is freely accessed and can be freely utilized. On the contrary, in a mode having a low user access authority, it is unable to access information corresponding to a mode having a high user access authority or a database storage region of the corresponding information.

When entering or switching to a mode having a high user access authority, an input of a user authentication information is requested. If a valid user authentication information is input, the mobile terminal 100 can enter or switch to the mode having the high user access authority (example of an authentication procedure). When a mode having a low security level is implemented, the mobile terminal 100 is requested to input a user authentication information (e.g., name, social security number, etc.) of a low level. When a mode having a high security level is implemented, the mobile terminal 100 is requested to input a user authentication information (e.g., name, social security number, specific touch pattern, specific password, etc.) of a high level.

Regarding management (e.g., input, inquiry, editing, etc.) of information (e.g., content, data, etc.) on an application in accordance with a user access authority, three kinds of cases are described in detail as follows. For clarity and convenience of the following description, assume that a plurality of modes include a first mode and a second mode.

First of all, according to a first scenario, applications to which contents or data can be input regardless of a mode are possible. For instance, the content or data inputtable application can include such an application for performing a basic function in using a terminal as a schedule management, a scheduler, an email, a message, a messenger, a conference call, a video call, an internet, a phonebook and the like.

According to a second scenario, like the first case, information input is possible without mode discrimination. Yet, it can discriminate a database storage region per mode (cf. FIG. 3C).

In particular, inter-mode information exchange is impossible but unilateral information exchange is possible. For instance, information transfer from a private mode to a business mode is possible but information transfer from a business mode to a private mode is impossible. In another instance, by setting a plurality of modes to different security levels, respectively, information transfer from a low level to a high level is possible but information transfer from a high level to a low level is impossible.

In one situation, an external terminal having a predetermined authority in a remote place deletes information (e.g., application, content, data, etc.) on a specific mode only or can shut down the specific mode itself. For instance, the specific situation can include one of a case that an employee takes out a terminal without authorization, a case that a terminal is stolen, a case that a unregistered storage medium is loaded in a terminal, a case that a terminal accesses an unsubscribed network, and the like.

Furthermore, regarding a user access authority, it can differentiate an authority for accessing an application, a content, a data or the like, which is available for a business mode, in accordance with a user level (e.g., the user level is determined in consideration of rank in company, duty attribute in company, department in company, etc.) of the mobile terminal 100. In addition, it is also able to differentiate a function for a specific application. For instance, when a user level (e.g., a group head) is equal to or higher than a predetermined reference, an approval grant function is usable. Yet, when a user level (e.g., a company employee) is lower than a predetermined reference, an approval grant function is deactivated. Moreover, the same application can have a usable content/data that differs in accordance with a user level or the same content/data can have a different range of the provided information in accordance with a user level (e.g., a different data field can be configured in accordance with a user level). Besides, in accordance with a user's authority, an icon associated with a job failing to belong to the corresponding authority is not displayed on a terminal itself. Even if the icon is displayed on the terminal, it can be set not to be executed.

According to a third scenario, there can exist application (e.g., dedicated applications) accessible to corresponding information as well as operable in either a first mode or a second mode.

For instance, for security matters in a business mode, a photographing function is restricted, a conditional access to a network is granted, or a print function is blocked. When the business mode is implemented, a business related application is provided. When the private mode is implemented, the business related application may not be provided. Of course, when the private mode, a privacy related application is provided. When the business mode is implemented, the privacy related application may not be provided.

Meanwhile, a content or application specialized in a unilateral mode only is possible. For instance, the application specialized for the business mode can include a company business related application. In addition, the company business related application can perform a function of an upload to a company server, a function of a download to the company server and the like.

In addition, it can put an access restriction (or entry) per mode in accordance with a place or time. For instance, it can set a business mode not to be entered at home. In another instance, it can set a private mode not to be entered on a specific time zone. Occasionally, a separately authorized person can enter the business mode at home or the private mode at office on a specific time zone.

Moreover, because an interface is provided to be shared with users in the business mode, information can be shared with the users. If the business mode is switched to the private mode, the interface provided for the information sharing can be shut down.

Furthermore, one hardware module (e.g., a common module) can be used for a plurality of modes in common or another hardware module (e.g., a dedicated module) can be used for a specific one of a plurality of the modes. Hence, if a first mode is currently activated, a common module and a dedicated mode of the first mode are activated, while a dedicated module of a second module is not activated. In this instance, the common module and the dedicated module are designated in accordance with a user selection or can be designated by a decision made by the controller 180 or the company server 300.

For instance, assuming that a first mode and a second mode are a private mode and a business mode, respectively, a common module can include one of a mobile communication module 112 for call and message transmission and reception, a power supply unit 190, a display unit 151, a memory 160 and the like. A dedicated module of the private mode can include one of a camera 121, a position location module 115 and the like. In addition, a dedicated module of the business mode can include a projector module 155 or the like. The above examples of the communication module and the dedicated module are just exemplary, by which the communication module and the dedicated module are non-limited. In addition, the communication module and the dedicated module can be configured in more various ways.

In the following description, a user access authority is explained in detail with reference to FIGS. 8A and 8B. For clarity and convenience of the following description, assume a case that the same content is accessed.

Figure 8A:
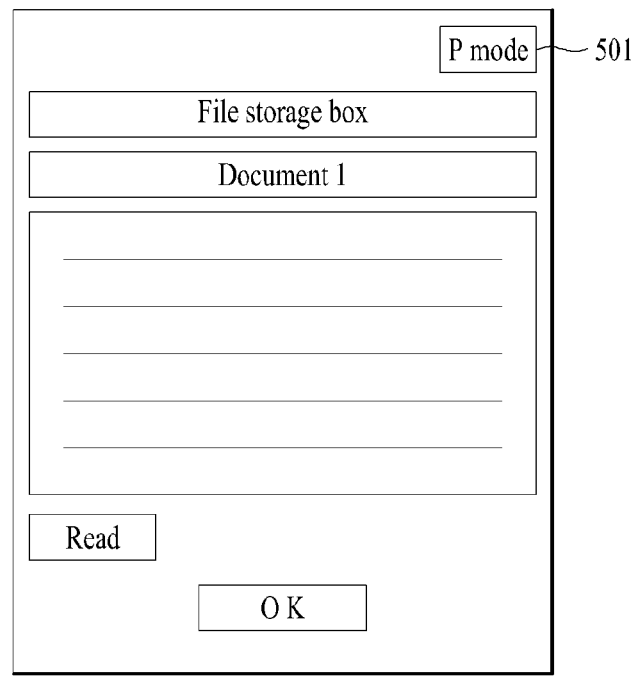
Figure 8A:
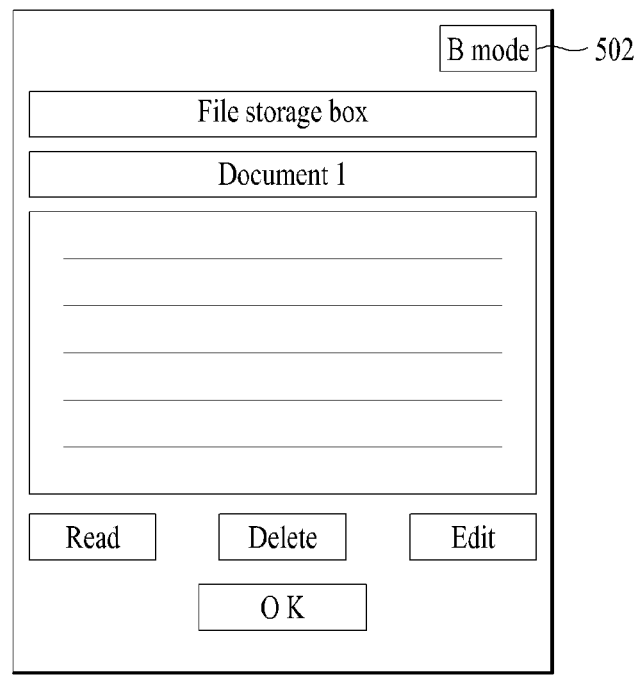

Referring to FIG. 8A, when a document 1 (example of content) is accessed in a private mode, the mobile terminal 100 can grant 'read authority' for the document 1 (FIG. 8A(a)). When a document 1 is accessed in a business, the mobile terminal 100 can grant 'read authority, delete authority, edit authority' for the document 1 (FIG. 8A(b)). Moreover, if a user is authorized over a predetermined level in a company, an approval authority can be granted to the user for the document 1 that requires approval or authorization.

Figure 8B:
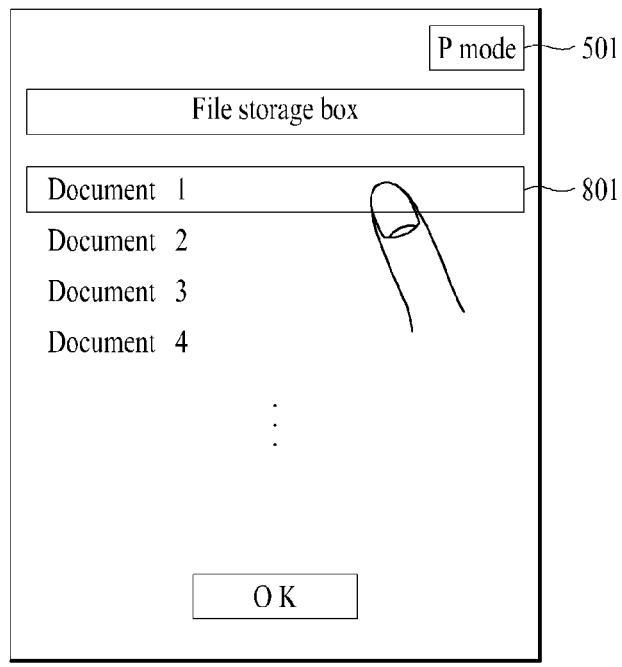
Figure 8B:
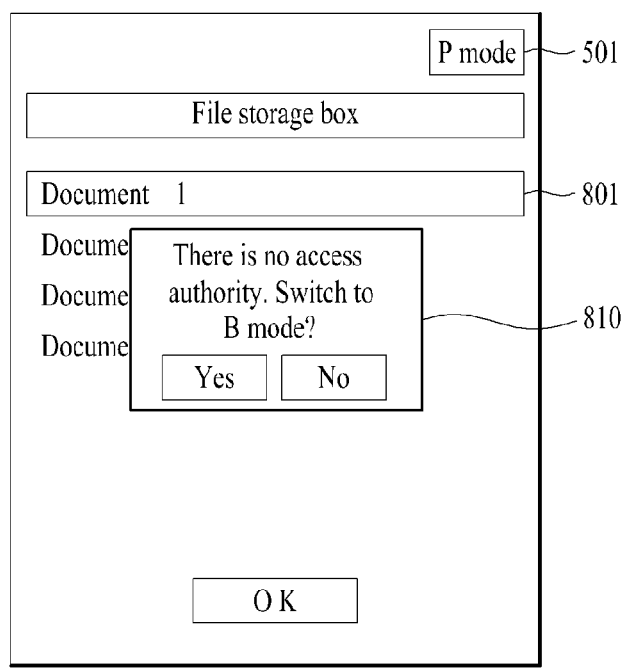

Referring to FIG. 8B, when a file 1 (example of content) corresponding to a business mode is selected from a file list in a private mode (FIG. 8B(a)), the mobile terminal 100 informs a user that there is no access authority on the file 1 and enables the user to select whether to switch the private mode to the business mode to check the file 1 (FIG. 8B(b)).

Of course, when the private mode is implemented in FIG. 8B, a file corresponding to the business mode may not be included in the file list. In addition, it can display an indictor, which indicates that the file corresponds to the privacy/business mode, on the file list.

Although the user access authority is set per mode in the above description, it can be set per application, content or data if desired. Therefore, a user authorized with the user access authority can check the same content, whereas an unauthorized user is unable to check the same content.

According to a fourth embodiment, each of a plurality of modes can be discriminated in accordance with at least one of an application configuration, a content configuration and a data configuration.

Each of a plurality of the modes can configure an application different per mode. Even if an application is a common application, each of a plurality of the modes can configure a content or data corresponding to the application differently.

In this instance, if the configuration of the application is different, it means that at least one application (hereinafter named a first dedicated application) dedicated to a first mode and at least one application (hereinafter named a common application) in common with the first mode and a second mode are executed in the first mode or it can mean that at least one application (hereinafter named a second dedicated application) dedicated to the second mode and at least one application (hereinafter named a common application) in common with the first mode and the second mode are executed in the second mode (cf. FIG. 10C).

If the configuration of the content/data is different, it can include both a case that a substance of the content/data is different and a case that a substance of the content/data is different in part. Specifically, the latter case can mean that a substance of a specific content corresponding to each of the first mode and the second mode is different even if the specific content is designated to both of the first mode and the second mode. This is enabled in a manner of configuring a data field different per mode for the same content or data.

This is explained in detail with reference to FIGS. 9A and 9B as follows.

Figure 9A:
Figure 9A:

Referring to FIG. 9A, in storing the same counterpart information, the mobile terminal 100 designates different contacts 911 and 921 and different emails 912 and 922 to a private mode and a business mode, respectively, further designates a blog address 913 and a birthday information 914 to the private mode, and further designates an approval authority 923, a rank 924 and a department 925 to the private mode.

Figure 9B:
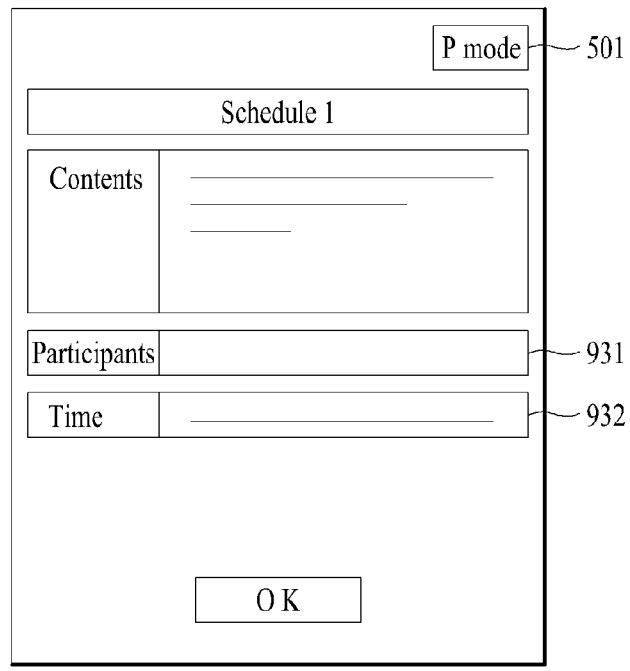
Figure 9B:
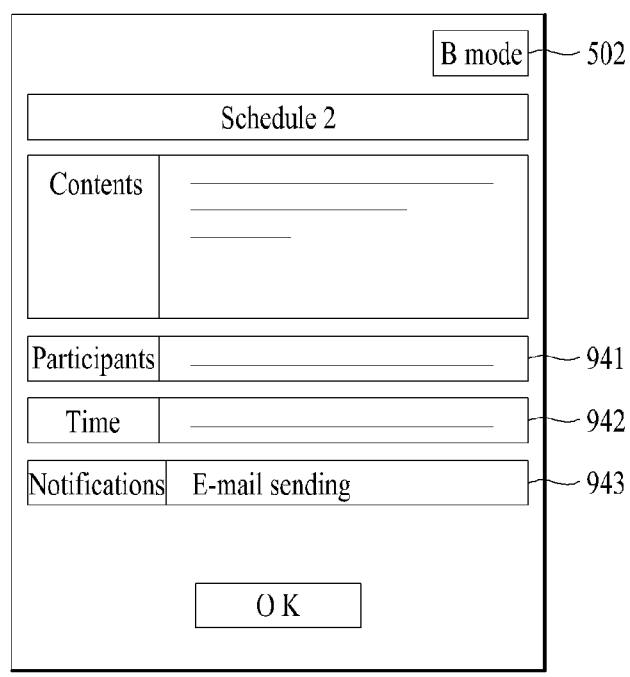

Referring to FIG. 9B, in storing the same schedule, even if a content and participant information 931 and a content and participant information 941 are identically designated to a private mode and a business mode, respectively, the mobile terminal 100 can further designate a time information 932 to the private mode and is also able to further designate a conference room information 942 and a notification 943 to the business mode.

Figure 10A:
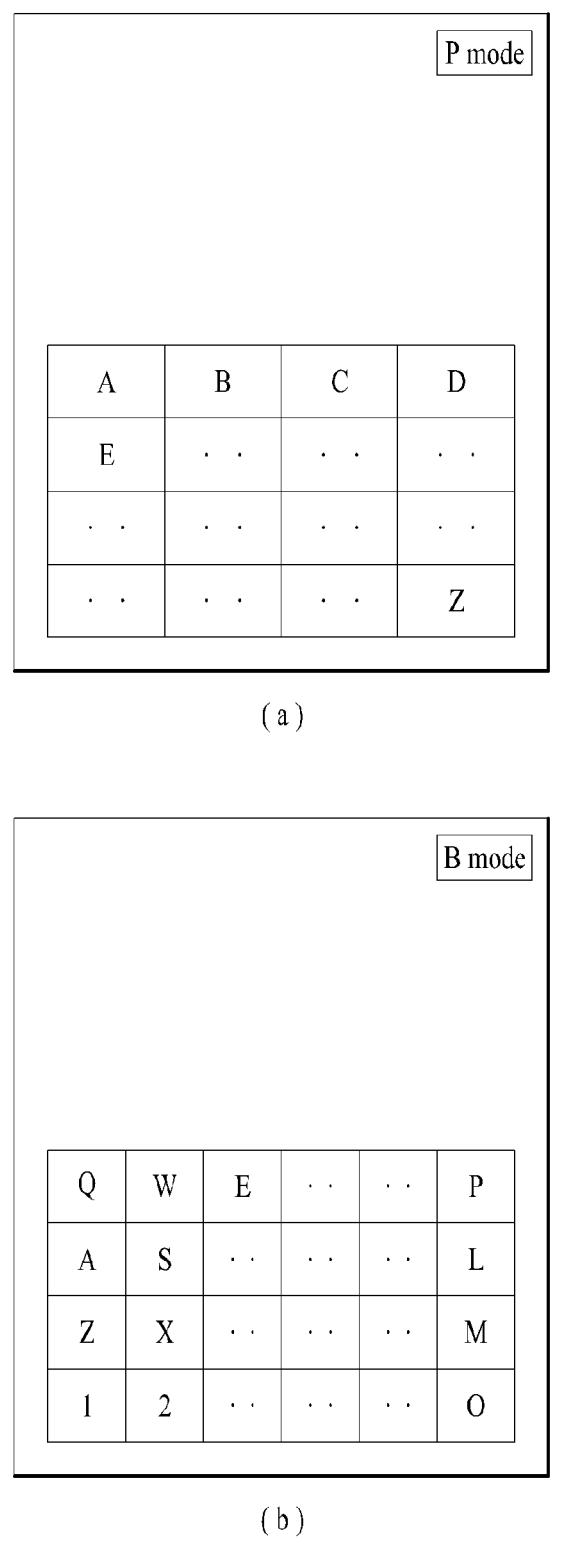
Figure 10B:
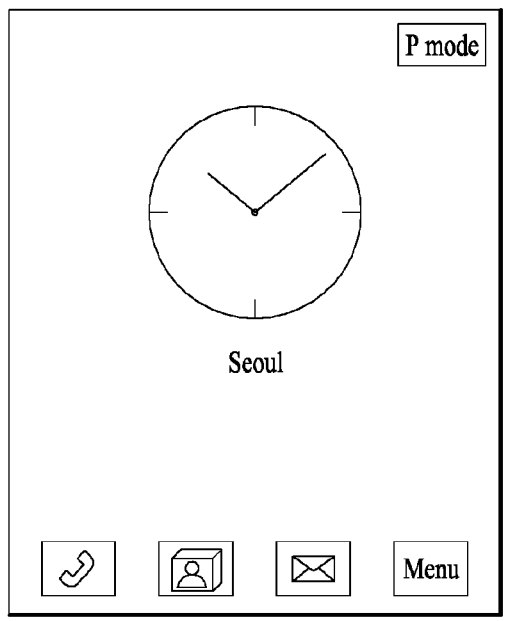
Figure 10B:
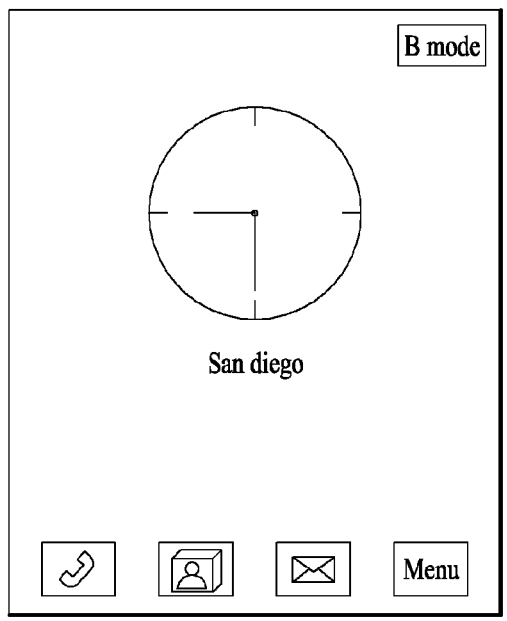

The mobile terminal 100 can set a keypad type different per mode (FIG. 10A) or can set a time zone different per mode (FIG. 10B). The mobile terminal 100 can set a different application and a different backup level of information associated with the application per mode. For instance, the mobile terminal 100 backs up information of a recent week in the private mode and is also able to back up information of a recent month or real-time information in the business mode. Of course, the backup level per mode is set by a user or can be randomly set by the controller 180.

In particular, in the business mode, if a counterpart terminal is not in the business mode or a working hour (or a holiday) currently in consideration of a status (e.g., a currently activated mode, a current location, a time zone, etc.) of the counterpart terminal, with which the mobile terminal 100 currently attempts to contact, the mobile terminal 100 informs a user of the unavailability of the counterpart terminal to enable the user to select whether to make a contact. In doing so, the mobile terminal 100 can receive information indicating the status of the counterpart terminal from the counterpart terminal or a company server and can then obtain the status of the counterpart terminal using the received information.

In the business mode, it can modify all previously-stored schedules to be fitted to a currently belonging time zone by reflecting a current time zone (for a case that a time zone is changed).

When there is no user input action made for a predetermined period of time in the business mode, it can lock or shut down the business mode automatically or in accordance with a user selection. In this instance, in order to unlock the locked state or cancel the shutdown, a user authentication information corresponding to the business mode is input or an authentication should be granted by the company server. Moreover, in the business mode, when an overseas roaming function is loaded on a user terminal, if a current location of a user is domestic, the overseas roaming function is automatically deactivated. If a current location of a user is overseas, the overseas roaming function can be automatically activated.

According to a fifth embodiment, when at least one common application is executed, each of a plurality of modes can vary its feature to correspond to a currently activated mode. In other words, when a specific application is a common application of a first mode and a second mode, the feature of the specific application can vary in accordance with whether the currently activated mode is the first mode or the second mode.

In this instance, if a feature varies per mode, it can mean that a configuration (e.g., a corresponding content/data configuration included), display or security of an application is varied.

For instance, if a feature varies per mode, it ca mean that a structure (e.g., configuration of a corresponding menu item) of an application, an executed screen (e.g., background image, letter type, letter size, provided information, etc.) of an application, a configuration of content/data associated with an application (cf. FIG. 9A, FIG. 9B), an application function, a security of an application (or, content, data, etc.) or the like is different per mode. Of course, as the examples of the application features are just exemplary, any case of configuring a common application to be different per mode is applicable to the present embodiment.

For instance, when the application function is different, a photographing function is allowed to a camera in a private mode but may not be allowed in a business mode. In another instance, when an authority of access to an application is different, a phonebook provides a counterpart name, a phone number and a personal email address in a private mode and can further provide a company email address, a rank, a department and an approval authority information in a business mode.

This is explained in detail with reference to FIG. 10C as follows. For clarity and convenience of the following description, assume that a plurality of modes include a private mode and a business mode.

Figure 10C:
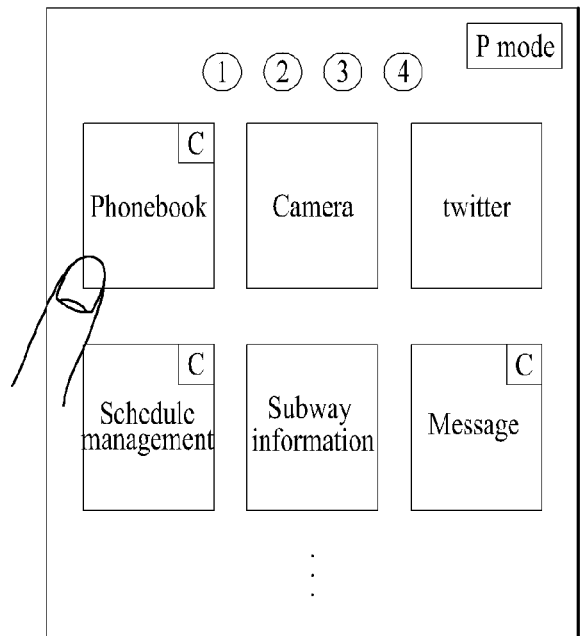
Figure 10C:
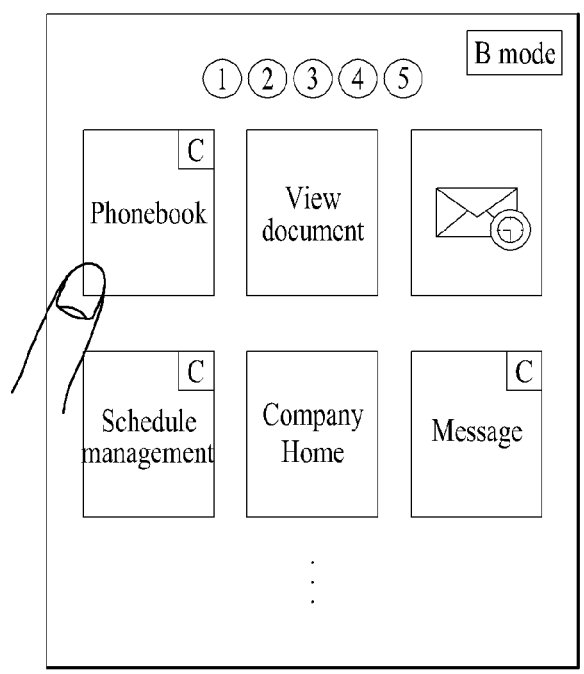

Referring to FIG. 10C, the mobile terminal 100 can receive an input of an execution command signal for executing a phonebook (i.e., an example of a common application) from a user.

The mobile terminal 100 determines a mode activated at the input timing point of the execution command signal. If a private mode is currently activated, the mobile terminal 100 executes the phonebook in accordance with a feature corresponding to the private mode and then displays an executed screen of the phonebook (cf. FIG. 6A or FIG. 9A(a)). On the contrary, if a business mode is activated, the mobile terminal 100 executes the phonebook in accordance with a feature corresponding to the business mode and then displays an executed screen of the phonebook (cf. FIG. 6B or FIG. 9A(b)).

For instance, a case that a security of an application is different is explained as follows. First of all, when attempting to execute a common application in a first mode, an authentication procedure is not requested or a low-level security set authentication information needs to be input. Yet, when attempting to execute a common application in a second mode, an authentication procedure is requested or a high-level security set authentication information should be input. In doing so, the application execution can include an output of content or data associated with the application as well as an executed screen display of the application.

According to a sixth embodiment, a plurality of modes can be discriminated from each other using user information corresponding to the modes, respectively. In this instance, the user information can include a user name (or title), a user image, a user phone number, a user email address, a user blog address and the like.

For instance, first and second user information different from each other can be set for first and second modes, respectively. In particular, when a first phone number and a second phone number (e.g., dual SIM) are assigned to the mobile terminal 100, the first phone number and the second phone number can be set for the first mode and the second mode, respectively.

In the above description, the definitions of the modes mentioned in the disclosure are explained. In addition, when a plurality of modes exist, the method of discriminating a plurality of the modes is explained as well.

According to a seventh embodiment, each of a plurality of modes can be discriminated by an application group including at least one application executed in the corresponding mode.

For instance, when at least one application is executable in each of a plurality of modes, the controller 180 can configure an application group including executable application(s) per mode. Moreover, the application group can be configured in accordance with an application type as well as the corresponding mode. For example, if an application type is a call, call related applications are included in the corresponding application group. If an application type is a camera, camera related applications can be included in the corresponding application group.

Moreover, the mobile terminal 100 displays a per-mode group identifier corresponding to a per-mode application group on the screen. If a specific group identifier is selected, the mobile terminal 100 can display indicators of applications belonging to the corresponding application group or can switch a current mode to a mode corresponding to the specific group identifier (assuming that it is not a currently activated mode).

According to an embodiment of the present invention, when implementing a plurality of modes, the mobile terminal 100 can display information corresponding to each of a plurality of the modes and enables information corresponding to one of the modes to be shared with other modes.

In the following description, a method of sharing information with a plurality of modes according to an embodiment of the present invention is explained in detail with reference to the accompanying drawings.

Figure 11:
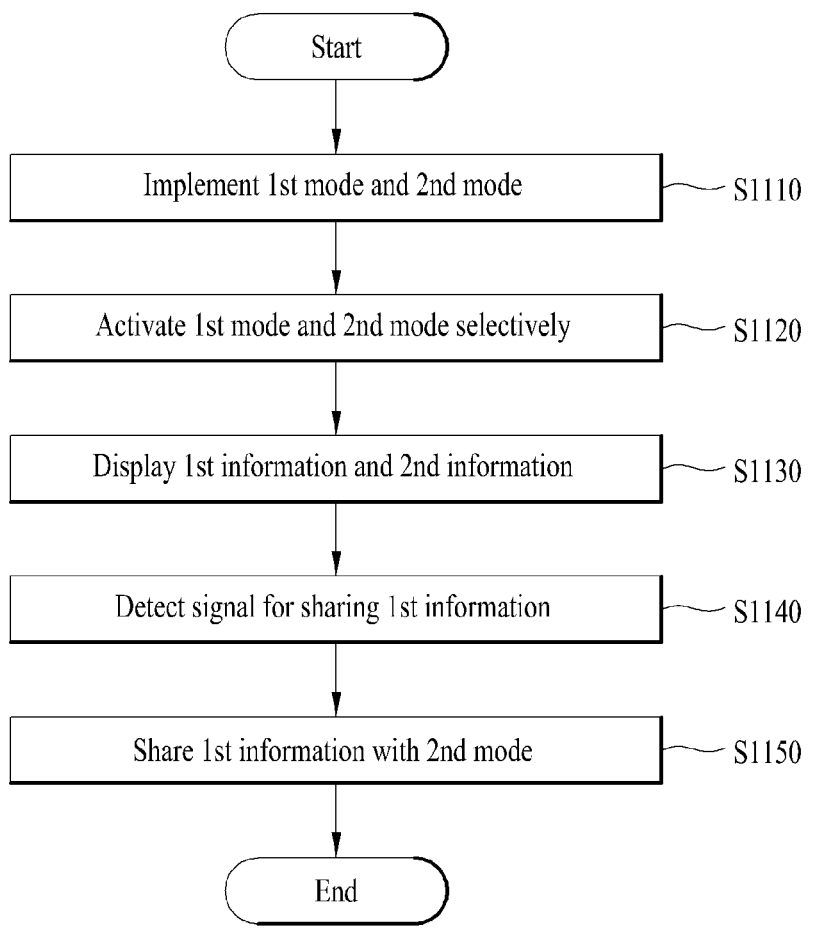
FIG. 11 is a flowchart for a method of sharing information in a mobile terminal according to one embodiment of the present invention.

FIG. 11 is a flowchart for a method of sharing information in a mobile terminal according to one embodiment of the present invention. For clarity and convenience of the following description, a plurality of modes includes a first mode and a second mode. Of course, embodiments mentioned in the following description are applicable to a case of implementing at least two or more modes as well.

Referring to FIG. 11, the mobile terminal 100 implements a first mode and a second mode under the control of the controller 180 (S1110) and then selectively activates the implemented first or second mode (S1120). In particular, while the first mode and the second mode are implemented, the mobile terminal 100 can activate either the first mode or the second mode under the control of the controller 180.

In the implementing step S1110, if an operating system is designated per mode, the controller 180 can implement the first mode and the second mode using a first individual operating system and a second individual operating system (i.e., a first OS and a second OS in multi-OS) corresponding to the first mode and the second mode, respectively. If an operating system per mode is common, the controller 180 can implement the first mode and the second mode using a common operating system (i.e., a single OS).

In the activating step S1110, when executing a first application and a second application in the first mode and the second mode, respectively, the mobile terminal 100 can execute the first application in accordance with a feature corresponding to the first mode and is also able to execute the second application in accordance with a feature corresponding to the second mode. In this instance, each of the first and second applications can include an application (hereinafter named a common application) executable in common with the first and second modes. Alternatively, the first application can include an application (hereinafter named a first dedicated application) executable by being dedicated to the first mode and the second application can include an application (hereinafter named a second dedicated application) executable by being dedicated to the second mode.

For instance, assuming that a common application (e.g., a phonebook) is running in a private mode (e.g., example of the first mode) and a business mode (e.g., example of the second mode), the mobile terminal 100 can display a counterpart information list including counterpart information associated with a feature corresponding to the private mode (example of a first information) (1) and is also able to display a specific counterpart information including a data field corresponding to the business mode (example of a second information) (2).

In the following description, a mode activated by OS booting per multi-OS type (cf. FIGS. 4A to 4C) is explained in detail.

First of all, multi-OS types can include a first multi-OS type (e.g., Guest OS 1 and Guest OS 2 included: This type corresponds to a first scheme) and a second multi-OS type (e.g., Host OS and Guest OS: This type corresponds to a second scheme.). Assume that Guest OS 1 or Host OS corresponds to a private mode. In addition, assume that Guest OS 2 or Guest OS corresponds to a business mode.

According to the first multi-OS type, if the hypervisor included in the controller 180 is driven, the mobile terminal 100 can boot Guest OS 1 and Guest OS 2 simultaneously or sequentially. If a specific one of a private mode and a business mode is selected by a user or the controller 180, the mobile terminal 100 can activate the specific mode on the Guest OS corresponding to the selected specific mode. Meanwhile, when the specific mode selecting step is omitted, the mobile terminal 100 can activate the private mode using the Guest OS 1 designated as default.

According to the second multi-OS type, the mobile terminal 100 preferentially boots the Host OS corresponding to the private mode and can then preload the Guest OS corresponding to the business mode, under the control of the controller 180. The mobile terminal 100 activates the private mode on the Host OS. When the pre-loaded Guest OS is booted, the mobile terminal 100 can activate the business mode on the Guest OS. Meanwhile, the mobile terminal 100 can post-load the Guest OS.

In doing so, when pre-loading the Guest OS, an initial OS booting takes a considerable time. Yet, because two operating systems are already booted after completion of the booting, a mode switching can be quickly performed. When post-loading the Guest OS, an initial OS booting is quickly performed. Yet, when switching a current mode to a mode corresponding to the Guest OS, it may take a considerable time for a mode switching due to the time consumption attributed to the Guest OS booting.

Referring now to FIG. 11, in the activating step S1110, the mobile terminal 100 can activate either the first mode or the second mode in accordance with a user selection or a prescribed reference when an operating system is booting, under the control of the controller 180.

For instance, when the single OS is used, any one of the first and second modes can be activated in accordance with the single OS booting. In another instance, when the multi-OS is used, a mode selected by a user from the first mode and the second mode or a firstly booting completed one of the first mode and the second mode is activated in accordance with the simultaneous booting of the multi-OS or a mode corresponding to the preferentially booted OS in accordance with the sequential booting of the multi-OS can be activated.

In particular, when the sequential booting of the multi-OS is used, the mobile terminal 100 can preferentially boot the OS, which meets a prescribed condition, under the control of the controller 180. For instance, the controller 180 can preferentially boot the OS that meets one of the conditions such as an OS having a preferential booting order, an OS designated by a user to be preferentially booted and an OS supporting a mode corresponding to a current terminal status. In particular, if a current terminal location corresponds to a specific place corresponding to a specific mode or a current hour belongs to a specific time corresponding to a specific mode, the controller 180 can preferentially boot the OS for operating the specific mode. Moreover, the controller 180 can preferentially activate the mode corresponding to the preferentially booted OS.

When implementing the first mode and the second mode, the mobile terminal 100 displays a first information (hereinafter named a first mode information) of the first mode and a second information (hereinafter named a second mode information) corresponding to the second mode using the display unit 151, under the control of the controller 180 (S1130).

In this instance, the mode information can include information on a mode currently implemented in the mobile terminal 100. In particular, the mode information can be displayed irrespective of a presence or non-presence of activation of the corresponding mode if the corresponding mode is currently implemented.

For instance, mode information can be displayed on one of a home screen of a corresponding mode (e.g., list of applications running in the corresponding mode, standby screen of the corresponding mode, etc.), an executed screen of a specific application when executing the specific application, a display screen of a specific content/data when outputting the specific content/data, a webpage provided by a specific website when accessing the specific website and the like.

Moreover information can include an application running in a corresponding mode and is also able to include a content or data related to the application running in the corresponding mode. Moreover, various kinds of information can be included in the application as well as a program corresponding to the application. For instance, when an application running in a corresponding mode is an application for a communication with a counterpart, information (e.g., phone number, email address, messenger ID, etc.) on a communication-available counterpart or a communication-complete counterpart can be included in the application. In addition, information used for the setting of the application, identification information (e.g., name, representative icon, etc.) of the application, address information on a server of the application and the like can be included in the application.

In the displaying step S1130, the mobile terminal 100 can display the first information and the second information on different regions, respectively. In the following description, assume that the first information and the second information are displayed on a first region and a second region, respectively.

Regarding the mode information display, mode activation is described as follows.

First of all, in the activating step S1120, the mobile terminal 100 can activate either the first mode corresponding to the first information or the second mode corresponding to the second information.

For instance, the mobile terminal 100 activates a mode corresponding to information displayed on a region that has received an input of a touch action from a user (1), activates a mode corresponding to information input by a user (2), activates a mode of which corresponding information is changed (e.g., added, deleted, edited, etc.) (3), or activates a mode in which a running state of an application is changed (4). Moreover, the mobile terminal 100 activates a mode corresponding to a bigger one of the first region and the second region (5) or can activate a mode corresponding to a main display region selected from the first region and the second region (6).

Of course, in the activating step S1120, the mobile terminal 100 activates a mode for receiving an input of an activation command from a user or can activate a mode set as default for activation, irrespective of the mode information display.

When receiving an input of a touch action on the second region in the first mode activate state (i.e., this case corresponds to the case (1) among the above-enumerated cases (1) to (6), and optionally, the rest of the cases (2) to (6) are applicable), the mobile terminal 100 deactivate the first mode but activate the second mode in a manner of switching the first mode to the second mode under the control of the controller 180. In particular, the controller 180 determines whether a conditional access is set on the second mode. If the conditional access is set on the second mode, the controller 180 can switch the first mode to the second mode only if an authentication procedure is validly performed.

For instance, if the first mode and the second mode are set to a private mode and a business mode, respectively, the conditional access is set. Thereafter, if the authentication procedure for the switching (or entry) to the second mode is successful, the authentication procedure can be skipped when performing a re-switching (or re-entry) to the second mode in the future. For instance, when performing a re-switching for a predetermined period of time (e.g., duty hours, a day, a week, etc.), a re-switching between a terminal-on and a terminal-off, or the like, the authentication procedure can be skipped.

In the following description, the mode switching in multi-OS environment is explained in detail. First of all, according to a first or second multi-OS scheme, while a private mode or a business mode is activated, if a command signal for a mode switching is detected, the mobile terminal 100 can activate the business mode or the private mode.

In the following description, various kinds of display schemes of the first information and the second information are explained in detail. The displays of the first and second information can be described in association with the first and the second region on which the first information and the second information are displayed, respectively.

First of all, in the displaying step S1130, the mobile terminal 100 can adjust at least one of a size, a color, a position and a display scheme of each of the first and second information (or the first and second regions) to correspond to a prescribed reference under the control of the controller 180. For instance, based on a user selection, the controller 180 can determine a size, color, position or display scheme of each of the first and second information. Therefore, a user can freely control a display state of each of the first and second information.

Based on at least one of a use frequency (or activation frequency) of each of the first and second modes, the number of executable applications, a property of a currently running application and a presence or non-presence of an application execution, the controller 180 can determine a size, color, position or display scheme of each of the first and second information. In particular, the higher the use frequency gets, the bigger the size of the information displayed region becomes. In addition, it can differentiate a color (e.g., a color if a color per application is designated) of the corresponding information in accordance with a kind of a currently running application. When a currently running application is a sound-oriented application (i.e., a display is not a major concern) (e.g., music play application, voice call application, radio application, etc.), a size of information displayed region is set equal to or smaller than a predetermined reference (e.g., ¼ of a total screen). When a currently running application is a display-oriented application (e.g., video play application, video cal application, TV application, etc.), a size of information displayed region can be set equal to or greater than a predetermined reference (e.g., ½ of a total screen).

In the displaying step S1130, when the first application and the second application are running in the first mode and the second mode, respectively, the mobile terminal 100 can display the running states of the first and second applications as the first and second information, respectively, under the control of the controller 180. For instance, the running state of the application can include an output state of a content or data in accordance with the execution of the corresponding application.

In the displaying step S1130, the mobile terminal 100 controls the display unit 151 to display the information related to the first application executable in the first mode as the first information and is also able to control the display unit 151 to display the information related to the second application associated with a first one of at least one or more applications executable in the second mode as the second information, under the control of the controller 180.

Moreover, if the first application is currently running, the mobile terminal 100 displays information related to the second application when receiving an input of a display command for displaying the information related to the second application from a user (1) or can display the information related to the second application automatically when executing the first application. In particular, in the case (2), it is unnecessary to receive an input of a separate action from a user.

In this instance, the information related to the application includes an executed screen (e.g., an output screen of a content or data related to an application) of the application when executing the application. If the application is not running yet, the information related to the application can include identification information (e.g., icon, name, etc.) indicating the corresponding application, an address information on a server of the corresponding application and the like.

The second application associated with the first application can mean that each of the first and the second applications is a common application in common with both of the first and second modes or can include an application having at least one similar or identical function. For instance, the common application means an application executable in common with the first mode and the second mode by differentiating its features (e.g., each of the first and second applications can include a phonebook application). In addition, the applications having the similar/identical function can mean that the functions performed when each application executes are similar or identical to each other, despite the applications themselves failing to be identical to each other (e.g., the first application is a call application, whereas the second application is a phonebook application).

In the following description, how to display the first information and the second information (i.e., displays of the first and second information) is explained in detail with reference to the accompanying drawings. For clarity and convenience of the following description, assume that a first mode and a second mode are a private mode and a business mode, respectively. In addition, assume that the first information and the second information are a private information and a business information, respectively.

Figure 12A:
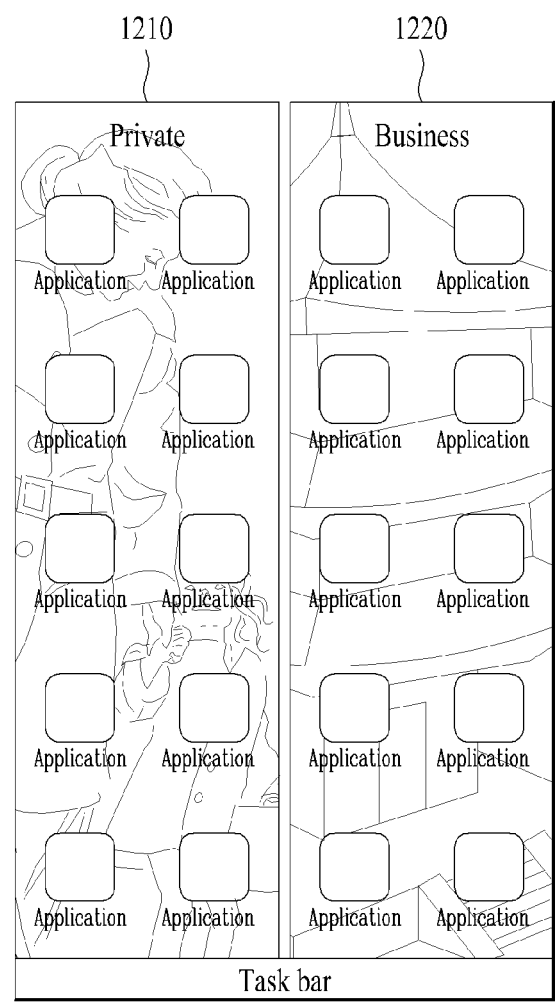
FIGS. 12A to 12C are first diagrams for displaying a first information and a second information according to an embodiment of the present invention.
Figure 12B:
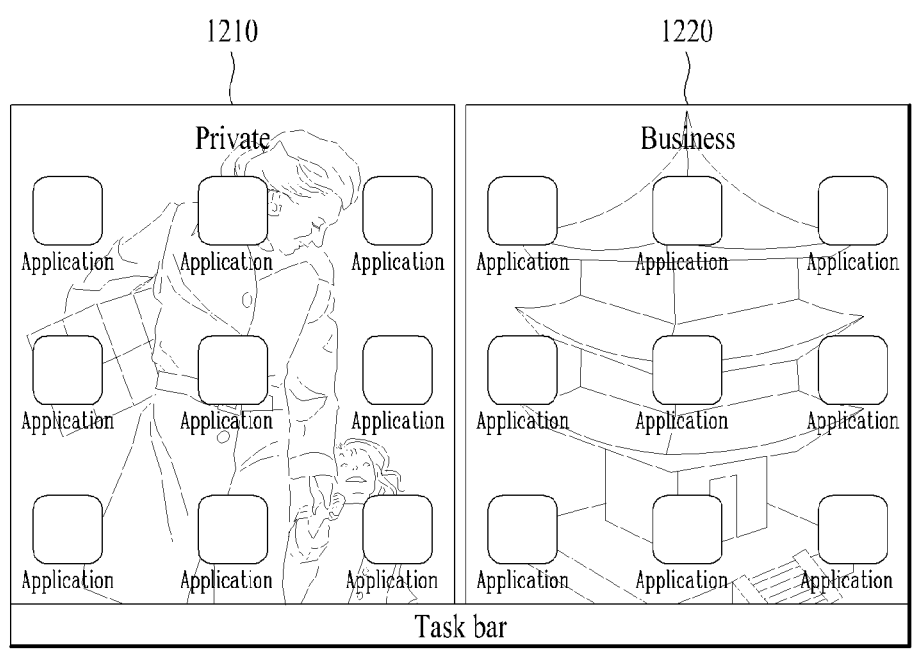
Figure 12C:
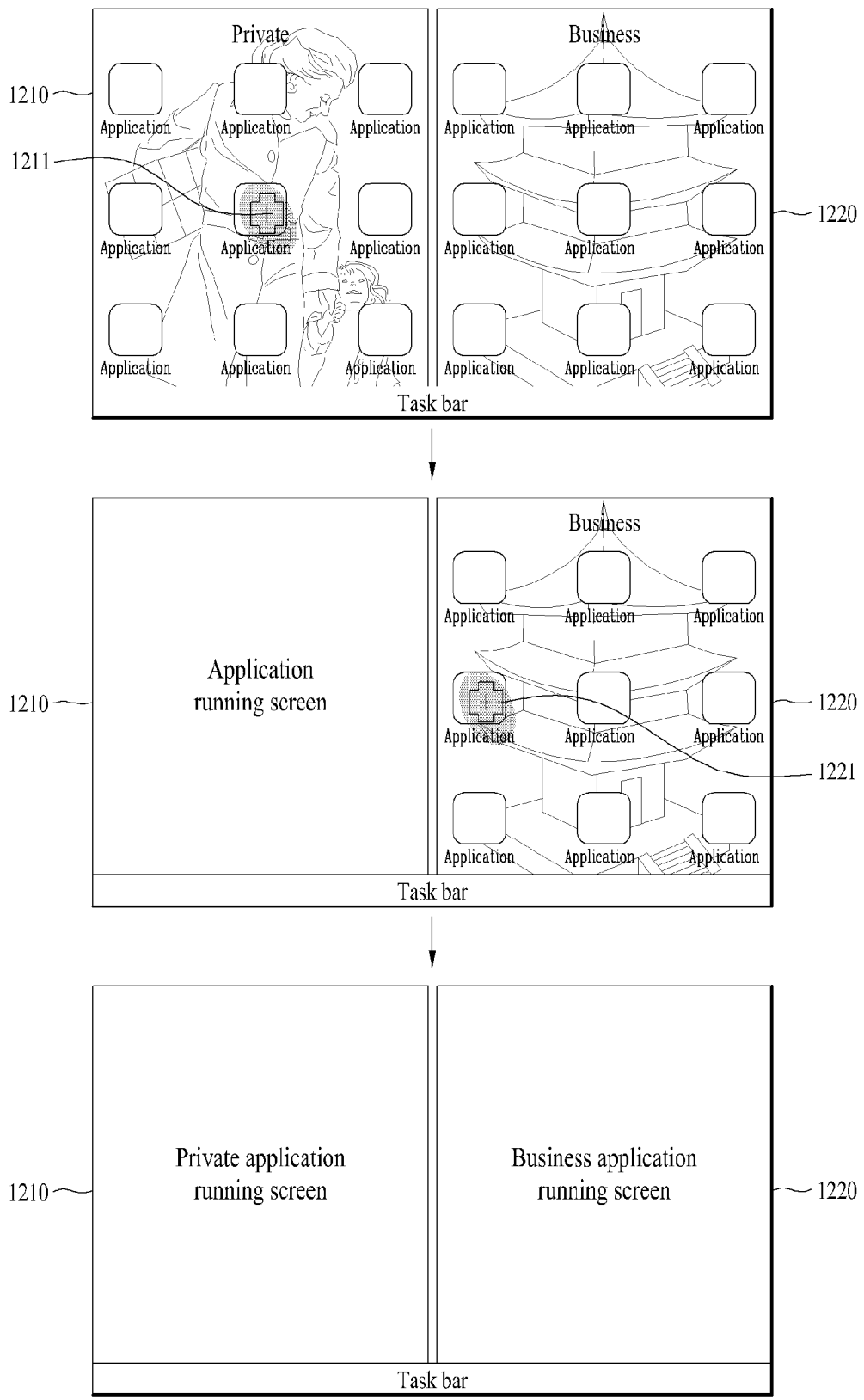

FIGS. 12A to 12C are first diagrams for displaying a first information and a second information according to an embodiment of the present invention. For clarity and convenience of the following description, assume that a private information is the information on an application executable in a private mode by being displayed on a home screen (hereinafter named a private home screen) of the private mode. In addition, assume that a business information is the information on an application executable in a business mode by being displayed on a home screen (hereinafter named a business home screen) of the business mode.

Referring to FIGS. 12A and 12B, the mobile terminal 100 partitions a total screen into two regions including a first region 1210 and a second region 1220 and then displays a private home screen and a business home screen on the first region 1210 and the second region 1220, respectively. In particular, icons indicating applications executable in the private mode are included in the private home screen. In addition, icons indicating applications executable in the business mode can be included in the business home screen.

Specifically, FIGS. 12A and 12B show portrait and landscape views, respectively. If the display unit 151 is turned by 90 degrees in FIG. 12A, a corresponding screen configuration can be changed into a screen configuration shown in FIG. 12B, and vice versa.

Referring to FIG. 12C, when receiving an input of a selection signal for a first icon 1211 among icons displayed on the private home screen, the mobile terminal 100 activates the private mode and can display a running state of the first application indicated by the first icon 1211 on a first region 1210. Subsequently, when receiving an input of a selection signal for a second icon 1221 displayed on the business home screen, the mobile terminal 100 activates the business mode and can display a running state of a second application indicated by the second icon 1221 on a second region 1220.

In particular, the mobile terminal 100 can execute each of a plurality of applications respectively belonging to different modes and can display each running state on the corresponding region. Of course, the above-described embodiment is applicable to a case of running a plurality of applications belonging to one mode.

Figure 13A:
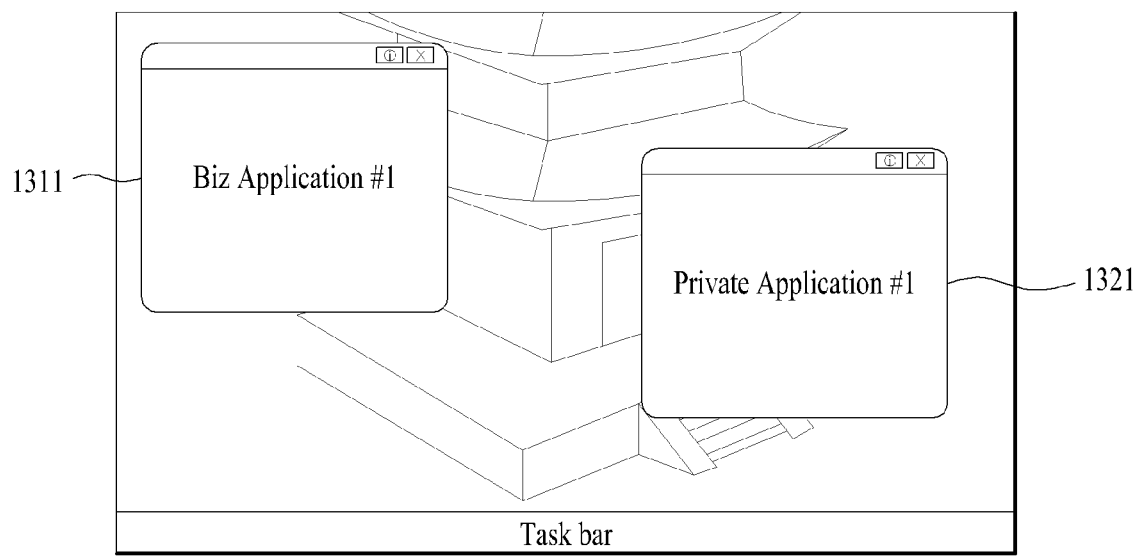
FIGS. 13A to 13C are second diagrams for displaying a first information and a second information according to an embodiment of the present invention.
Figure 13B:
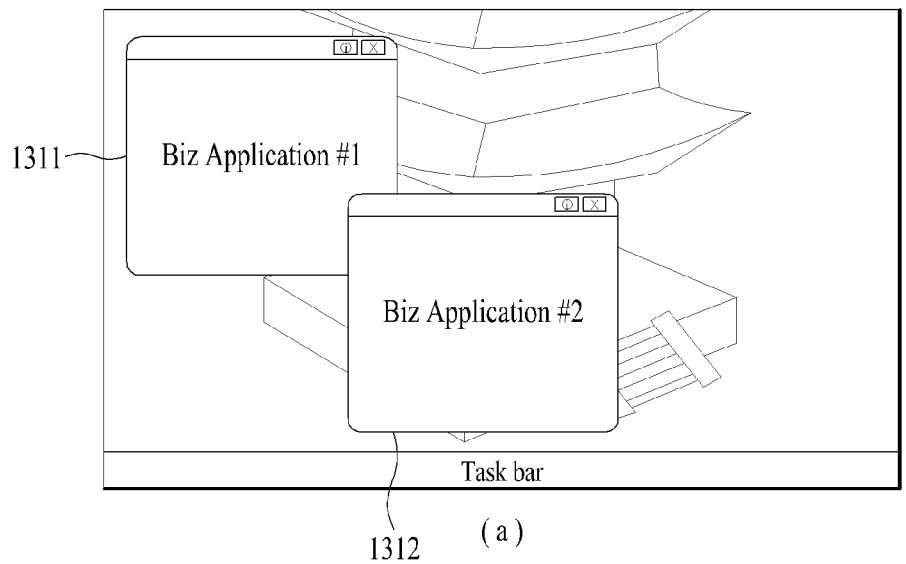
Figure 13B:
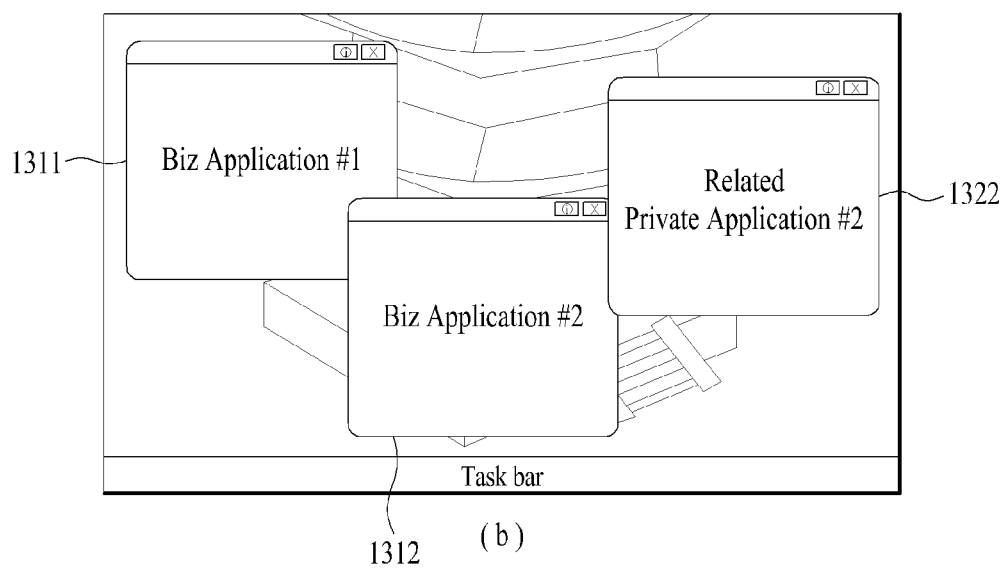
Figure 13C:
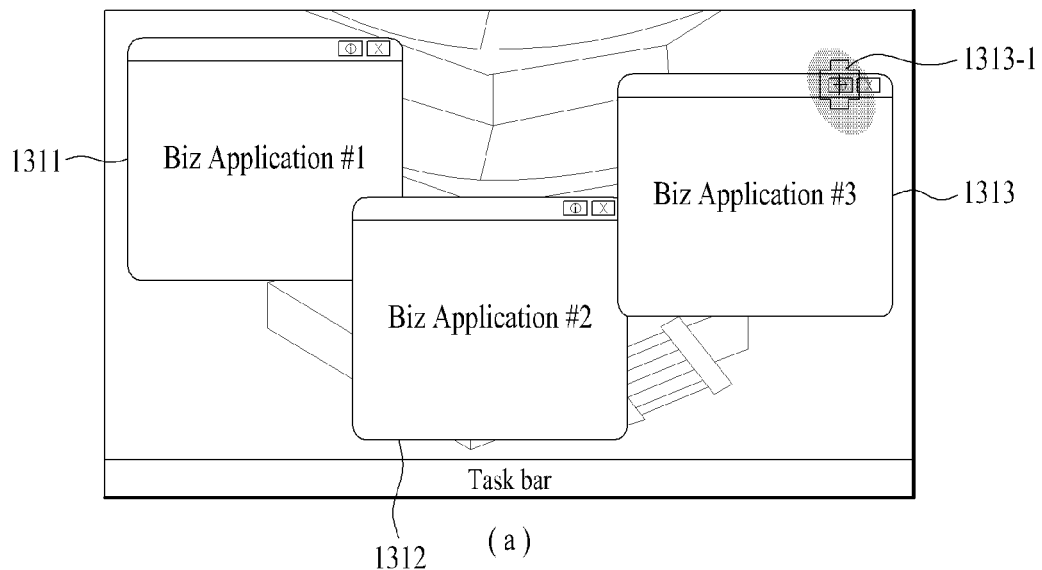
Figure 13C:
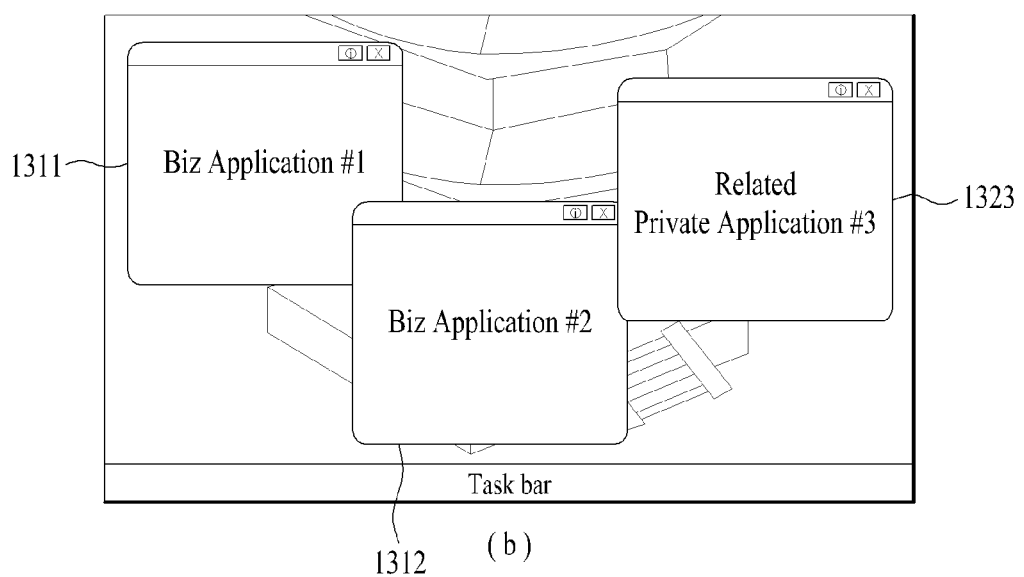

FIGS. 13A to 13C are second diagrams for displaying a private information and a business information according to an embodiment of the present invention. For clarity and convenience of the following description, assume that a mode information is displayed by a window scheme. In addition, assume that a running state of an application in the course of running in a corresponding mode is displayed as the mode information. Of course, information of any type related to a corresponding mode is displayable as the mode information as well as the running state of the application.

Referring to FIG. 13A, when an application 1-1 and an application 2-1 are executed in a business mode and a private mode, respectively, the mobile terminal 100 displays a running state of the application 1-1 and a running state of the application 2-1 on a window 1-1 1311 and a window 2-1 1321, respectively.

Referring to FIG. 13B, the mobile terminal 100 can run a plurality of applications (e.g., application 1-1 and application 1-2) in a business mode (i.e., a sort of multitasking). In doing so, the running state of the application 1-1 and the running state of the application 1-2 can be displayed on the window 101 1311 and the window 1-2 1312, respectively (FIG. 13B (a)). In addition, the mobile terminal 100 can display information, which corresponds to an application 2-2 associated with an application currently running in a business mode among application(s) executable in a private mode, on a window 2-2 1322 (FIG. 13B(b)). Regarding an application associated with a prescribed application, the former description can be referred to.

In this instance, the information corresponding to the application 2-2 can include a running state of the application 2-2 and may include identification information (e.g., icon, name, etc.) of the application 2-2, address information (e.g., market address for providing the application 2-2, etc.) of the application 2-2 and the like. Specifically, in the latter case, the application 2-2 is executable if the corresponding identification information is selected by a user. Alternatively, if the corresponding address information is selected by a user, the application 2-2 can be provided by a corresponding market.

For instance, when an application currently running in a business mode is one of a voice call application, an email application, a message application and the like, the application 2-2 can include a phonebook application. In another instance, when an application currently running in a business mode is one of a document search application, the application 2-2 can include one of an internet application (for searching for related documents on Internet), a dictionary application and the like.

Referring to FIG. 13C, when running applications 1-1 to 1-3 in a business mode, the mobile terminal 100 can display the running states of the applications 1-1 to 1-3 on the windows 1-1 to 1-3 1311 to 1313, respectively (FIG. 13C(a)). When receiving an input of an additional run command for a random one (hereinafter, assumed as the window 1-3 1313) of the windows 1-1 to 1-3 1311 to 1313 from a user, the mobile terminal 100 stops displaying the window 1-3 1313 and can display the information, which corresponds to the application 2-3 associated with the application 1-3 among the application(s) executable in the private mode, on the window 2-3 1323 (FIG. 13C(b)). In this instance, the window 1-3 1313 can be changed into the window 2-3 1323. In particular, the displayed information varies only. In addition, a position, size and display form of the window remain identical or can become different.

Besides, the embodiment corresponding to FIG. 13B is applicable to a case that a business mode and a private mode are switched to each other.

Figure 14A:
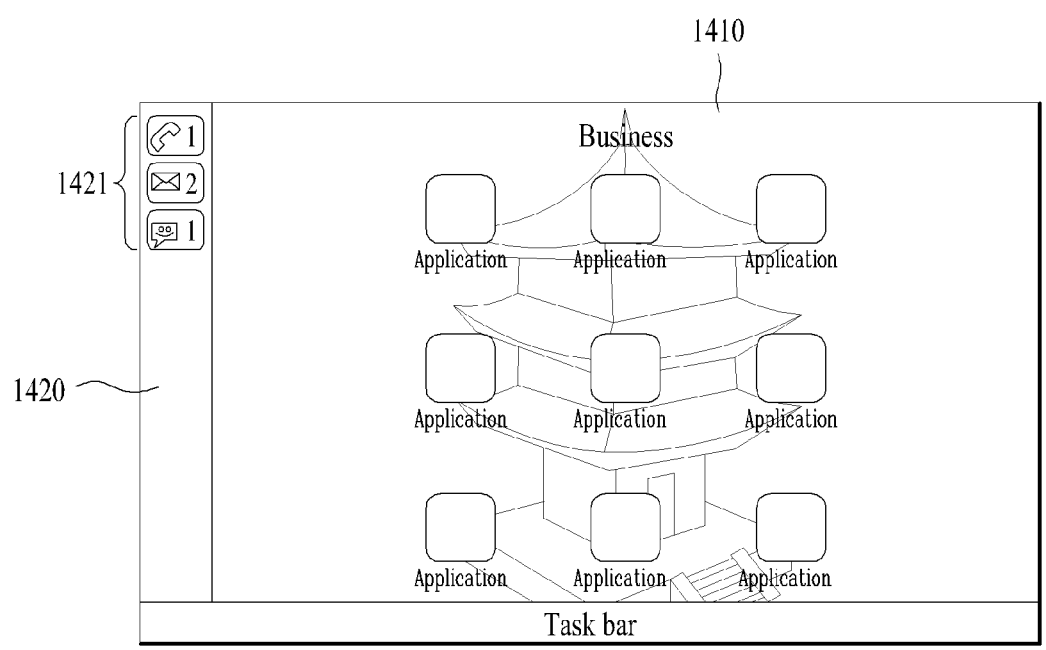
FIGS. 14A and 14B are third diagrams for displaying a first information and a second information according to an embodiment of the present invention.
Figure 14B:
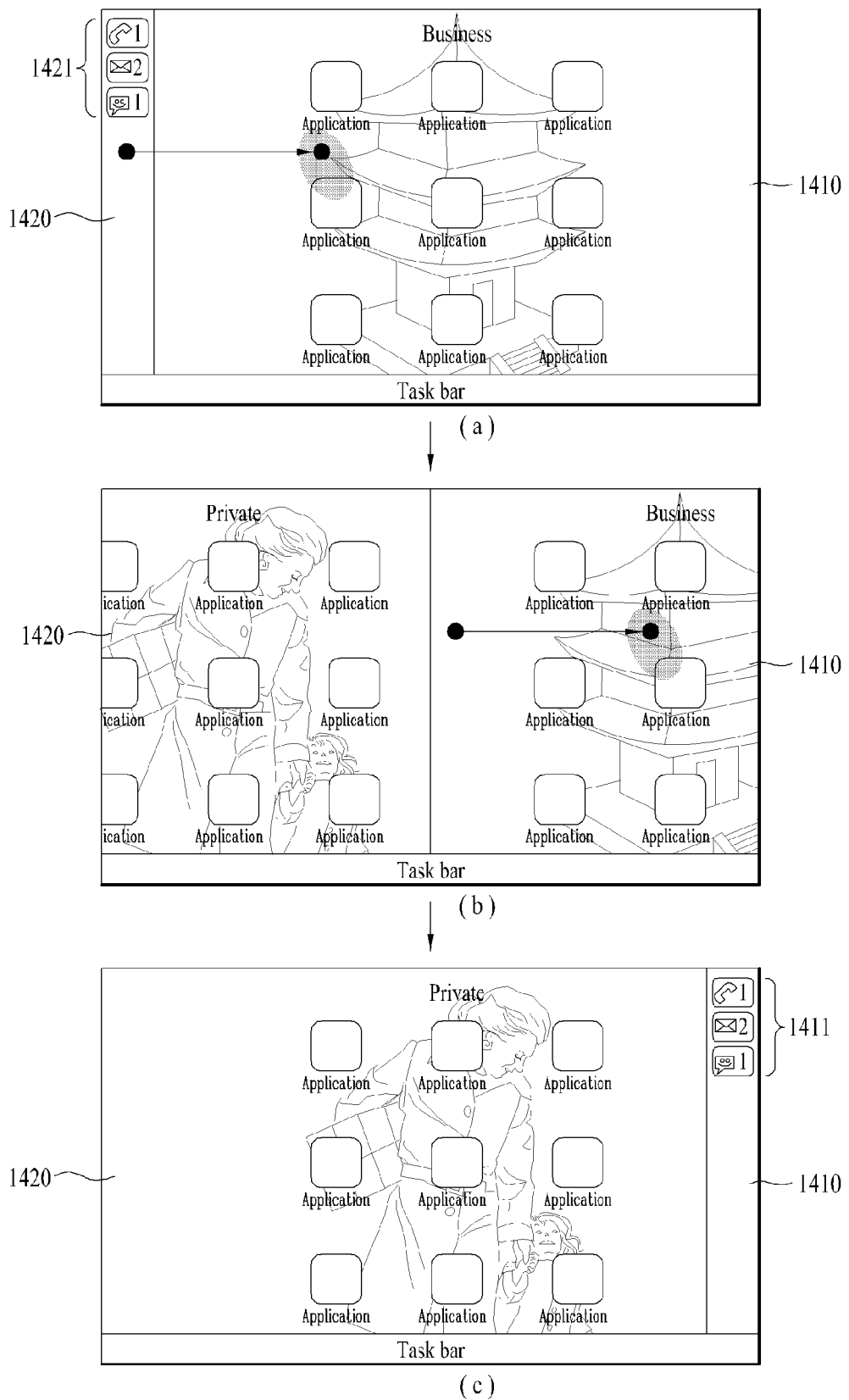

FIGS. 14A and 14B are third diagrams for displaying a first information and a second information according to an embodiment of the present invention. For clarity and convenience of the following description, assume that one of business information and private information is displayed on a main display region while the other is displayed on a subsidiary display region. For instance, the main display region is the region that occupies most of a total screen. In addition, the subsidiary display region can include a partial region of the rest region of the total screen except the main display region.

Referring to FIG. 14A, the mobile terminal 100 displays a business information 1410 on a main display region and can display a private information 1420 on a subsidiary display region. In this instance, a mode corresponding to the information displayed on the main display region can be regarded as a currently activated mode.

In particular, the business information 1410 of the main display region can include one of a home screen (e.g., application list or application icons are displayed) of the corresponding mode, a running state of an application currently running in the corresponding mode and the like.

The private information 1420 of the subsidiary display region can include information 1421 on events occurring in the corresponding mode. For instance, the event occurring in the corresponding mode can include at least one of a message transceiving event, a voice call transceiving event, a video call transceiving event, an email transceiving event, a schedule alarming event and the like. In addition, the information on the event can include an occurrence hour of the corresponding event, the number of occurrences of the corresponding event, the number of unconfirmed checks, counterpart information and the like.

When information on a specific event is selected in FIG. 14A, the mobile terminal 100 runs a specific application corresponding to the specific event in a private mode. Subsequently, the mobile terminal 100 displays the private information 1420, which indicates a running state of the specific application, on the main display region (1). Alternatively, the mobile terminal 100 partitions a screen into two regions equal to each other in size and can then display the business information 1410 and the running state (e.g., example of the private information 1420) of the specific application on the first region and the second region, respectively (cf. FIG. 12A, FIG. 12B). If the running of the specific application is terminated, the mobile terminal 100 can return to the state shown in FIG. 14A automatically or in accordance with a user selection.

Referring to FIG. 14B, the mobile terminal 100 can receive an input of a touch & drag action from a first point of the subsidiary display region, on which the private information 1420 is displayed, to a second point of the main display region, on which the business information 1410 is displayed, from a user. In addition, the mobile terminal 100 can control a display of the business information 1410 and a display of the private information 1420 in proportion to a distance of the touch & drag.

For instance, if the touch & drag distance is smaller than a first reference (e.g., if the touch & drag distance does not exceed ⅓ of a total distance), a size of the subsidiary display region is enlarged and a size of the main display region can be reduced, in proportion to the touch & drag distance ($1^{st}$ state). In another instance, if the touch & drag distance is in a range between the first reference and a second reference (e.g., if the touch & drag distance lies between ⅓ and ⅔ of the total distance), the mobile terminal 100 stops the display of the main display region/subsidiary display region, partitions a total screen into two equal regions, and can then display the private information 1420 and the business information 1410 on the first region and the second region, respectively ($2^{nd}$ state). In another instance, if the touch & drag distance is equal to or greater than the second reference (e.g., if the touch & drag distance is over ⅔ of the total distance), the mobile terminal 100 can display the private information 1420 and the business information 1410 on the main display region and the subsidiary display region, respectively ($3^{rd}$ state).

When receiving a touch & drag action from the first region, on which the private information 1420 is displayed, to the second region, on which the business information 1420 is displayed, in the $2^{nd}$ state, the mobile terminal 100 can display the business information 1410 and the private information 1420 on the subsidiary display region and the main display region, respectively.

Figure 15A:
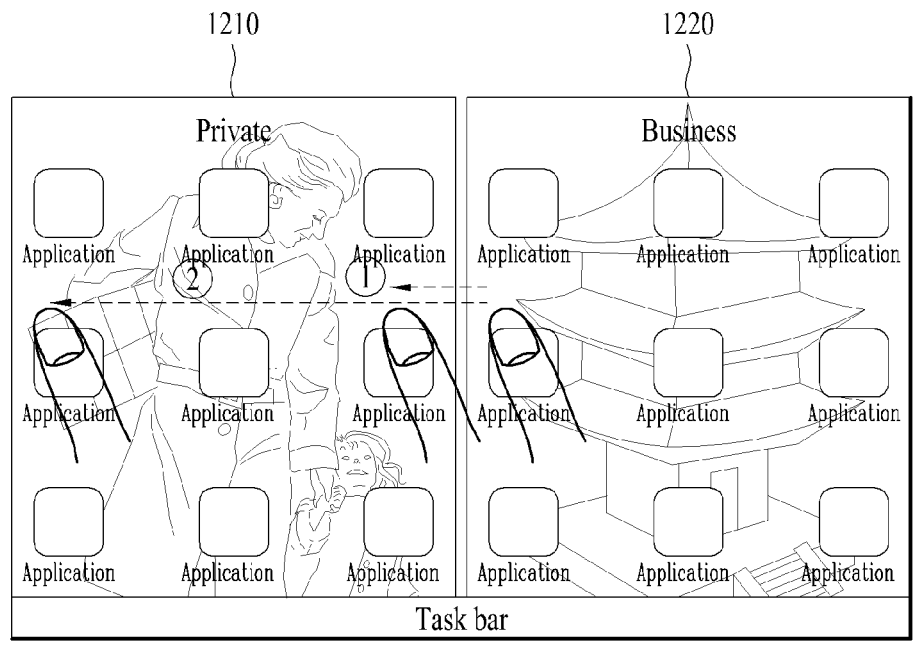
FIGS. 15A to 17C are first diagrams for controlling a first information and a second information to be displayed according to an embodiment of the present invention.

FIGS. 15A to 17C are first diagrams for controlling a first information and a second information to be displayed according to an embodiment of the present invention. Referring to FIG. 15A, while a private information 1210 and a business information 1220 are displayed on a first region and a second region, respectively (cf. FIG. 12B), the mobile terminal 100 can receive an input of a touch & drag action for changing a region size from a user.

Figure 15B:
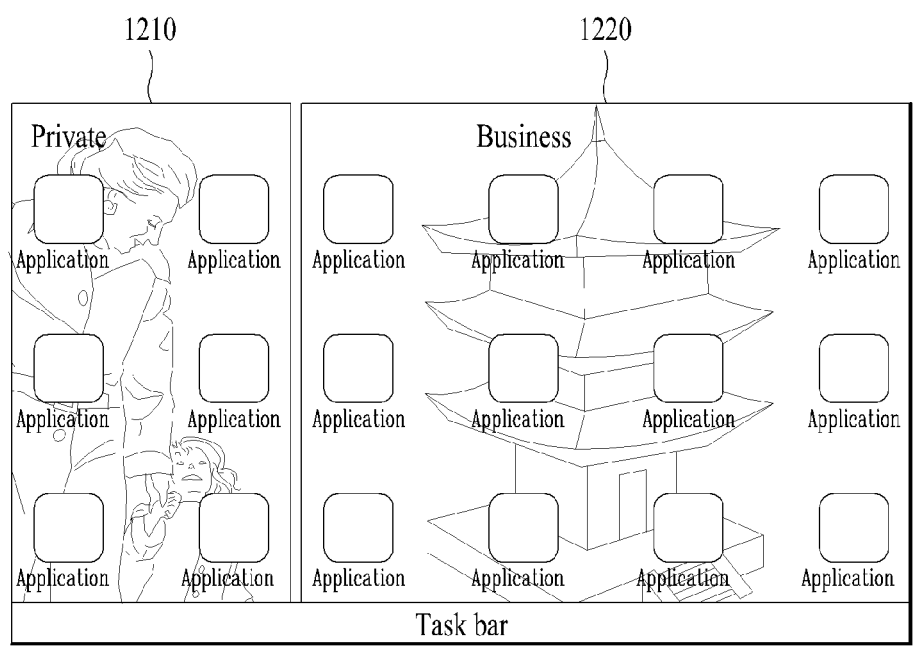
Figure 15C:
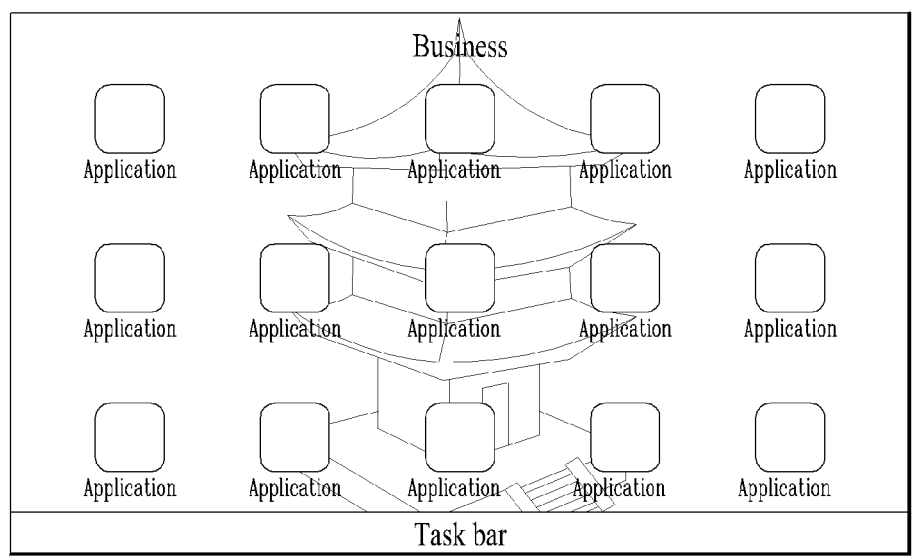

In particular, when receiving a touch & drag action ① of a first distance from the second region, on which the business information 1220 is displayed, to the first region, on which the private information 1210 is displayed, in FIG. 15A, the mobile terminal 100 enlarges a size of the second region to correspond to the first distance and can reduce a size of the first region to correspond to the first distance (FIG. 15B). In doing so, the information displayed within the corresponding region can be changed in accordance with the region size change. For instance, the number or sizes of application indicators can be changed by linking to the region size change.

When receiving a touch & drag action ① of a second distance (e.g., a distance from one point in the second region to a point in the vicinity of an opposing edge of the first region) from the second region, on which the business information 1220 is displayed, to the first region, on which the private information 1210 is displayed, in FIG. 15A, the mobile terminal 100 can display the business information 1220 on the total display region. In this instance, the private information 1210 is not displayed or can be displayed within the subsidiary display region. In addition, the business mode corresponding to the business information 1220 displayed on the total display region can be activated.

Figure 16A:
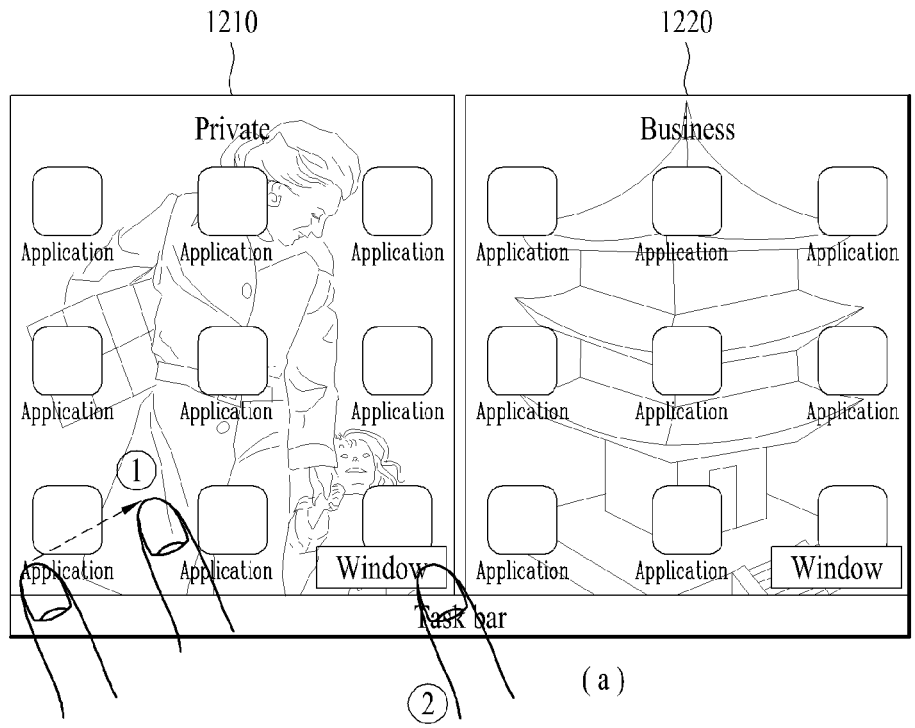
Figure 16A:
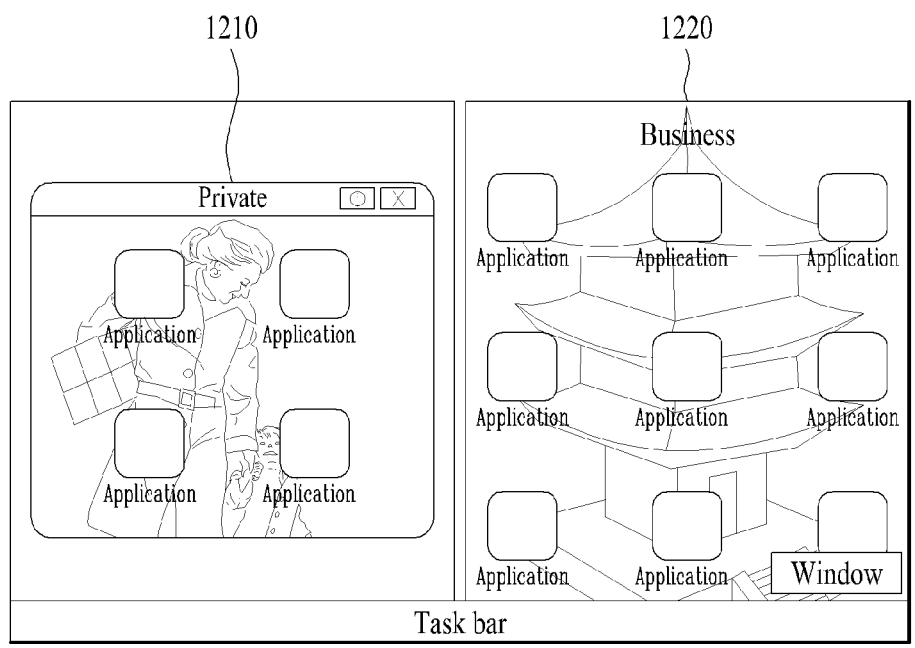

Referring to FIG. 16A, while a private information 1210 and a business information 1220 are displayed on a first region and a second region, respectively (cf. FIG. 12B), the mobile terminal 100 can receive an input action for changing information display scheme.

For clarity and convenience of the following description, assume a case that a display scheme is changed into a window scheme (cf. FIG. 13A). Of course, the display scheme can be changed into one of various display schemes including a main/subsidiary scheme (cf. FIG. 14A), a popup scheme and the like.

Figure 16B:
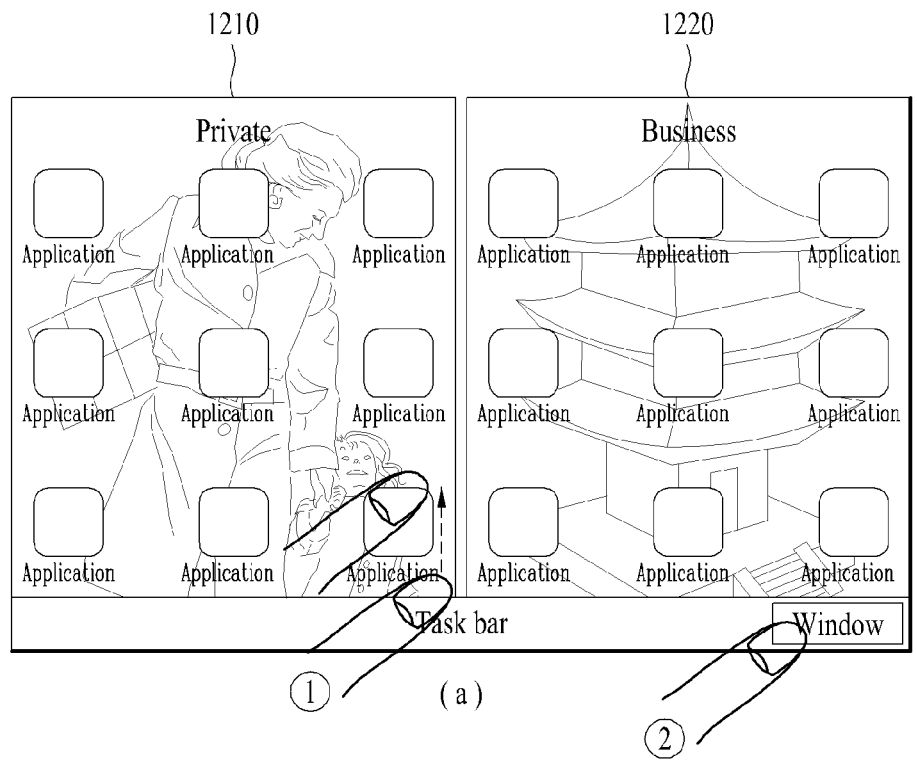
Figure 16B:
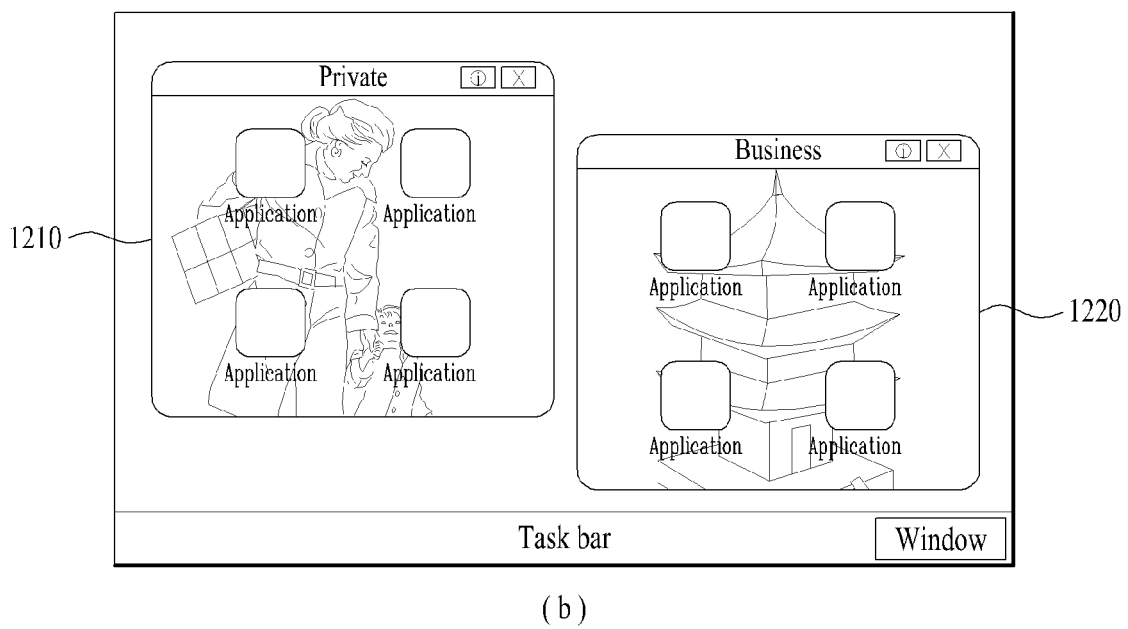

In particular, if the mobile terminal 100 receives an input of a touch & drag action (toward an inside) from one point within the first region, on which the private information 1210 is displayed, to another point (①) or a window key provided within the first region is selected (②), the mobile terminal 100 can display the private information 1210 by the window scheme (FIG. 16B). Of course, the above-described embodiment is applicable to the business information 1220 as well.

If the mobile terminal 100 receives an input of a touch & drag action (different from the ① shown in FIG. 16B) from a prescribe edge of a total screen to an inside in FIG. 16A (①) or a window key provided within the screen is selected (②), the mobile terminal 100 can display the private information 1210 and the business information 1220 by the window scheme (FIG. 16C). Of course, the user action for changing the information display scheme can include one of various actions as well as the action mentioned in the above embodiment.

Figure 17A:
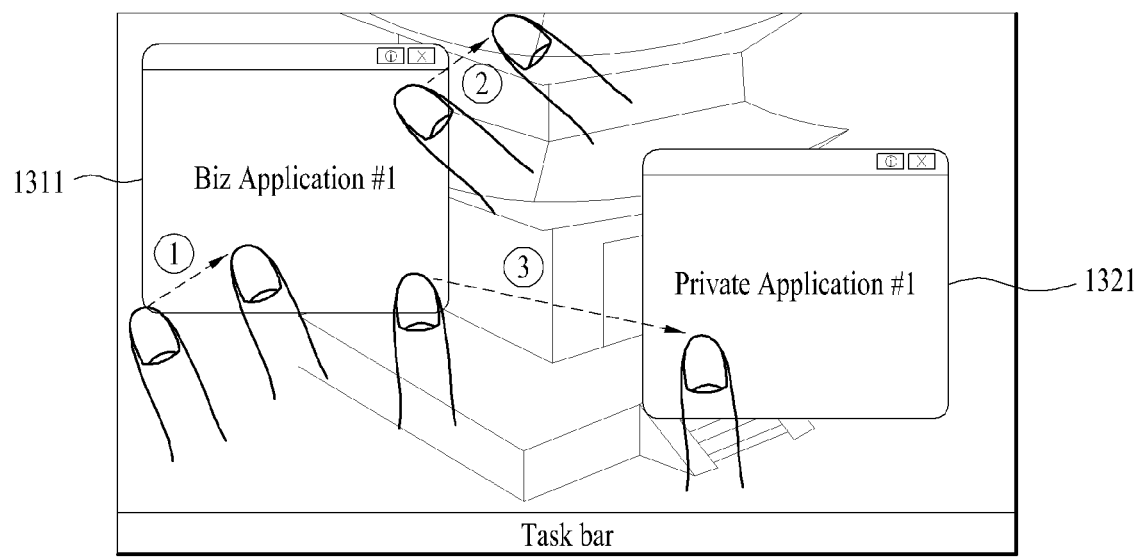

Referring to FIG. 17A, the mobile terminal 100 can receive an input of a user action to change a window size of a window 1-1 1311 for displaying a business information and a window size of a window 201 1321 for displaying a private information. For clarity and convenience of the following description, assume that the user action is a touch & drag action. Of course, the user action is non-limited by the touch & drag action. In addition, any action can be included in the user action as long as it can change a window size. Moreover, although embodiments of the window 1-1 1311 are mentioned in the following description, they are applicable to the window 2-1 1321 as well.

Figure 17B:
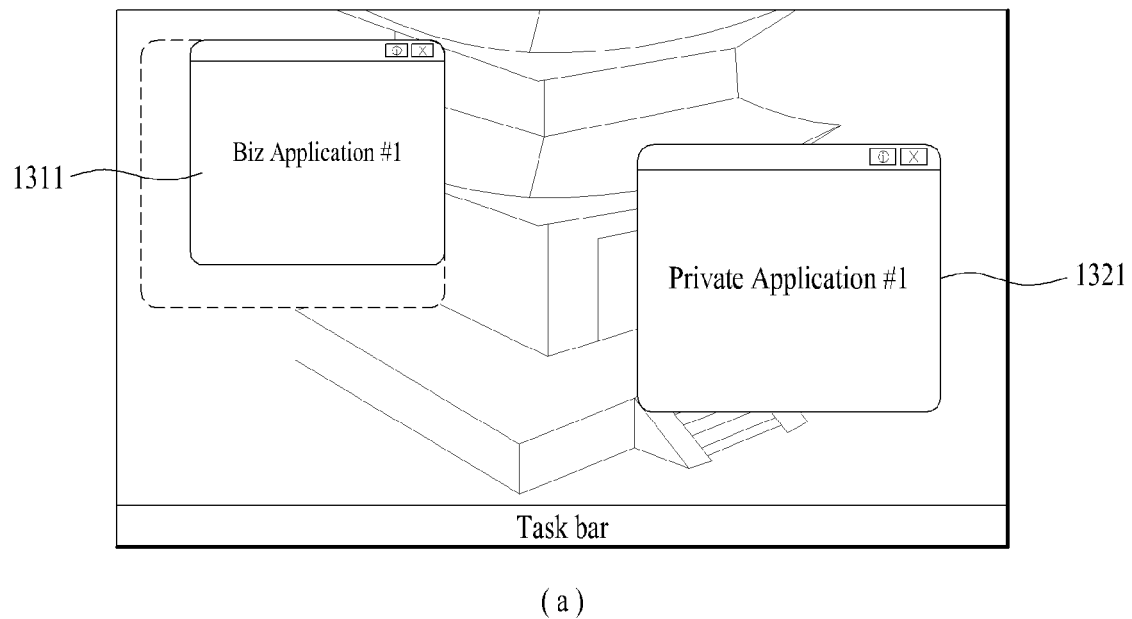
Figure 17B:
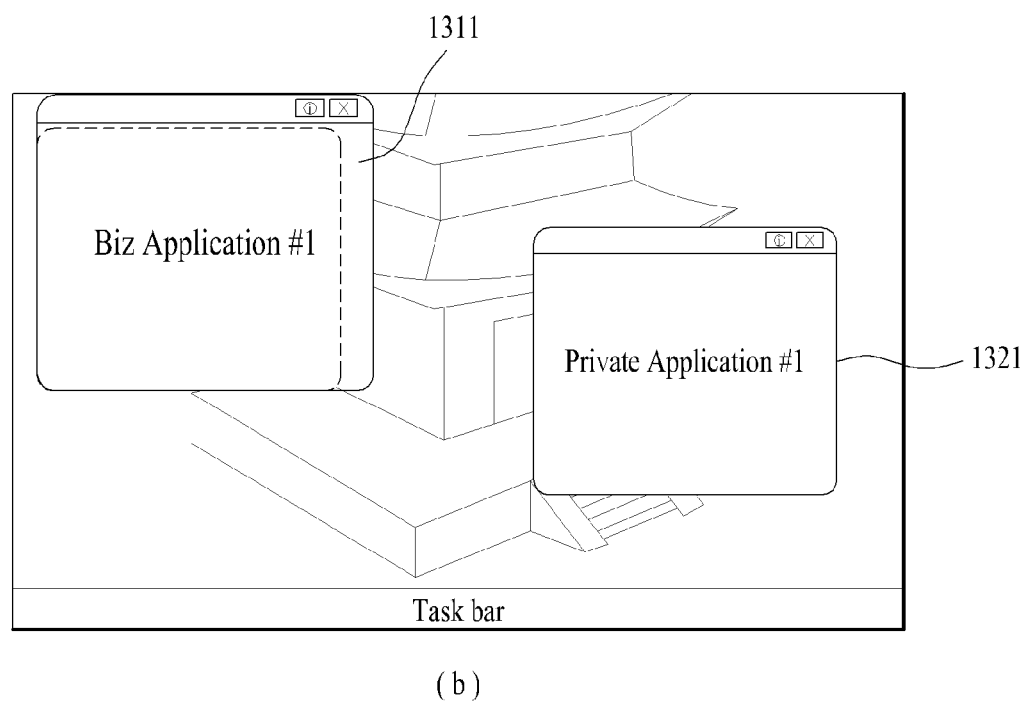

In particular, when receiving an input of a touch & drag on the window 1-1 1311, on which the business information is displayed, in an inner direction (①), the mobile terminal 100 can reduce a size of the window 1-1 1311 in proportional to a touch & drag distance (FIG. 17B(a)). When receiving an input of a touch & drag action in an outer direction (②), the mobile terminal 100 can enlarge a size of the window 1-1 1311 in proportion to the touch & drag distance (FIG. 17B(b)).

Figure 17C:
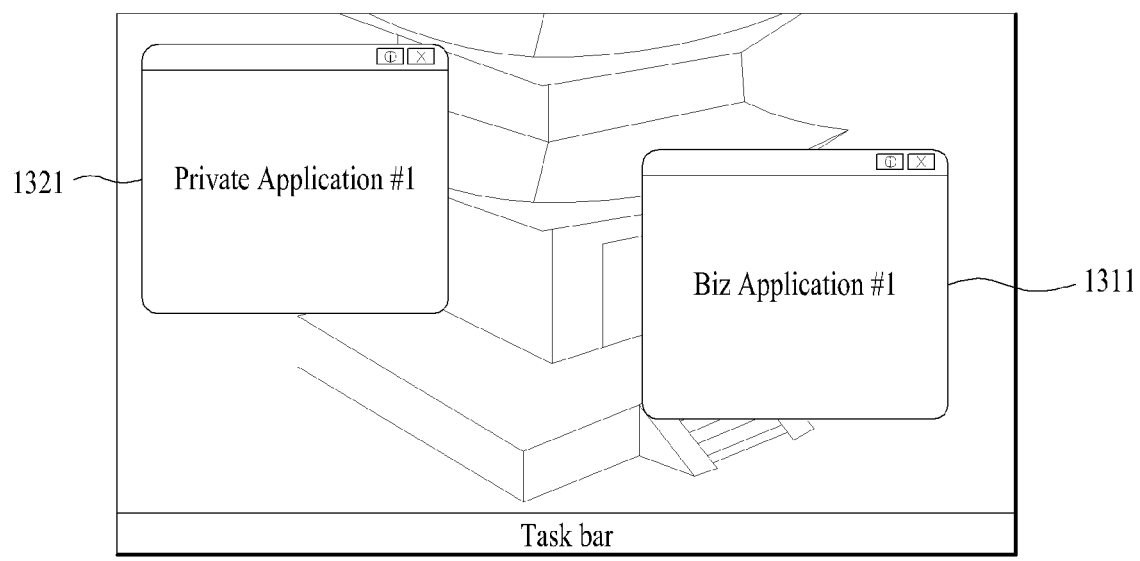

When receiving an input of a user action to change a position of the window 1-1 1311 and a position of the window 2-1 1321 in FIG. 17A, the mobile terminal 100 can display the window 1-1 1311 and the window 2-1 1321 by switching positions of the window 1-1 1311 and the window 2-1 1321 to each other (FIG. 17C).

Figure 18A:
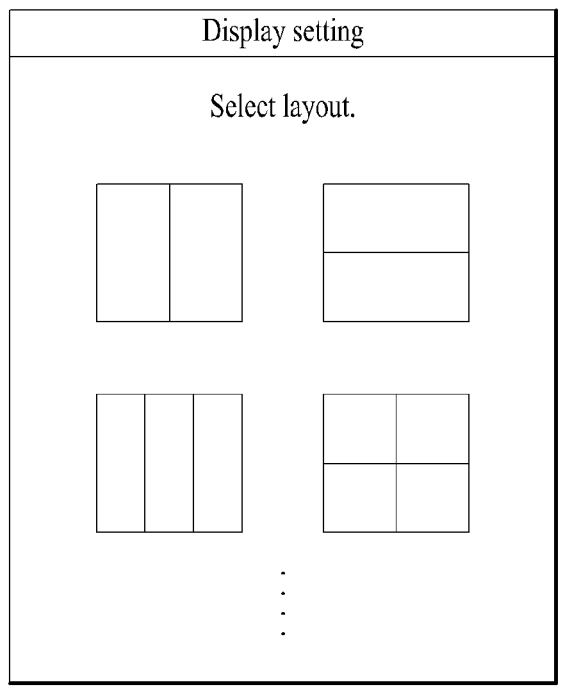
FIGS. 18A to 18F are second diagrams for controlling a first information and a second information to be displayed according to an embodiment of the present invention.
Figure 18A:
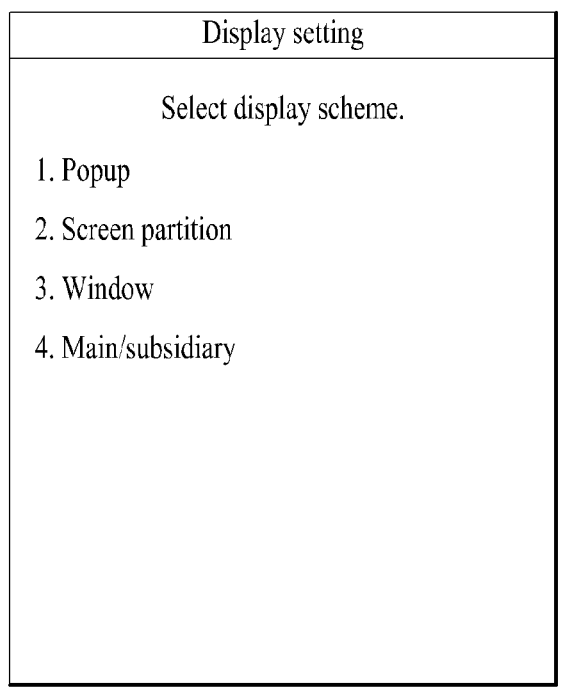

FIGS. 18A to 18F are second diagrams for controlling a first information and a second information to be displayed according to an embodiment of the present invention. Referring to FIG. 18A, the mobile terminal 100 can set a mode screen display screen in accordance with a user selection through a menu search/setting. In this instance, a mode screen can mean a screen on which mode information is displayed.

In particular, in order to display a plurality of mode screens, the mobile terminal 100 sets a mode screen layout (FIG. 18A(a)) or can set a mode screen display scheme (FIG. 18A(b)). Therefore, the mobile terminal 100 can display a plurality of the mode screens in accordance with the set mode screen layout or the set mode screen display scheme.

For instance, when a mode screen layout is set, it can set an arrangement form or position of a plurality of mode screens. Moreover, the mode screen display scheme can be set to one of the popup scheme, the screen partition (cf. FIG. 12A, FIG. 12B), the window scheme (cf. FIG. 13A, FIG. 13B), the main/subsidiary scheme (cf. FIG. 14A, FIG. 14B) and the like. In this instance, according to the popup scheme, one mode screen is displayed on a total display region, while another mode screen can be displayed on a popup window.

Meanwhile, through the menu search/setting, it can set more various conditions including a color, position, size, background image and the like of the mode screen.

Figure 18B:
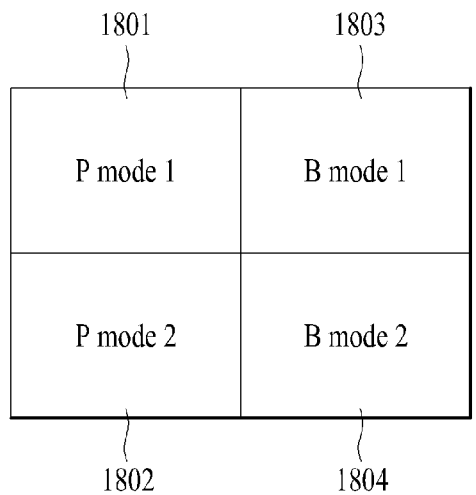
Figure 18B:
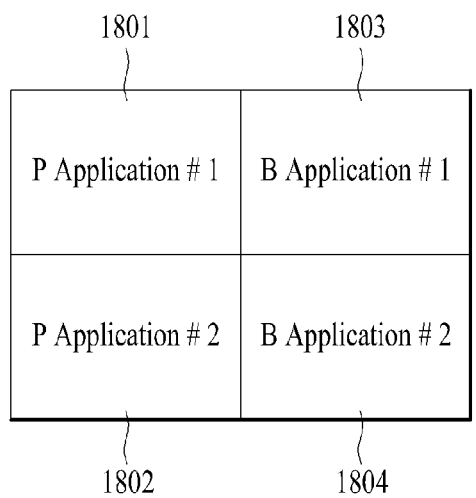

In the following description, when 4 partition regions are set as a mode screen layout in FIG. 18A(a), a mode screen displaying method is explained with reference to FIGS. 18B to 18E. Referring to FIG. 18B, when implementing a first private mode, a second private mode, a first business mode and a second business mode (i.e., implementation of 4 modes), the mobile terminal 100 can display a first private information 1801, a second private information 1802, a first business information 1803 and a second business information 1804 on first to fourth regions, respectively (FIG. 18B(a)).

When implementing a private mode and a business mode and then running an application 1-1 and an application 1-2 in the private mode and an application 2-1 and an application 2-2 in the business mode, the mobile terminal 100 displays a running state 1801 of the application 1-1 and a running state 1802 of the application 1-2 on the first region and the second region, respectively, and is also able to display a running state 1803 of the application 2-1 and a running state 1804 of the application 2-2 on the third region and the fourth region, respectively (FIG. 18B(b)).

Figure 18C:
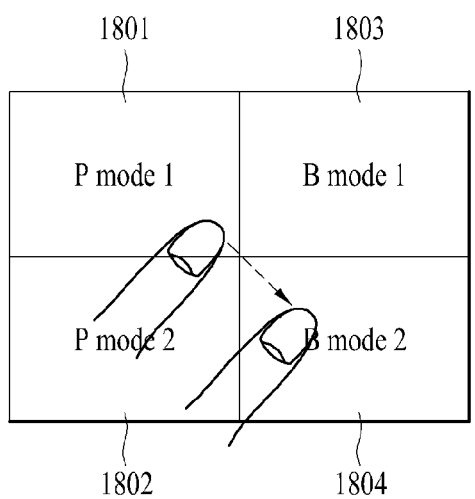
Figure 18C:
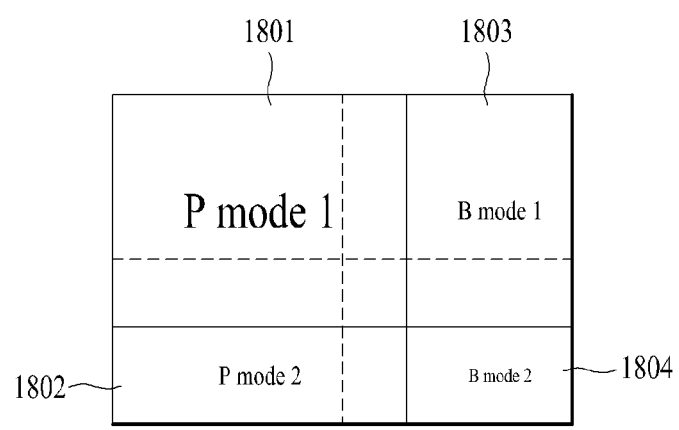

Referring to FIG. 18C, when receiving an input of a touch & drag action on one point in the first region toward outside (FIG. 18C(a)), the mobile terminal 100 increases a size of the first region to correspond to a touch & drag distance and can change sizes of the rest of the regions to correspond to the increased size of the first region (FIG. 18C(b)). On the contrary, when a touch & drag action is input toward inside, the size of the first region can be decreased.

Figure 18D:
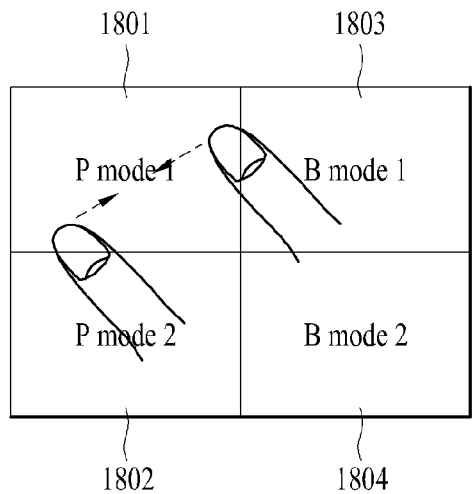
Figure 18D:
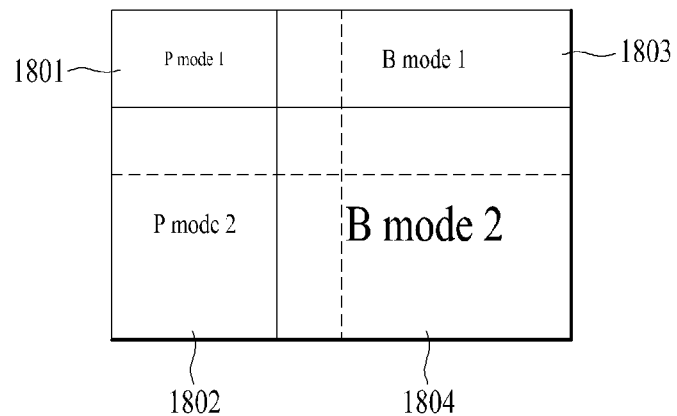

Referring to FIG. 18D, when receiving an input of a pinch-in action on the first region (FIG. 18D(a)), the mobile terminal 100 decreases a size of the first region to correspond to a pinch-in distance and can change sizes of the rest of the regions to correspond to the decreased size of the first region (FIG. 18D(b)). On the contrary, when a pinch-out action is input, the size of the first region can be increased.

Figure 18E:
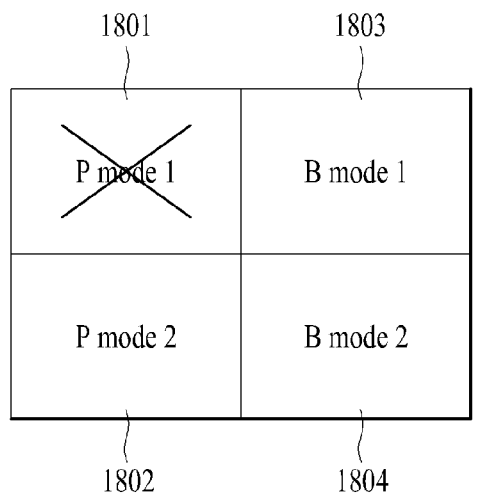
Figure 18E:
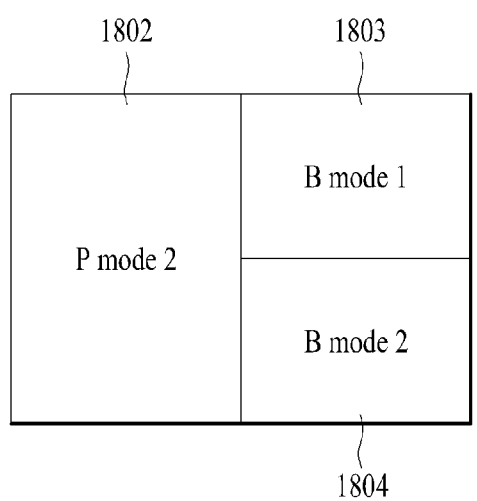

Referring to FIG. 18E, when receiving an input of a user action on the first region for a display interruption (FIG. 18E(a)), the mobile terminal 100 cancels the setting of the first region and can then merge a display region corresponding to the first region with a region (e.g., the second region) adjacent to the first region. In this instance, the user action for the display interruption can include one of a touch action corresponding to the display interruption, a handwriting input action, a menu item selection, a terminal motion action and the like.

Figure 18F:
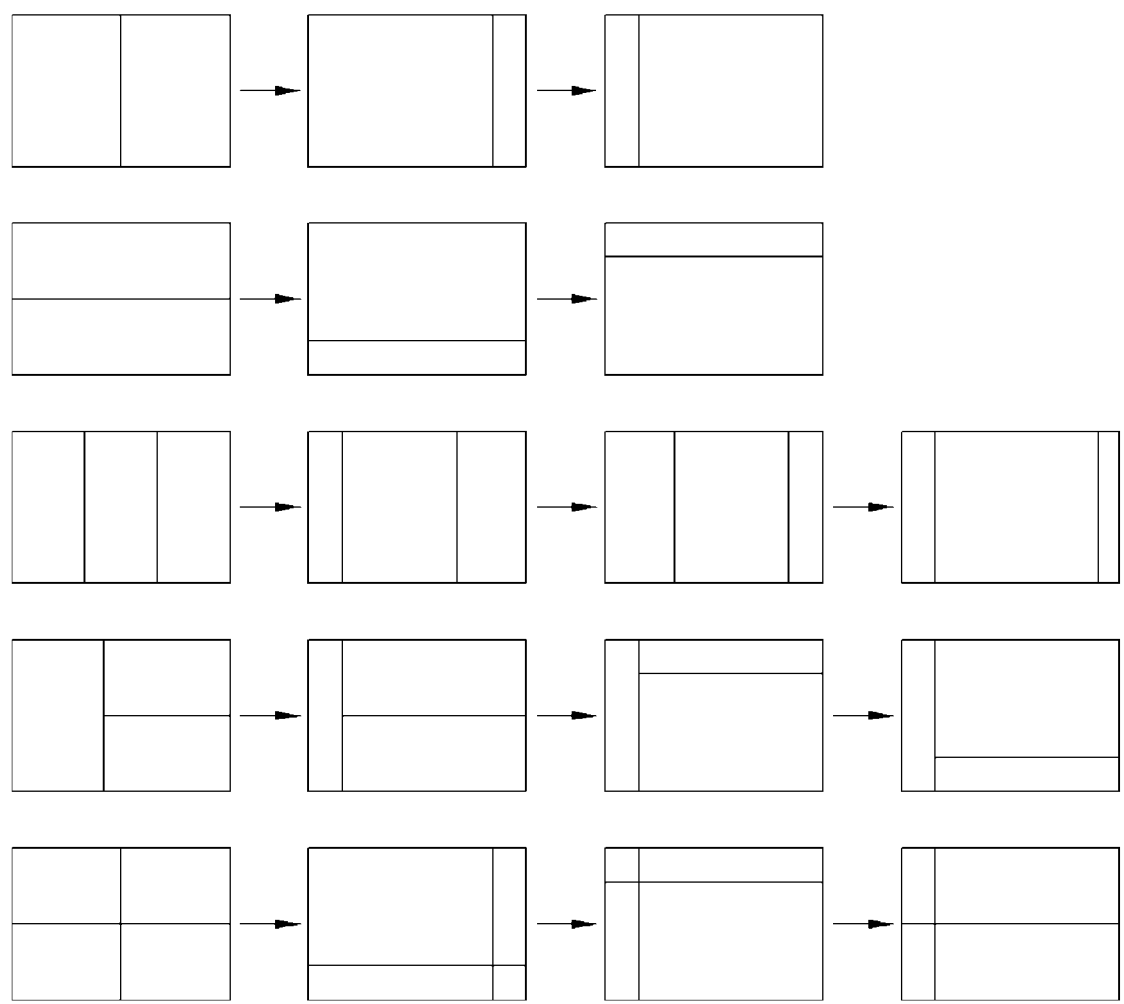

Referring to FIG. 18F, while a plurality of mode screens are displayed to correspond to a currently set mode screen layout, when receiving an input of a touch & drag action corresponding to a layout change from a user, the mobile terminal 100 can changeably set various mode screen layouts to correspond to the input touch & drag action. For instance, the touch & drag action corresponding to the layout change can include a touch & drag action from a outline or edge of each of the regions toward a prescribed direction.

Referring now to FIG. 11, the mobile terminal 100 detects a signal (hereinafter named a sharing signal) for sharing a first information selected from the first information and a second information under the control of the controller 180 (S1140). For clarity and convenience of the following description, it is assumed that the sharing signal is detected by corresponding to the first information. In addition, a sharing signal for the second information can be detected as well.

In the detecting step S1140, when receiving an input of a sharing command action for the first information from a user via the user input unit 130 (Case 1) or determining that the first information needs to be managed and stored in both of the first mode and the second mode (Case 2), the mobile terminal 100 can detects a sharing signal for the first information under the control of the controller 180. In particular, in Case 2, even if there is no input of a sharing command action from a user, the mobile terminal 100 can automatically detect the sharing signal.

Case 1 is explained in detail as follows. First of all, the sharing command action can include one of a touch & drag action from a region (hereinafter named a first region) for displaying the first information to a region (hereinafter named a second region) for displaying the second information, a flicking action from the first region in a direction of the second region, a manipulation on a key zone for receiving an input of a sharing commIn addition, a terminal motion for receiving an input of a sharing command (e.g., an inclination in a predetermined direction, a predetermined number of shaking actions, etc.), a user voice input corresponding to a sharing command and the like. Of course, the above-enumerated sharing command actions are just exemplary and no limitation is put on how to input the sharing command action.

Case 2 is explained in detail as follows. First of all, if the first information is the information related to a common application, a sharing command signal for the first information is received from the company server 300, the first information in the second mode is backed up, or a whole or partial part of the first information is updated while it is already shared with the second mode, the controller 180 can determine that the first information needs to be managed and stored in both of the first mode and the second mode.

When detecting the sharing signal for the first information, the mobile terminal 100 shares the first information with the second mode under the control of the controller 180 (S1150). In particular, in the sharing step S1150, the controller 180 can share the first information with the second mode in accordance with a prescribed level. In this instance, the prescribed level can include at least one of a level of the first information, a level of the first mode and a level of the second mode.

Moreover, when sharing the first information, the mobile terminal 100 can display the shared first information or information indicating the sharing of the first information via the display unit 151 under the control of the controller 180. In particular, the mobile terminal 100 can display the shared first information or the information indicating the sharing of the first information within the second region on which the second information is displayed.

In the sharing step S1150, the mobile terminal 100 copies a whole or partial part of the first information and is then able paste the copied whole or partial part of the first information into the second region on which the second information is displayed.

In the sharing step S1150, when running the first application in the first mode, the mobile terminal 100 can share the first application or a content or data related to the first application with the second mode under the control of the controller 180. Moreover, in the sharing step S1150, when running the first application and the second application in the first mode and the second mode, the mobile terminal 100 can share the content or data related to the first application as the information related to the second application with the second mode under the control of the controller 180.

In the sharing step S1150, the mobile terminal 100 determines whether the level of the first information indicates a sharing restriction level, in which the level of the first information is higher than the level of the second mode, or whether the level of the first mode is higher than the level of the second mode, under the control of the controller 180. As a result of the determination, if the level of the first information indicates the sharing restriction level or the level of the first information is higher than the level of the second mode, the mobile terminal 100 does not share the first information or can limitedly share the first information, under the control of the controller 180.

For instance, either a sharing available level or a sharing restriction level can be set on the first information. If the sharing available level is set, the first information can be shared with another mode. If the sharing restriction level is set, the first information is not shared with another mode or can be limitedly shared with another mode. In this instance, the sharing available level or the sharing restriction level for the first information is set by a user or the controller 180. When the first information is the information corresponding to a company mode, the sharing available level or the sharing restriction level for the first information can be set by the company server 300.

One of a plurality of levels (e.g., Level 1 to Level 10: a security level can be raised in proportion to the numeral) differing in a security level can be set on the first information, the first mode or the second mode. Hence, if the level (e.g., Level 5) of the second mode is higher than the level (e.g., Level 3) set on the first information or the level (e.g., Level 1) set on the first mode, it is unable to share the first information with the second mode. If the level (e.g., Level 1) set on the second mode is equal to or lower than the level (e.g., Level 3) set on the first information or the level (e.g., Level 5) set on the first mode, it can share the first information with the second mode. In this instance, the level of the first information, the first mode or the second mode can be set by the user or the controller 180. Moreover, the level of the company mode or the level of the information corresponding to the company mode can be set by the company server 300.

If the first information is a private information, the first information can be freely shared with the second mode that is a business mode. If the first information is a business information, the first information is not sharable with or can be limitedly shared with the second mode that is the private mode.

For the limited sharing, the controller 180 shares a whole or partial part of the first information after completion of an authentication procedure (1) or can share a portion of the first information of which security level is equal to or lower than a predetermined reference (2).

For the limited sharing, when attempting to share information corresponding to a specific mode, the controller 180 enables an authentication procedure to be unconditionally executed, does not allow the sharing itself, shares a portion of information to share if a corresponding security level is equal to or lower than a predetermined reference, or can share the information after gaining a sharing approval of another user (e.g., a user having an approval authority, etc.) of a predetermined rank or higher. For instance, while a business information and a private information are displayed, when attempting to share the business information, the controller 180 can share the corresponding information in the above manner.

In the following description, a process for sharing a mode information is explained in detail with reference to the accompanying drawings.

Figure 19:
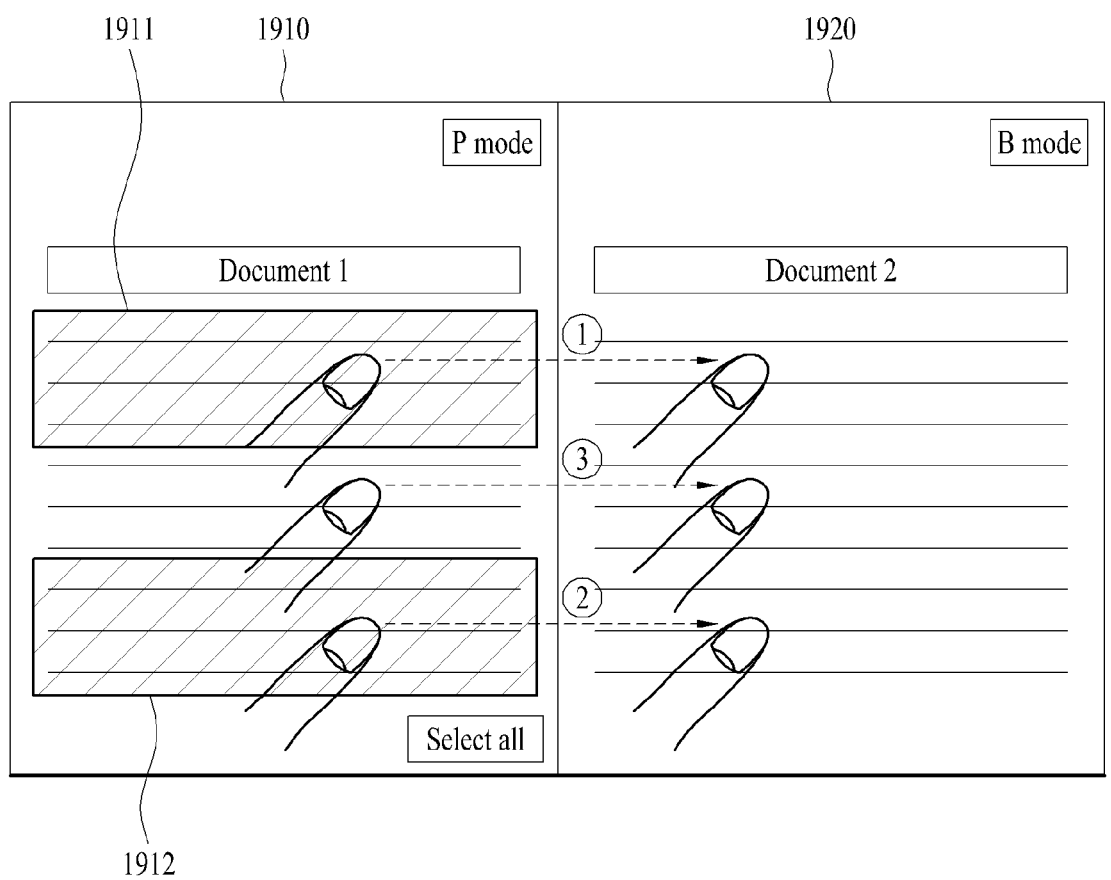
FIG. 19 is a diagram for receiving an input of a sharing command action on a first information according to an embodiment of the present invention.

FIG. 19 is a diagram for receiving an input of a sharing command action on a first information according to an embodiment of the present invention. For clarity and convenience of the following description, assume that Document 1 is displayed as a private information on a first region 1910. In addition, assume that Document 2 is displayed as a business information on a second region 1920. In addition, assume that a text or image is included in each of Document 1 and Document 2.

Referring to FIG. 19, the mobile terminal 100 can receive an input of a sharing command action for selecting a partial or whole region of Document 1 displayed on the first region 1910 and sharing information displayed on the selected region from a user. In doing so, at least one or more partial regions can be selected.

For instance, the sharing command action can include a touch & drag action from the selected region to a prescribed position in Document 2 displayed on the second region 1920. As the mobile terminal 100 receives the input of the sharing command action, the mobile terminal 100 copies the selected region and can then paste it to the prescribed position in Document 2 displayed on the second region 1920.

Although a first information and a second information are described as limited to documents in the drawing, if the information includes a text or image, no limitation is put on the form of the information. For instance, the information can include one of a photo, a message, a memo, a schedule, an email, a counterpart information and the like. Although the drawing shows a case that a private information is shared, the above-described embodiments are applicable to a case that a business information is shared. Although the drawing shows a case that a same common application is run in a business mode and a private mode, if different applications are run, the above-described embodiments are applicable to a case of running each dedicated application. For instance, an email application is run in the business mode, while a message application is run in the private mode.

FIGS. 20A to 23C are diagrams for sharing a first information according to an embodiment of the present invention, in which information displayed on a partial or whole region of Document 1 displayed on a first region 1910 as a private information is shared. For clarity and convenience of the following description, assume that a sharing command action is a touch & drag action.

Figure 20A:
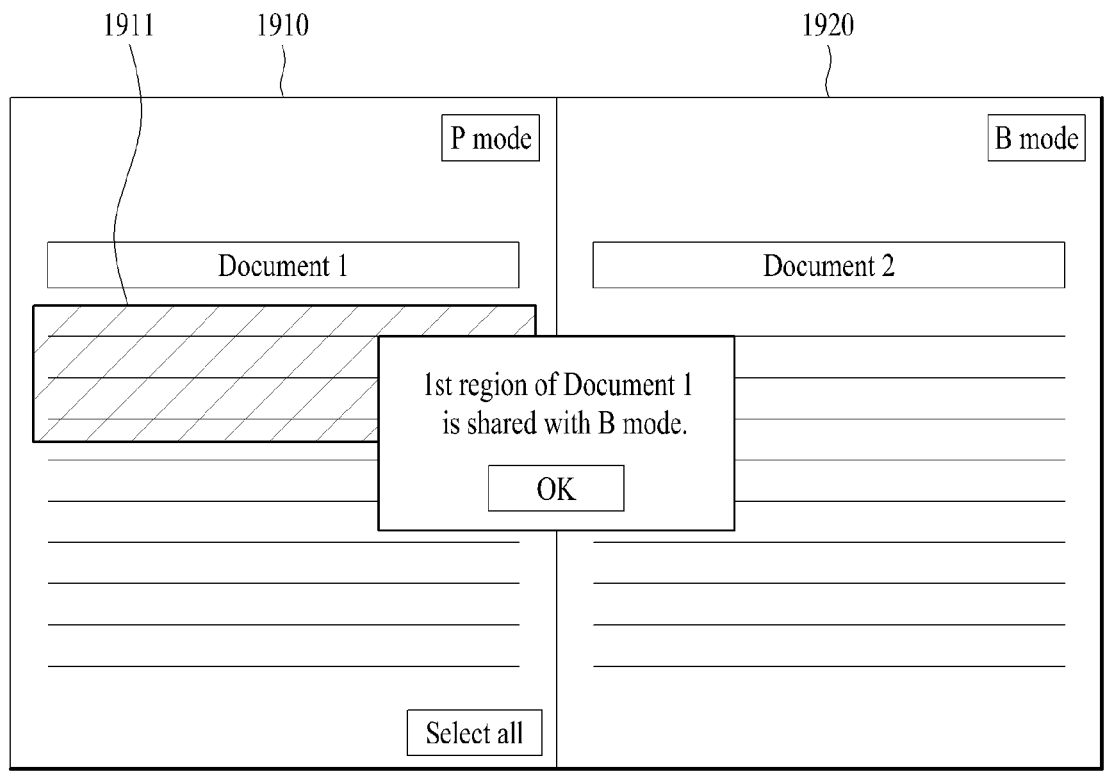
FIGS. 20A to 23C are diagrams for sharing a first information according to an embodiment of the present invention.
Figure 20B:
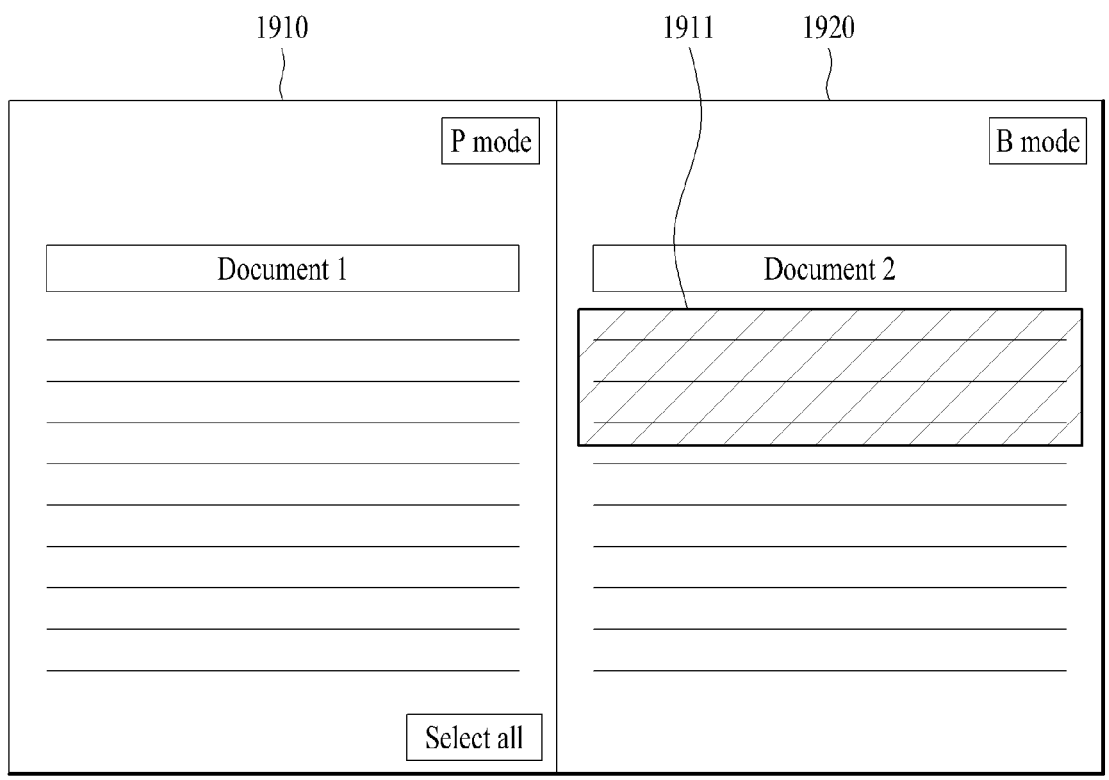

Referring to FIGS. 20A and 20B, the mobile terminal 100 can share information (hereinafter named information 1-1) corresponding to a region 1-1 1911 of Document 1 in a private mode and a business mode in accordance with a prescribed level. For instance, the prescribed level can include one of a level of Document 1, a level of the information 1-1 in Document 1, a level of the private mode, a level of the business mode and the like.

Referring to FIG. 20A, when receiving an input of a touch & drag from the region 1-1 1911 in FIG. 19 to a specific position of Document 2 displayed on a second region 1920 (②), the mobile terminal 100 determines a prescribed level. As a result of the determination, if a sharing is available, the mobile terminal 100 can output a sharing available indication information of the information 1-1.

Therefore, if a level of Document 1 or a level of the information 1-1 is a sharing available level (1), a level of the private mode is equal to or lower than a level of the business mode (2), or a level of Document 1 or a level of the information 1-1 is equal to or lower than a level of the business mode (3), the mobile terminal 100 can share the information 1-1 in the private mode and the business mode under the control of the controller 180.

Referring to FIG. 20B, as the information 1-1 s shared in the private mode and the business mode, the mobile terminal 100 can display the information 1-1 (or the region 1-1 1911 including the information 1-1) on Document 2 in a manner of pasting it to an end point of a touch & drag action in Document 2.

Figure 21A:
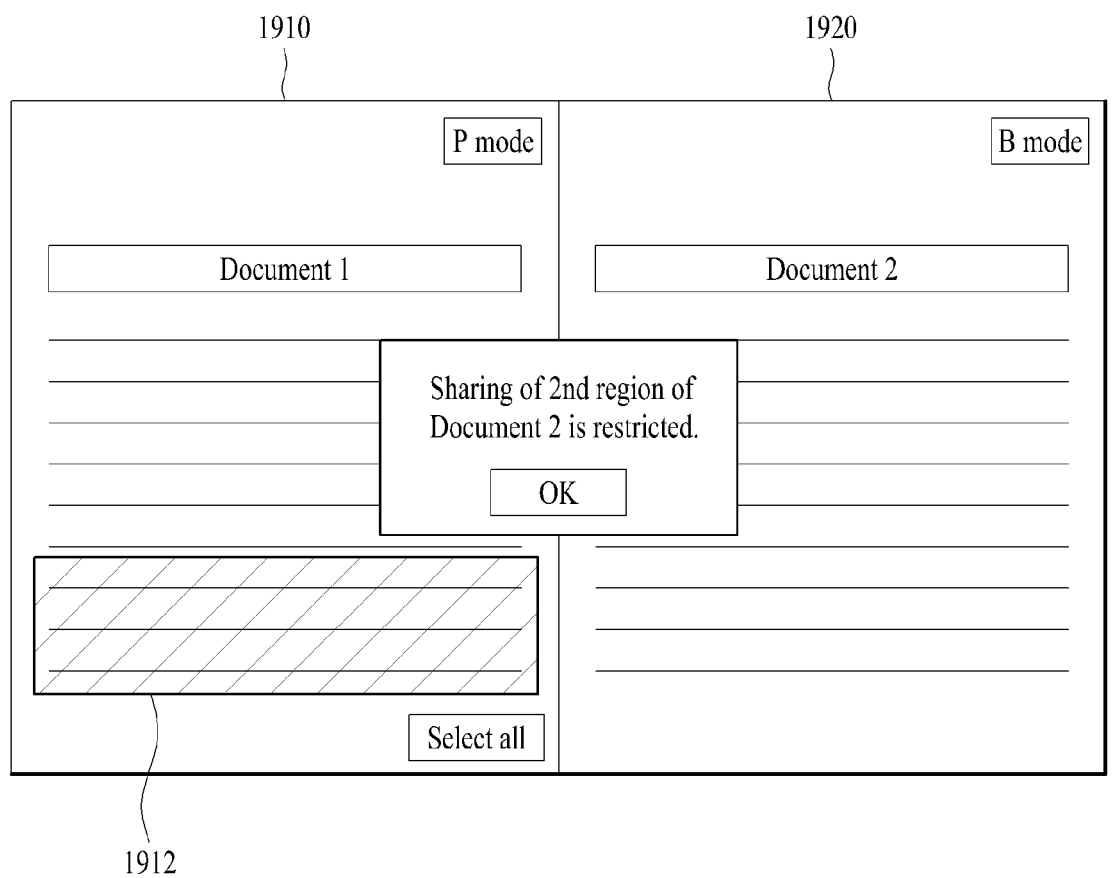
Figure 21B:
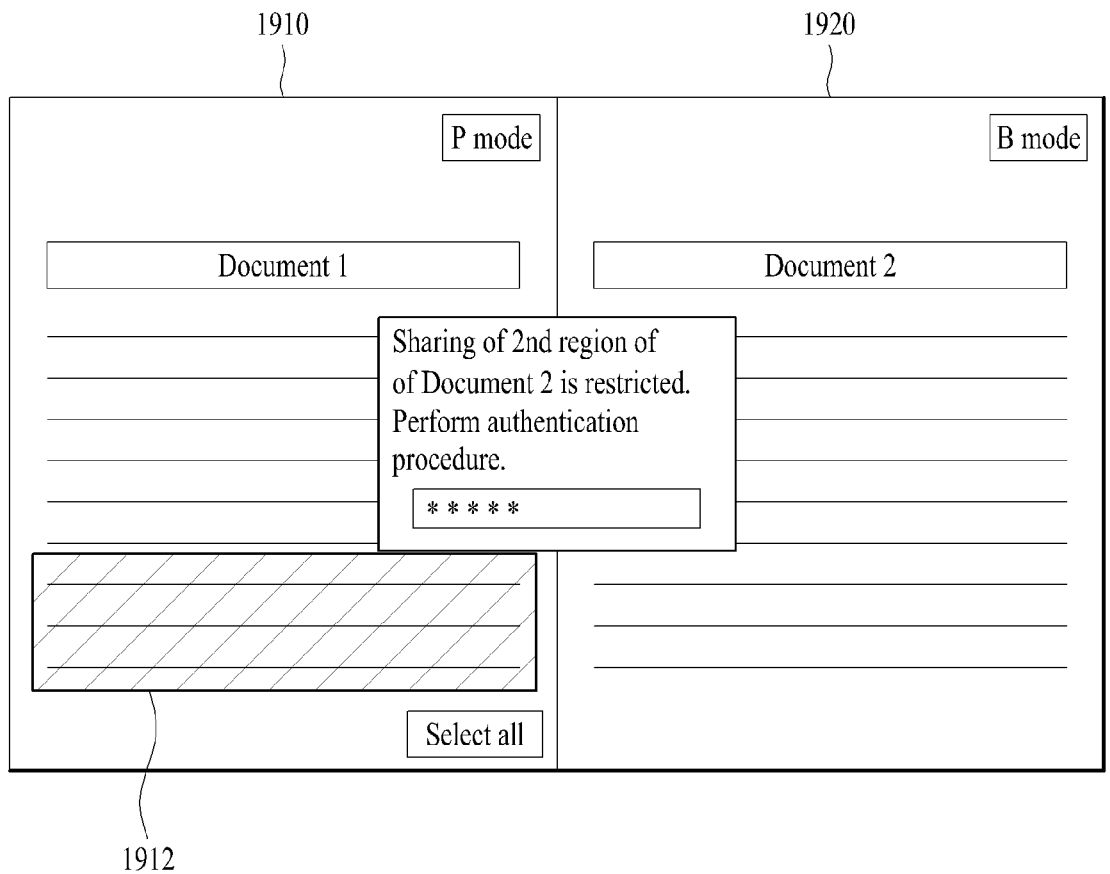
Figure 21C:
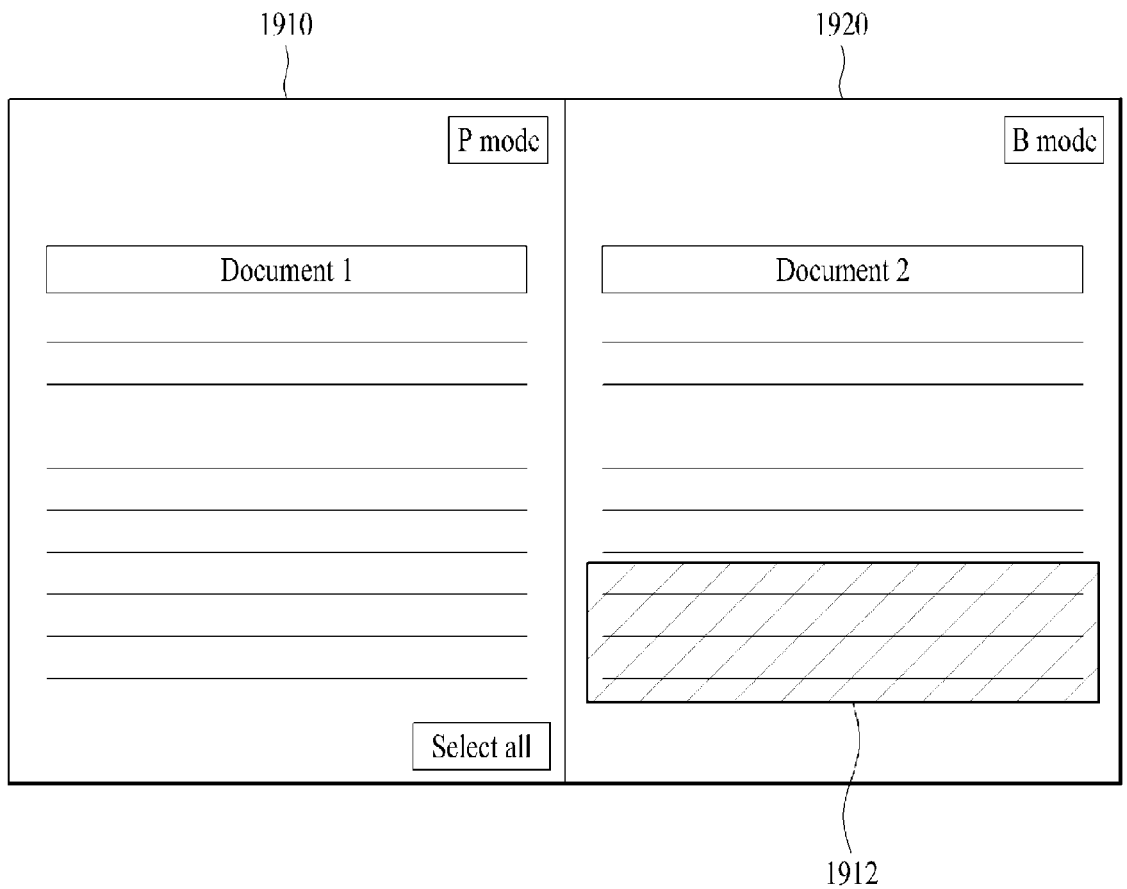

Referring to FIGS. 21A to 21C, the mobile terminal 100 can limitedly share information (hereinafter named information 1-2) corresponding to a region 1-2 1912 of Document 1 in a private mode and a business mode in accordance with a prescribed level. For instance, the prescribed level can include one of a level of Document 1, a level of the information 1-2 in Document 1, a level of the private mode, a level of the business mode and the like.

Referring to FIG. 21A, when receiving an input of a touch & drag from the region 1-2 1912 in FIG. 19 to a specific position of Document 2 displayed on a second region 1920 (②), the mobile terminal 100 determines a prescribed level. As a result of the determination, if a sharing is unavailable, the mobile terminal 100 can output a sharing unavailable indication information of the information 1-2.

For instance, if a level of Document 1 or a level of the information 1-2 is a sharing restriction level (1), a level of the private mode is equal to or lower than a level of the business mode (2), or a level of Document 1 or a level of the information 1-2 is higher than a level of the business mode (3), the mobile terminal 100 is not able to share the information 1-2 with the business mode under the control of the controller 180.

Referring to FIG. 21B, when receiving an input of a touch & drag action, which is like the one shown in FIG. 21A, in FIG. 19, the mobile terminal 100 determines a prescribed level. As a result of the determination, if a sharing is restricted, the mobile terminal 100 enables an authentication procedure to be executed. For instance, as the authentication procedure, the mobile terminal 100 can request an authentication information input from a user. Of course, the authentication information includes a password and is also able to include at least one of a user face image, a fingerprint, a company ID, a specific touch pattern and the like.

Referring to FIG. 21C, if the authentication procedure is validly performed in FIG. 21B, the mobile terminal 100 shares the information 1-2 in the private mode and the business mode. Hence, the mobile terminal 100 can display the information 1-2 (or the region 1-2 1912 including the information 1-2) on Document 2 in a manner of pasting it to an end point of a touch & drag action in Document 2.

Figure 22A:
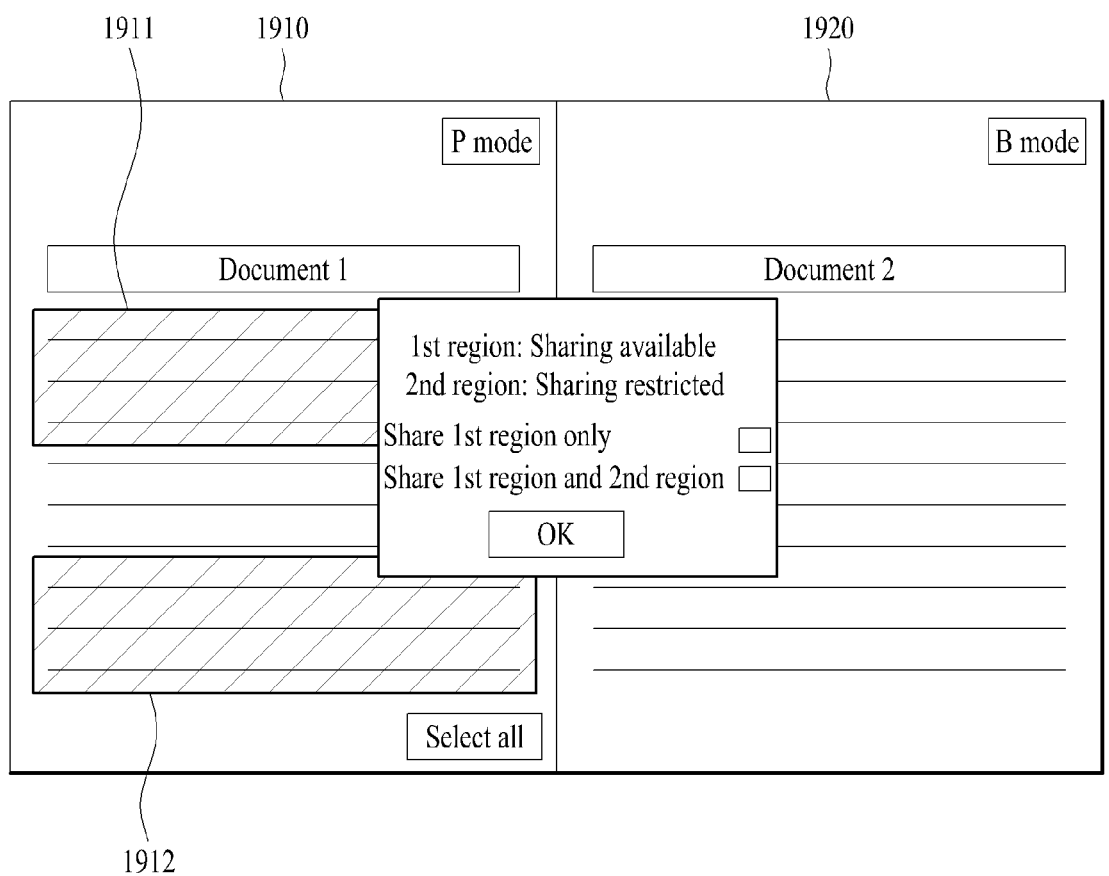
Figure 22B:
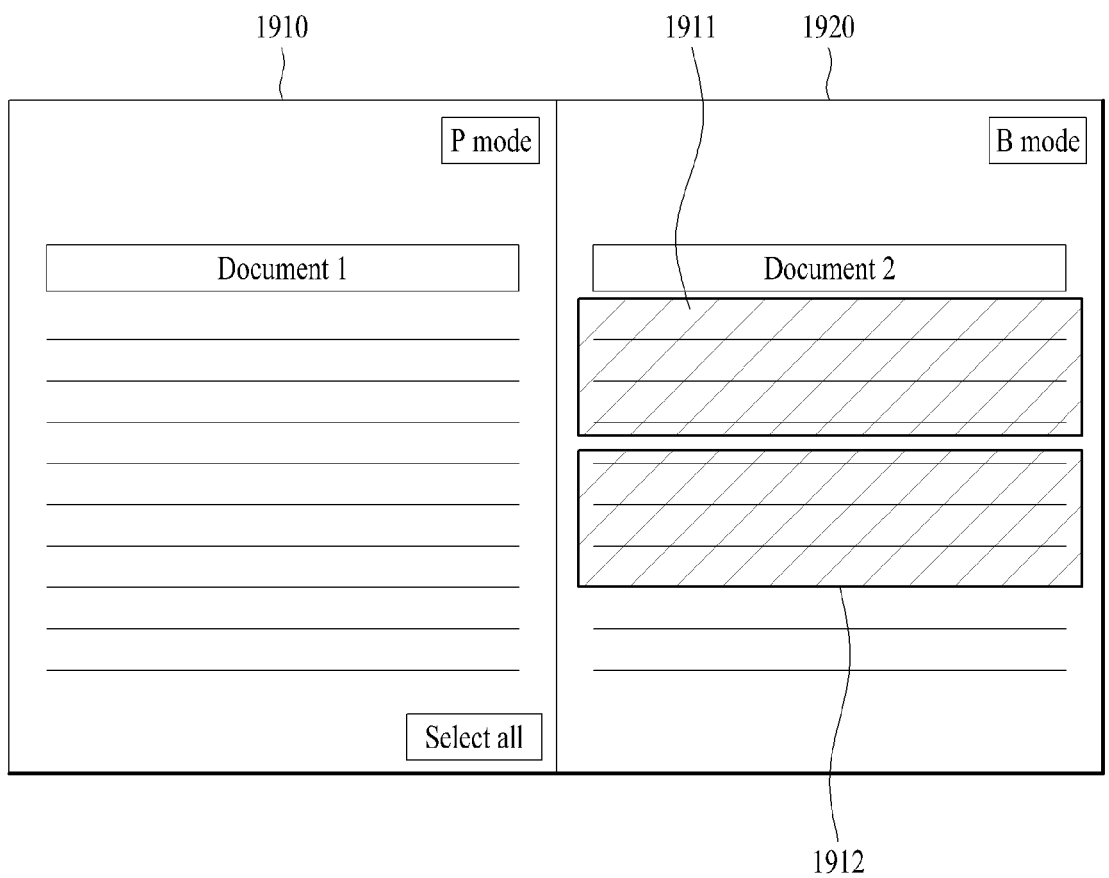
Figure 22C:
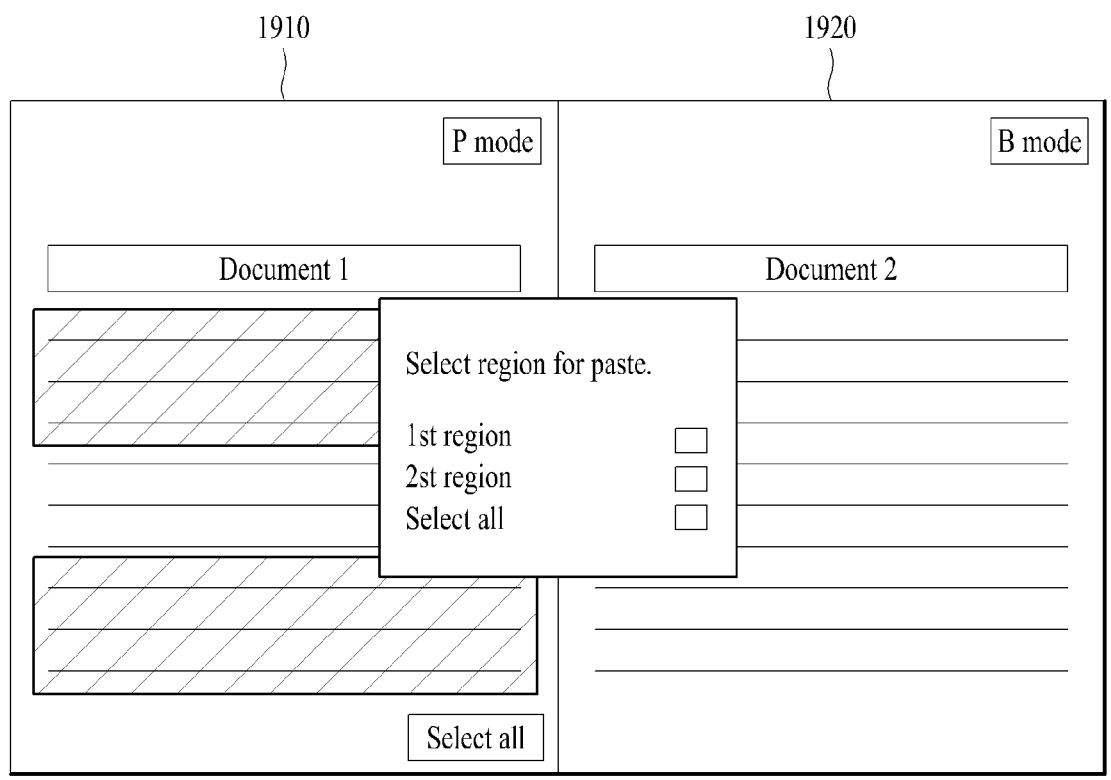

Referring to FIGS. 22A to 22C, the mobile terminal 100 can limitedly share information (hereinafter named information 1-1) corresponding to a region 1-1 1911 of Document 1 and information (hereinafter named information 1-2) corresponding to a region 1-2 1912 of Document 1 in a private mode and a business mode in accordance with a prescribed level (e.g., a case of copying a plurality of regions).

Referring to FIG. 22A, when receiving an input of a touch & drag action from the region 101 1911 or the region 1-2 1912 in FIG. 19 to a specific position of Document 2 displayed on the second region 1920, the mobile terminal 100 determines a prescribed level. As a result of the determination, if a sharing is restricted, the mobile terminal 100 can output a sharing restriction information. In this instance, the sharing restriction information can include information of a sharing available/unavailable region.

For instance, the mobile terminal 100 determines a prescribed level for the information 1-1 and a prescribed level for the information 1-2. As a result of the determinations, the mobile terminal 100 can determine a presence or non-presence of availability for each of the information 1-1 and the information 1-2. Detailed examples of the level determination and the presence or non-presence of the availability for the sharing can refer to the former descriptions.

Referring to FIG. 22B, if the mobile terminal 100 determines that the information 1-1 is available for the sharing and determines that the information 1-2 is not available for the sharing in FIG. 22A, when a user selects to share the information 1-1 and the information 1-2, as a prescribed authentication procedure is validly performed, the information 1-1 and the information 1-2 can be shared in the private mode and the business mode. In this instance, each of the information 1-1 and the information 1-2 can be displayed on an end point of a touch & drag action in Document 2. Of course, if the information 1-1 is selected to be shared only in FIG. 22A, the mobile terminal 100 can share the information 1-1 without performing the authentication procedure.

Referring to FIG. 22C, if a plurality of regions are selected, the mobile terminal 100 enables a user to select a region to share gain. The mobile terminal 100 can then share information, which is displayed on the region selected by the user, in a private mode and a business mode only. In doing so, if the region selected by the user is a sharing restricted region, the sharing is not allowed or the corresponding region can be shared only if a prescribed authentication procedure is validly performed.

Figure 23A:
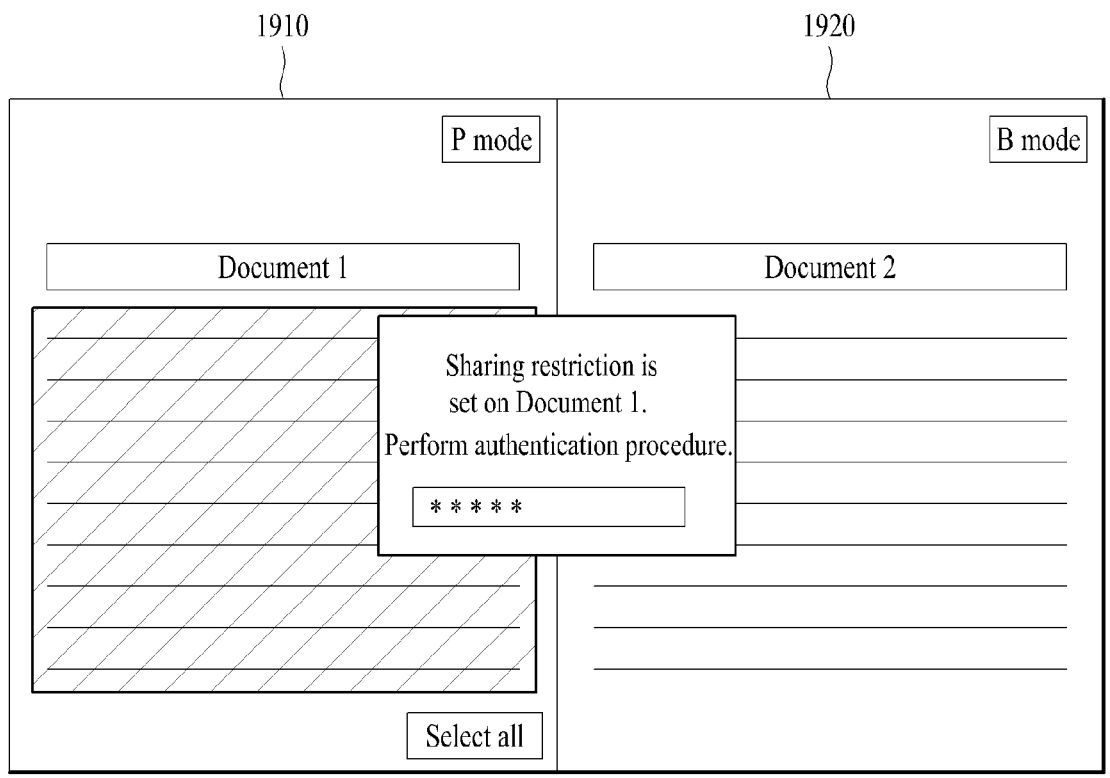
Figure 23B:
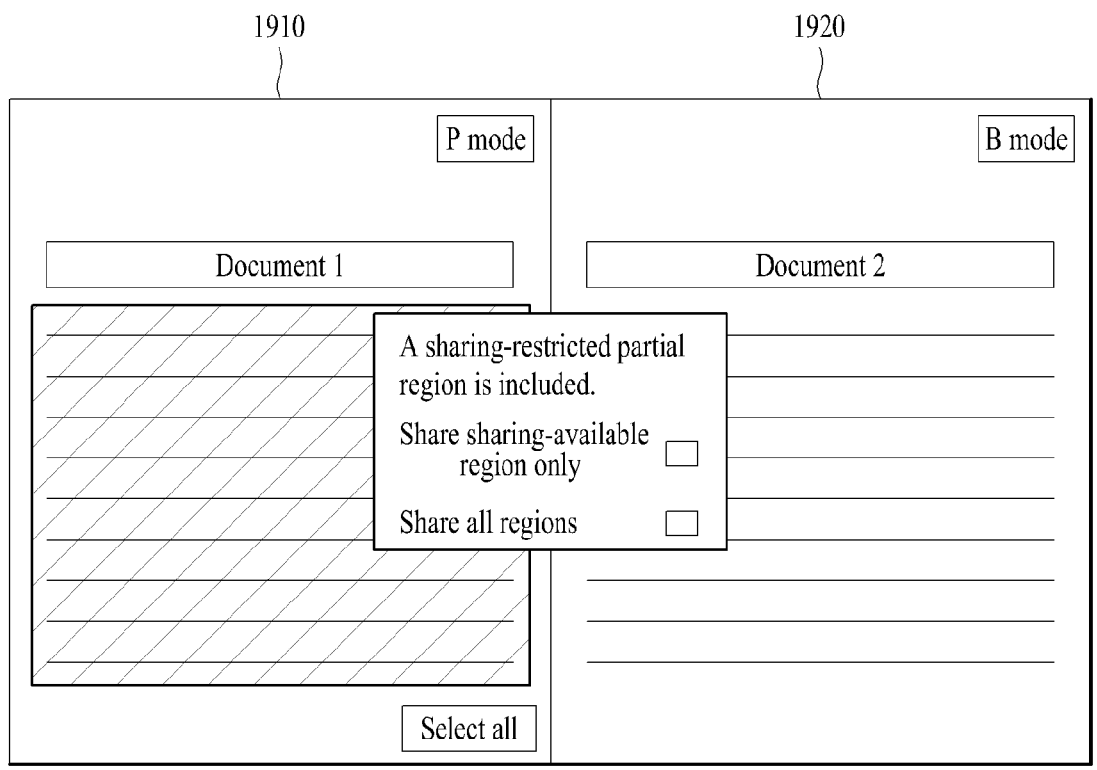
Figure 23C:
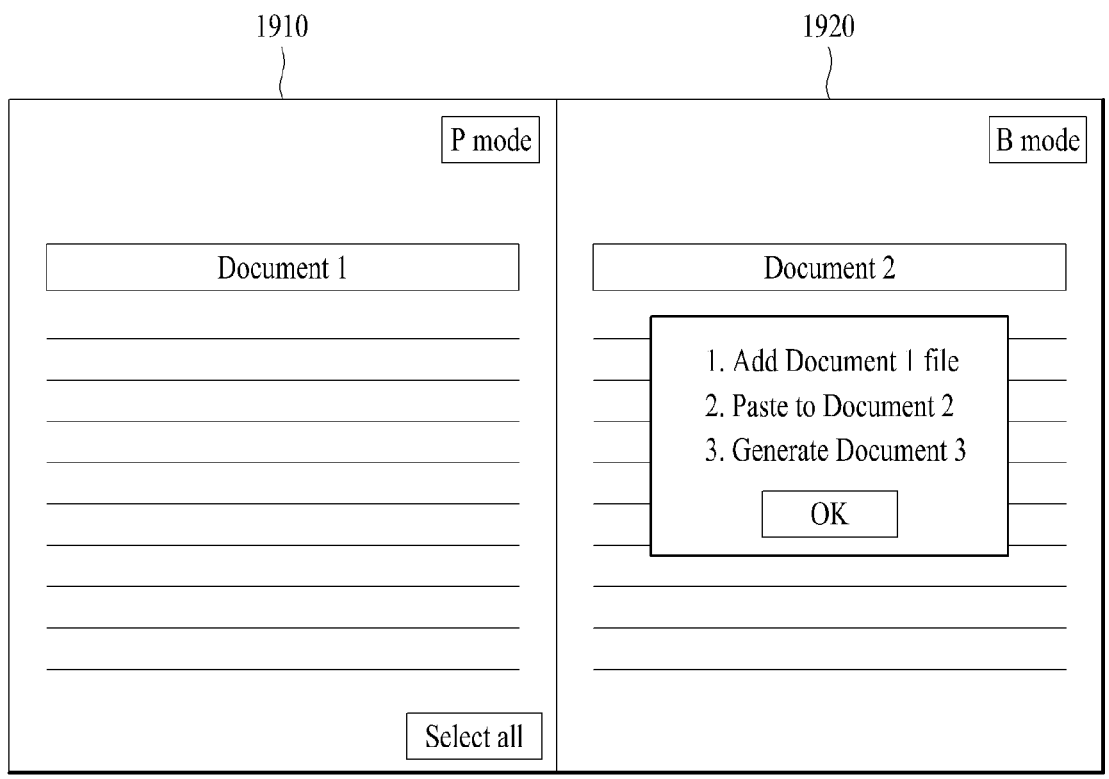

Referring to FIGS. 23A to 23C, the mobile terminal 100 can limitedly share a whole region of Document 1 in a private mode and a business mode in accordance with a prescribed level. In this instance, the whole region can include a content displayed within the first region 1910 of Document 1 and can include all contents included in Document 1 despite not being currently displayed within the first region 1910.

Referring to FIG. 23A, if a select-all zone 1913 provided within the first region 1910 in FIG. 19 is selected by a user (e.g., example of a select-all command action for Document 1), the mobile terminal 100 can select a whole region of Document 1 as a sharing target. If a sharing restriction region is included in Document 1 or a sharing restriction level is set on Document 1, the mobile terminal 100 can perform an authentication procedure.

Moreover, if the authentication procedure is validly performed in FIG. 23A, the mobile terminal 100 can share the whole region of Document 1. If the authentication procedure is not validly performed in FIG. 23A, the mobile terminal 100 can share a sharing available region (or a sharing non-restricted region) in Document 1 only.

Referring to FIG. 23B, when receiving an input of a user selection action like FIG. 23A, the mobile terminal 100 can output a sharing restriction information on Document 1. For instance, the sharing restriction information on Document 1 can include information indicating whether a sharing restriction region is included in Document 1, position information of the sharing restriction region and the like.

Moreover, if a sharing available region is selected to be shared only in FIG. 23B, the mobile terminal 100 can share the sharing available region only without performing an authentication procedure. If a whole region sharing is selected in FIG. 23B, the mobile terminal can share a whole region of Document 1 only if performing a valid authentication procedure.

Of course, in FIGS. 23A and 23B, even if a whole region of Document 1 is attempted to be shared, a sharing restriction region may not be allowed to be shared no matter whether the authentication procedure is performed.

Referring to FIG. 23C, if a whole region of Document 1 is shared in FIG. 23A or FIG. 23B, the mobile terminal 100 enables a user to select a sharing type of Document 1.

For instance, if 'add Document 1 file' is selected, the mobile terminal 100 can add Document 1 as a file related to an application that provides Document 2 (e.g., generate a new file corresponding to Document 1) (1). If 'paste to Document 2' is selected, the mobile terminal 100 can paste a whole region of Document 1 to a last part of Document 2 (i.e., edit Document 2 to add a content of Document 1 thereto) (2). If 'add file generated from merging Document 1 and Document 2 together' is selected, the mobile terminal 100 can add Document 3, which is generated from merging Document 1 and Document 2 together, as a file related to an application that provides Document 2 (e.g., generate a new file corresponding to Document 3 of 'Document 1+Document 2') separately from Document 2 (3).

FIGS. 24A to 24D are diagrams for sharing an email when first and second applications are email applications according to an embodiment of the present invention.

For clarity and convenience of the following description, although a same application is assumed as running in a private mode and a business mode, the following description is applicable to a case of running different applications. Assume a touch & drag action as a sharing command action. In addition, assume that a private information and a business information are displayed on a private mode screen and a business mode screen, respectively.

Figure 24A:
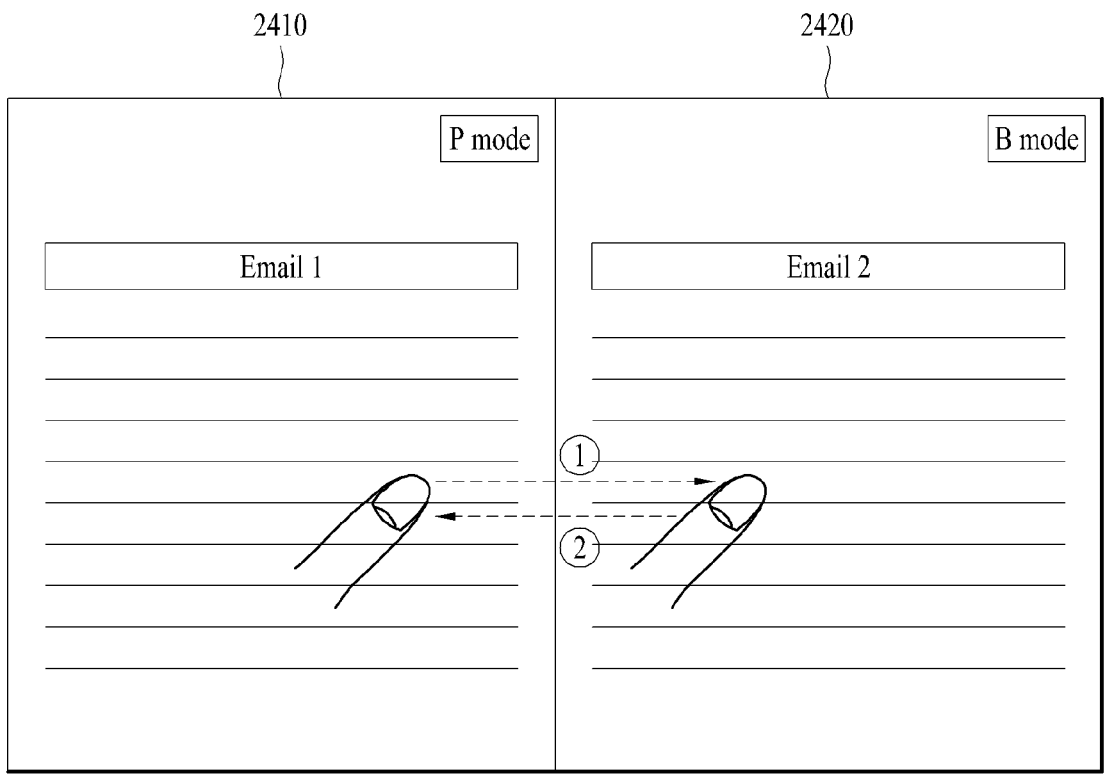
FIGS. 24A to 24D are diagrams for sharing an email when first and second applications are email applications according to an embodiment of the present invention.

Referring to FIG. 24A, the mobile terminal 100 runs an email application in a private mode and also runs the email application in a business mode. The mobile terminal 100 displays a received email 1 on a private mode screen 2410 and also displays a received email 2 on a business mode screen 2420.

Figure 24B:
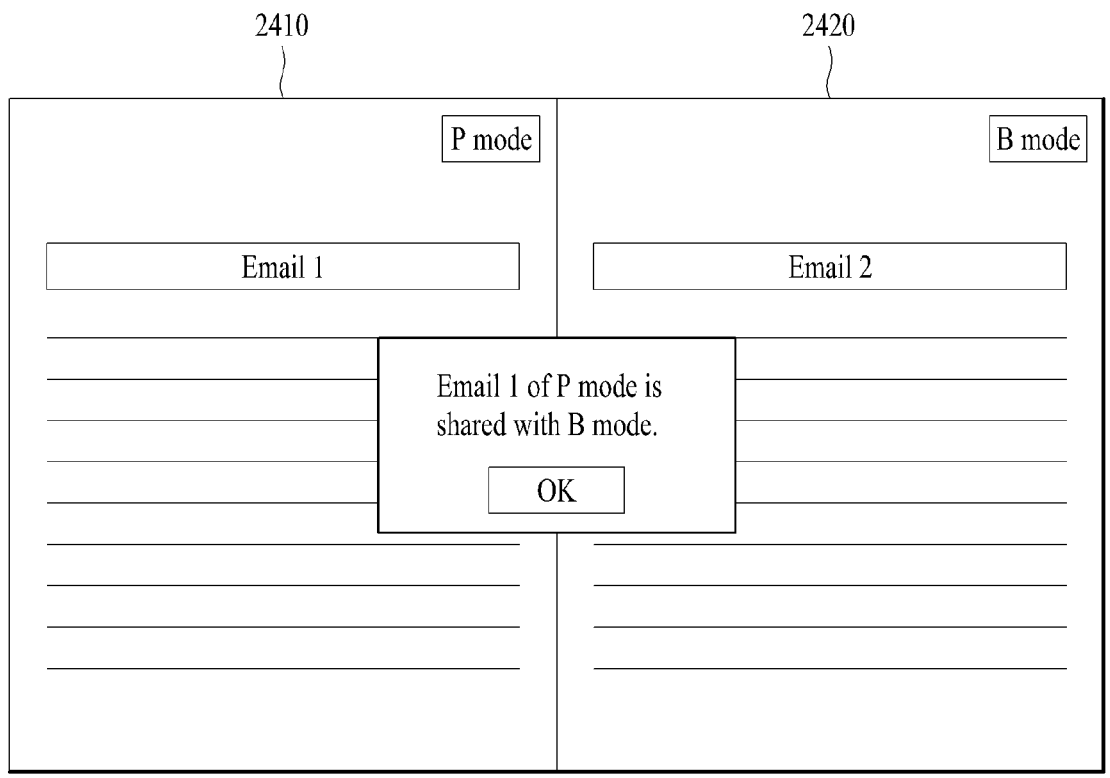

Referring to FIG. 24B, when receiving an input of a touch & drag action ① from the business mode screen 2410 to the business mode screen 2420 in FIG. 24A, the mobile terminal 100 can share the received email in both of the private mode and the business mode. In doing so, the mobile terminal 100 can output a sharing indication information.

Although FIG. 24B shows a case that the received email 1 corresponding to the private mode is shared without restriction, the received email 1 can be shared to correspond to a prescribed level occasionally. The sharing in accordance with the prescribed level can refer to the following descriptions with reference to FIGS. 24C and 24D.

Figure 24C:
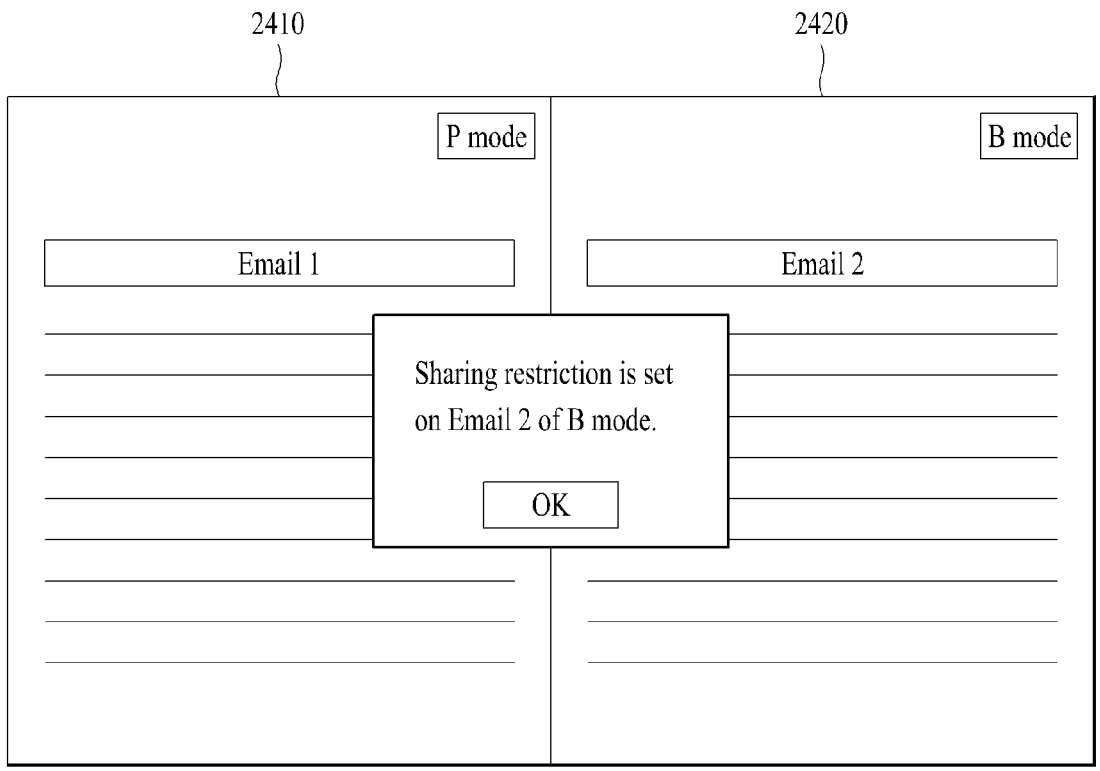
Figure 24C:
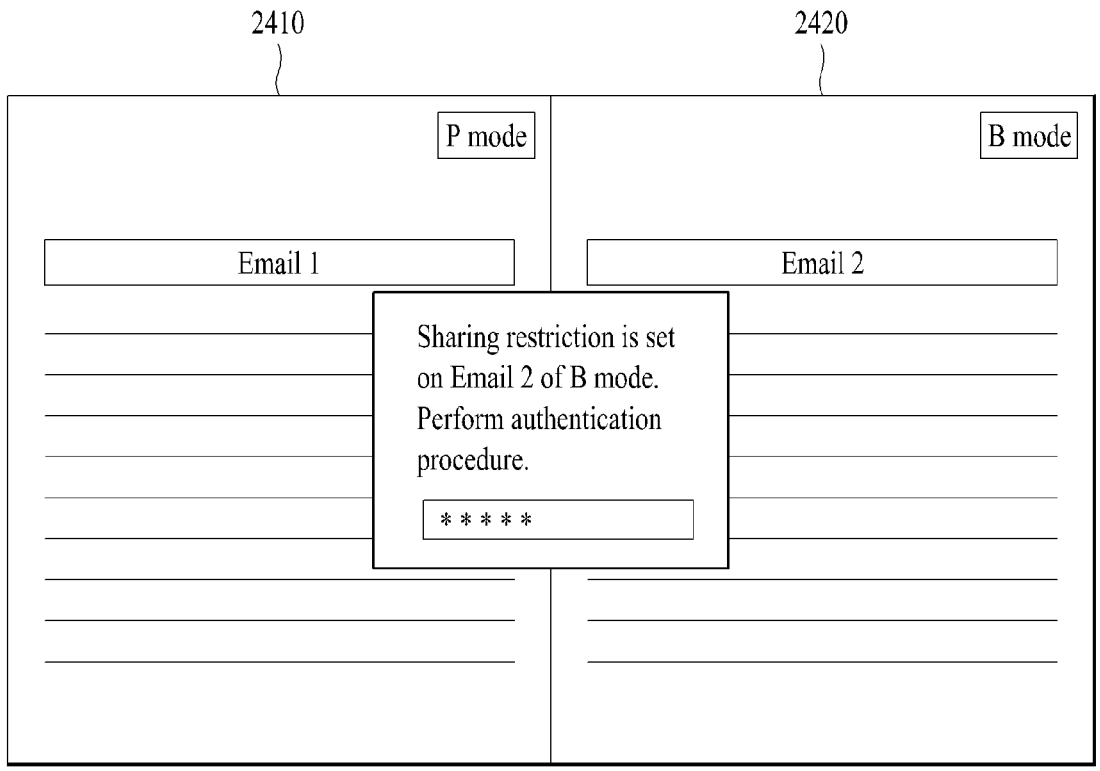

Referring to FIG. 24C, when receiving an input of a touch & drag action ② from the business mode screen 2420 to the private mode screen 2410 in FIG. 24A, the mobile terminal 100 determines a prescribed level and can then limitedly share the received email 2 in the private mode and the business mode in accordance with a result of the determination.

For instance, in at least one of the case that the received email 2 corresponds to the business mode, the case that a level of the received email 2 (or an email associated with the received email 2) is a sharing restriction level and the case that a level of the received email 2 (or an email associated with the received email 2) is higher than that of the private mode, the mobile terminal 100 can limitedly share the received email 2.

For instance, for the limited sharing, the mobile terminal 100 does not allow the sharing of the received email 2 itself (a) or can share the received email 2 only if a valid authentication procedure is performeD(b). Moreover, even if the valid authentication procedure is performed, the mobile terminal 100 can share a partial information in the received email 2 only. Even if the valid authentication procedure is not performed, a content of the received email 2, of which security level is equal to or lower than a predetermined reference, can be shared.

Figure 24D:
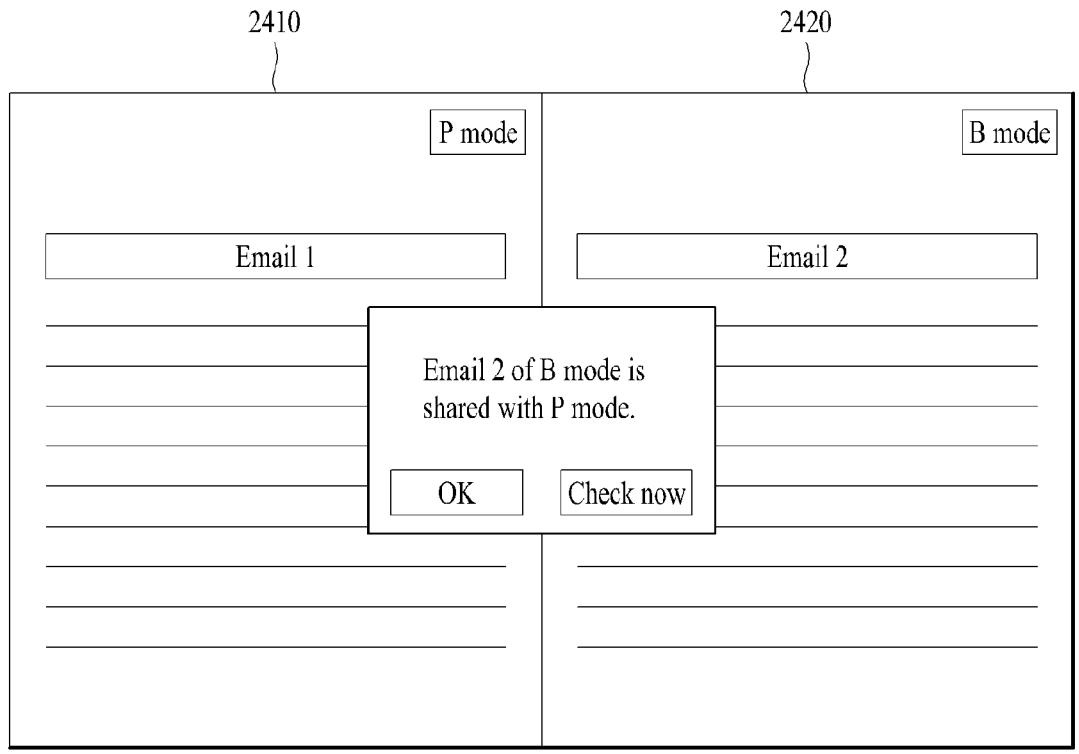
Figure 24D:
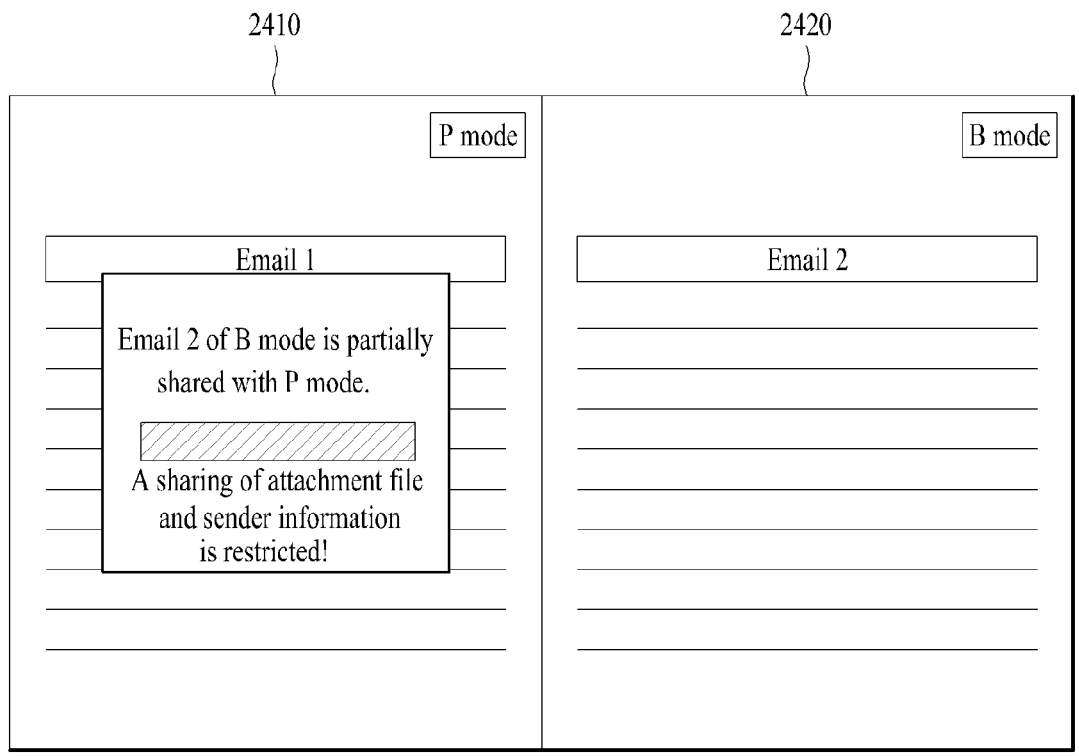

Referring to FIG. 24D, as the received email 2 is shared in the private mode and the business mode, the mobile terminal 100 outputs information indicating that the received email 2 is shared (FIG. 24D(a)) or can output information indicating an unshared content (or a shared content) among contents of the received email 2 (FIG. 24D(b)).

In particular, if 'check now' is selected by a user in FIG. 24D(a), the mobile terminal 100 can display the received email 2 within the private mode screen 2410. If a partial content of the received email 2 is shared only in FIG. 24D(b), the mobile terminal 100 can inform a user what kind of a prescribed item (e.g., an attachment file, a sender information, etc.) is not shared or what kind of a prescribed item (e.g., content, reception date, etc.) is shared.

Figure 25A:
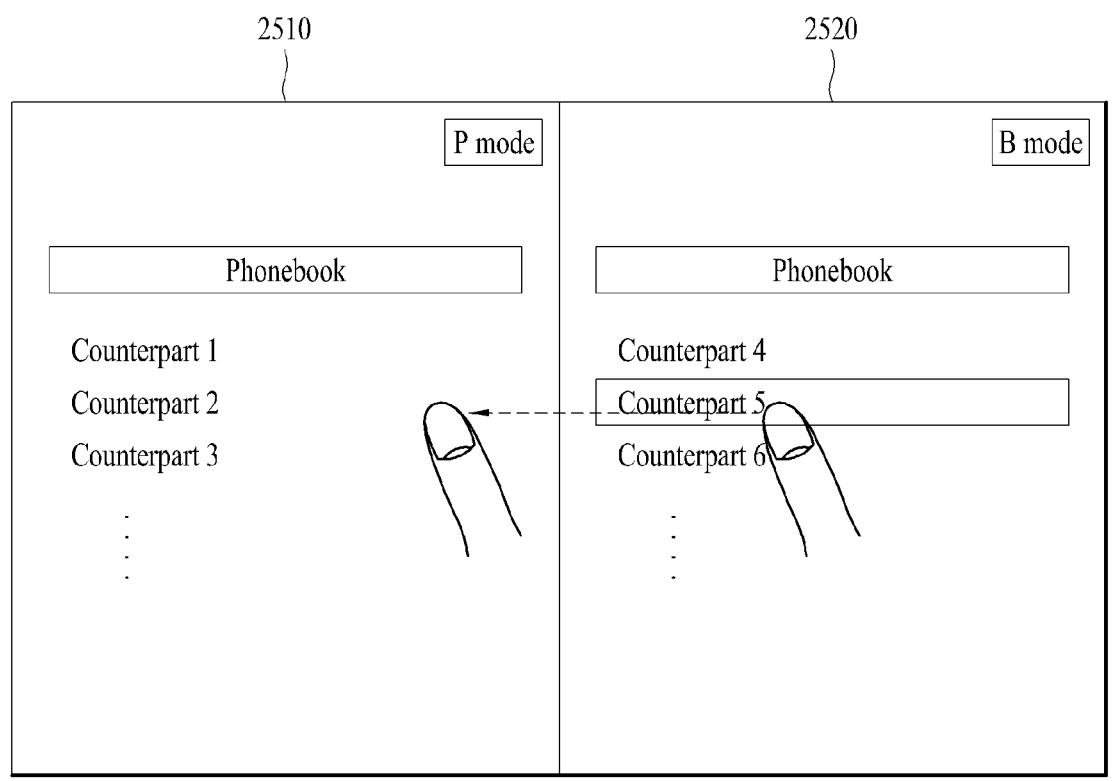
FIGS. 25A to 25C are diagrams for sharing a counterpart information when first and second applications are phonebook applications according to an embodiment of the present invention.
Figure 25B:
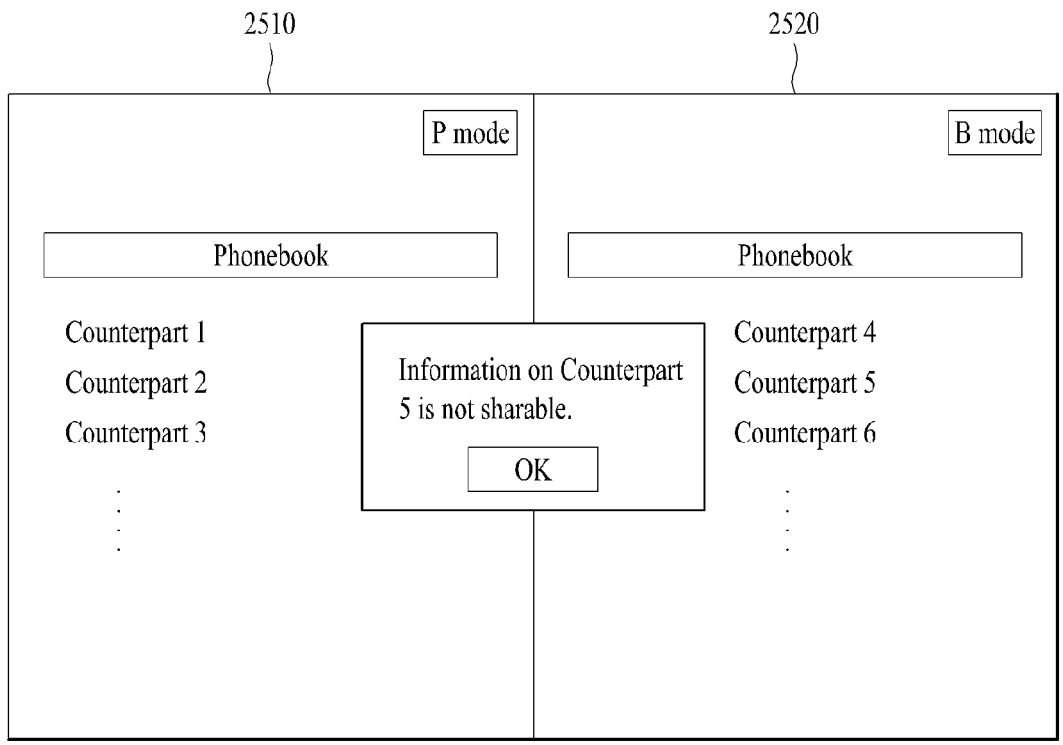
Figure 25B:
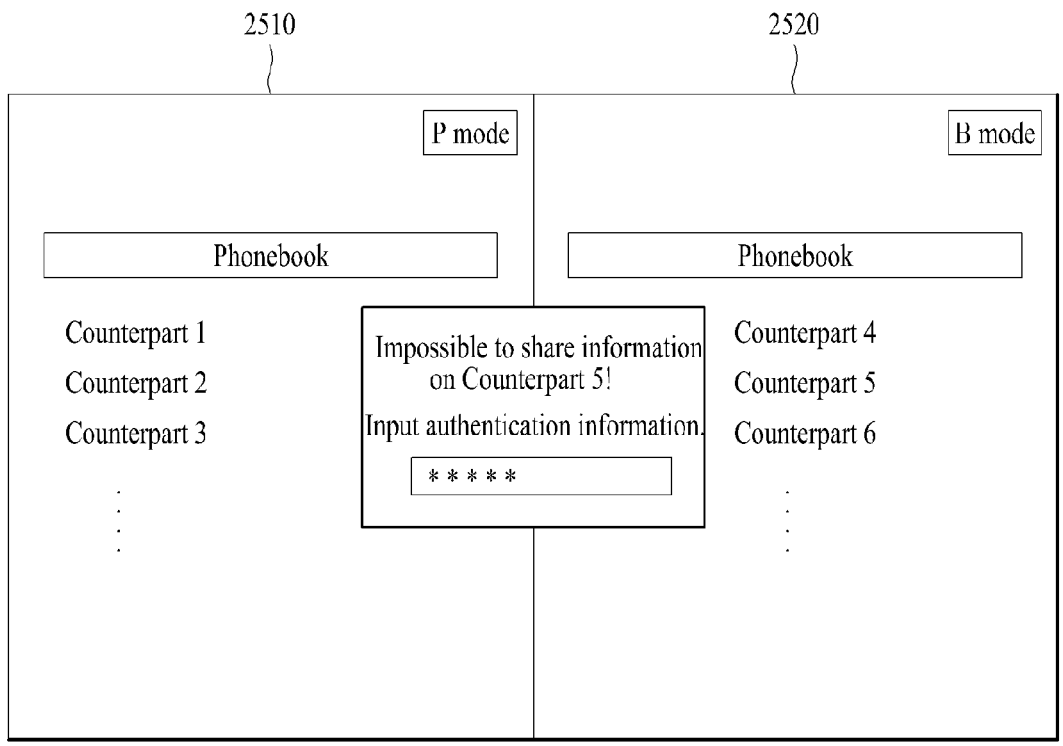
Figure 25C:
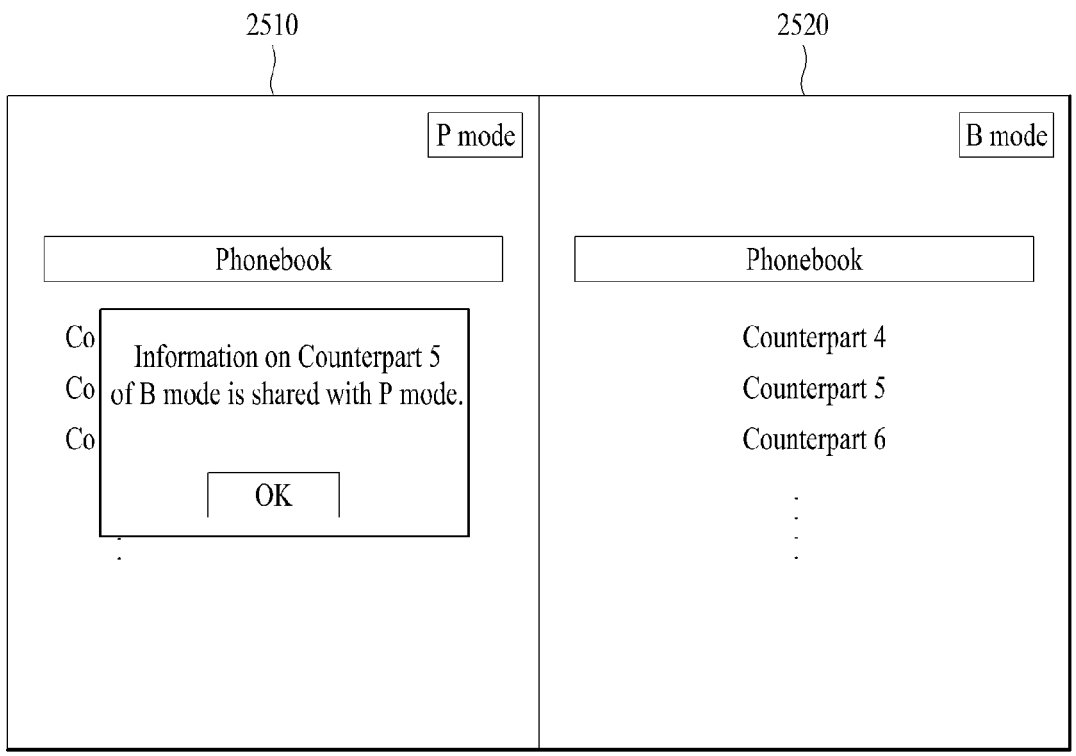
Figure 25C:
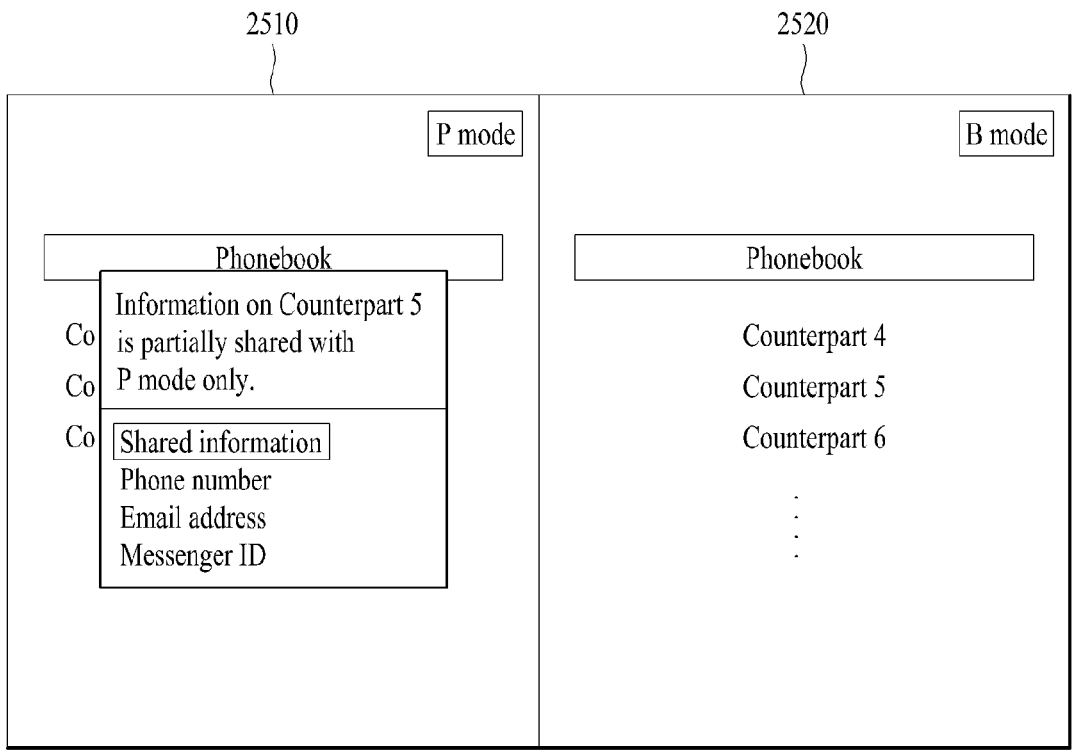

FIGS. 25A to 25C are diagrams for sharing a counterpart information when first and second applications are phonebook applications according to an embodiment of the present invention. Referring to FIG. 25A, the mobile terminal 100 runs a phonebook application in a private mode and also runs the phonebook application a business mode. The mobile terminal 100 displays a first counterpart information list on a private mode screen 2510 and can display a second counterpart information list on a business mode screen 2520. For instance, counterpart information stored in association with the private mode can be included in the first counterpart information list. In addition, counterpart information stored in association with the business mode can be included in the second counterpart information list.

Referring to FIG. 25B, when receiving an input of a touch & drag action from a specific counterpart information 2510 in the second counterpart information list to the private mode screen 2510 in FIG. 25A, the mobile terminal 100 determines a prescribed level and can then limitedly share the specific counterpart information 2510 in the private mode and the business mode in accordance with a result of the determination.

For instance, in at least one of the case that the specific counterpart information 2510 corresponds to the business mode, the case that a level of the specific counterpart information 2510 (or a phonebook application associated with the specific counterpart information 2510) is a sharing restriction level and the case that a level of the specific counterpart information 2510 (or a phonebook application associated with the specific counterpart information 2510) is higher than that of the private mode, the mobile terminal 100 can limitedly share the specific counterpart information 2510.

For instance, for the limited sharing, the mobile terminal 100 does not allow the sharing of the specific counterpart information 2510 itself (FIG. 25B(a)) or can share the specific counterpart information 2510 only if a valid authentication procedure is performed (FIG. 25B(b)). Moreover, even if the valid authentication procedure is performed, the mobile terminal 100 can share a partial information in the specific counterpart information 2510 only. Even if the valid authentication procedure is not performed, a content of the specific counterpart information 2510, of which security level is equal to or lower than a predetermined reference, can be shared.

Referring to FIG. 25C, as the specific counterpart information is shared in the private mode and the business mode, the mobile terminal 100 outputs information indicating that the specific counterpart information shared (FIG. 25C(a)) or can output information indicating a shared content (or an unshared content) among contents of the specific counterpart information (FIG. 25C(b)).

In particular, if a partial content of the specific counterpart information is shared only in FIG. 25C(b), the mobile terminal 100 can inform a user what kind of a prescribed item (e.g., a phone number, an email address, a messenger ID, etc.) is not shared or what kind of a prescribed item (e.g., a rank, an in-company phone number, a presence or non-presence of approval authority, etc.) is shared.

Moreover, when receiving an input of a touch & drag action from a specific counterpart information in the first counterpart information list to the business mode screen 2520 in FIG. 25A, the mobile terminal 100 can share the specific counterpart information in the private mode and the business mode. Occasionally, the mobile terminal 100 can share the specific counterpart information to correspond to a prescribed level (cf. the former descriptions with reference to FIGS. 25B and 25C).

When a first application and a second application are run in a private mode and a business mode, FIG. 26 to FIG. 28B show a case that a content or data associated with a currently running application is shared. For instance, when applications include a video play application, an audio play application and a TV application, the associated contents can include a video file, an audio file and a broadcast program.

For clarity and convenience of the following description, assume that a private information and a business information are displayed on a private mode screen and a business mode screen, respectively.

Figure 26:
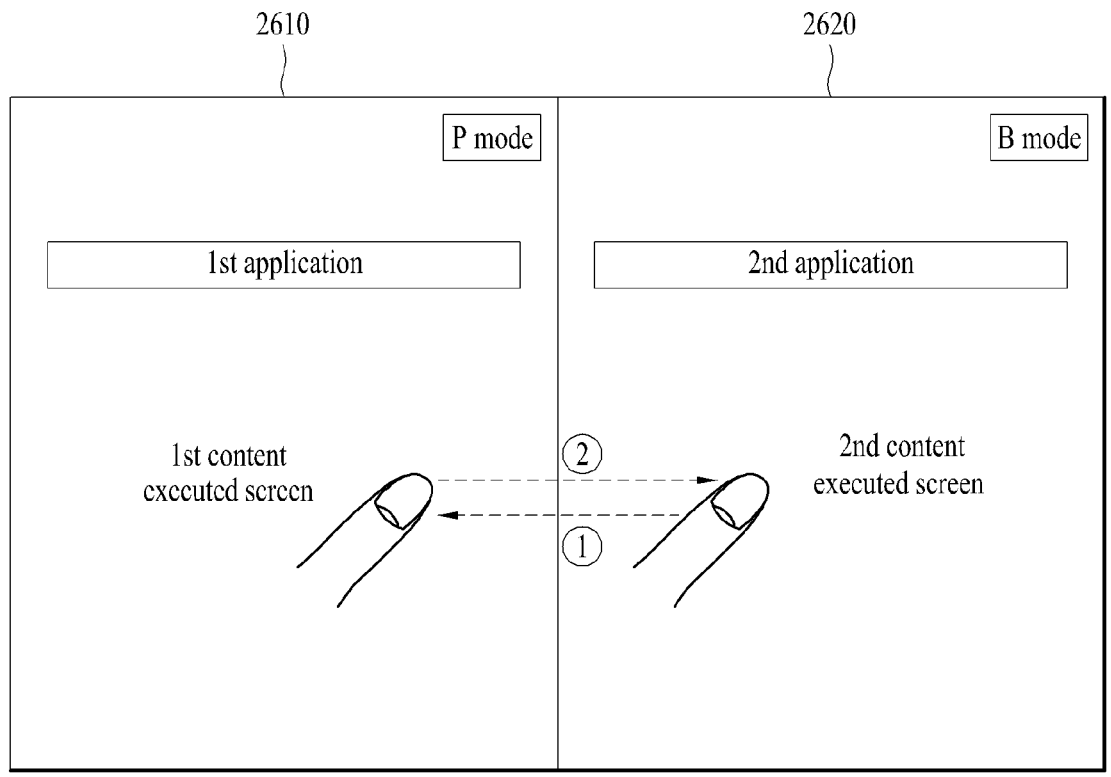
FIG. 26 is a diagram for receiving an input of a sharing command action in the course of running a first application and a second application according to an embodiment of the present invention.

FIG. 26 is a diagram for receiving an input of a sharing command action in the course of running a first application and a second application according to an embodiment of the present invention. Referring to FIG. 26, the mobile terminal 100 outputs a first content in accordance with a running of a first application on a private mode screen 2610 and is also able to output a second content in accordance with a running of a second application on a business mode screen 2620.

Figure 27A:
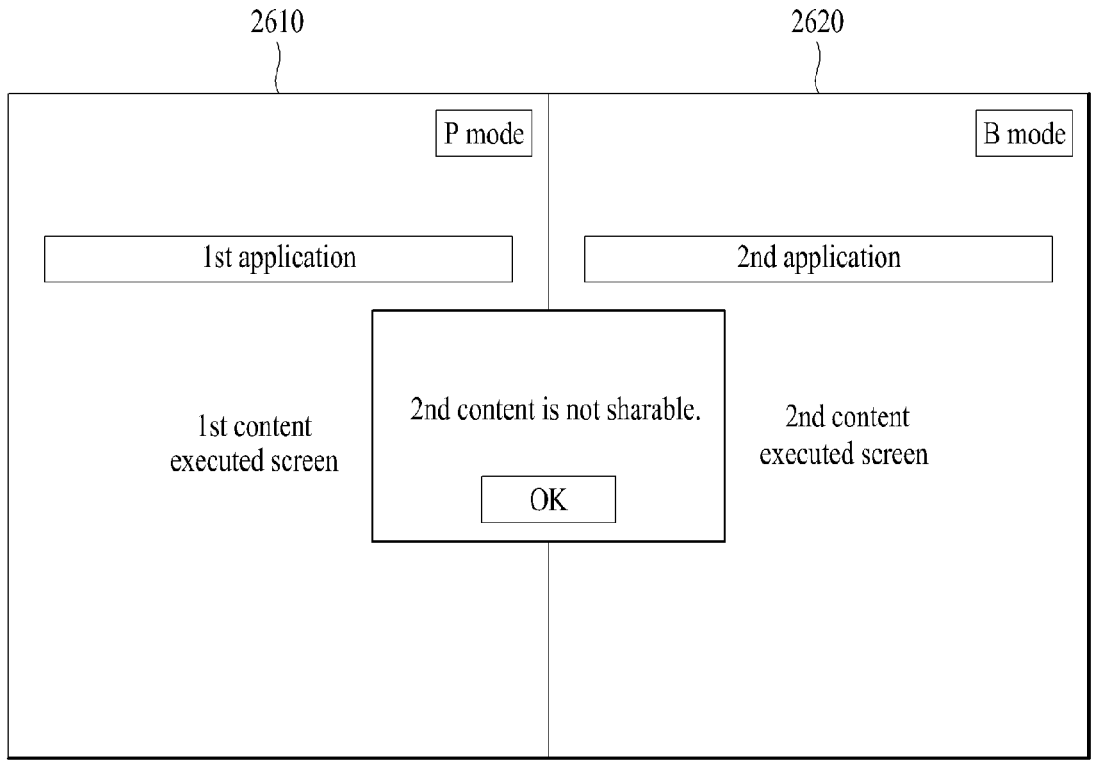
FIGS. 27A and 27B are diagrams for sharing a content according to an embodiment of the present invention.
Figure 27A:
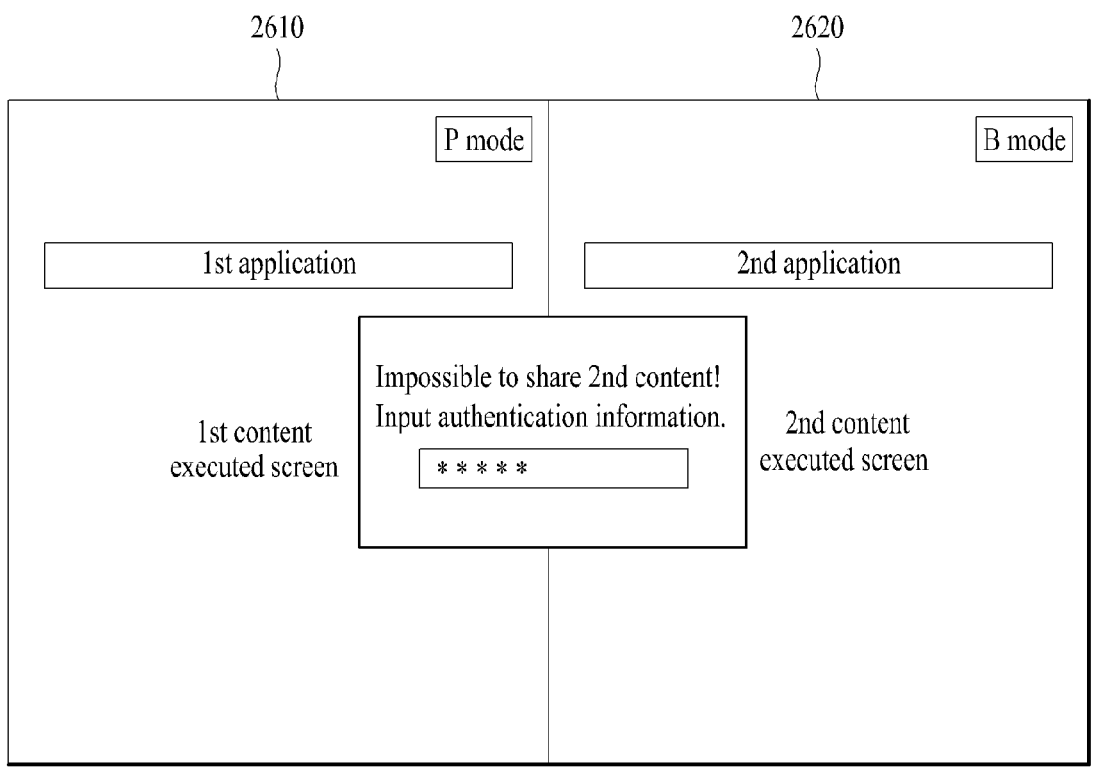
Figure 27B:
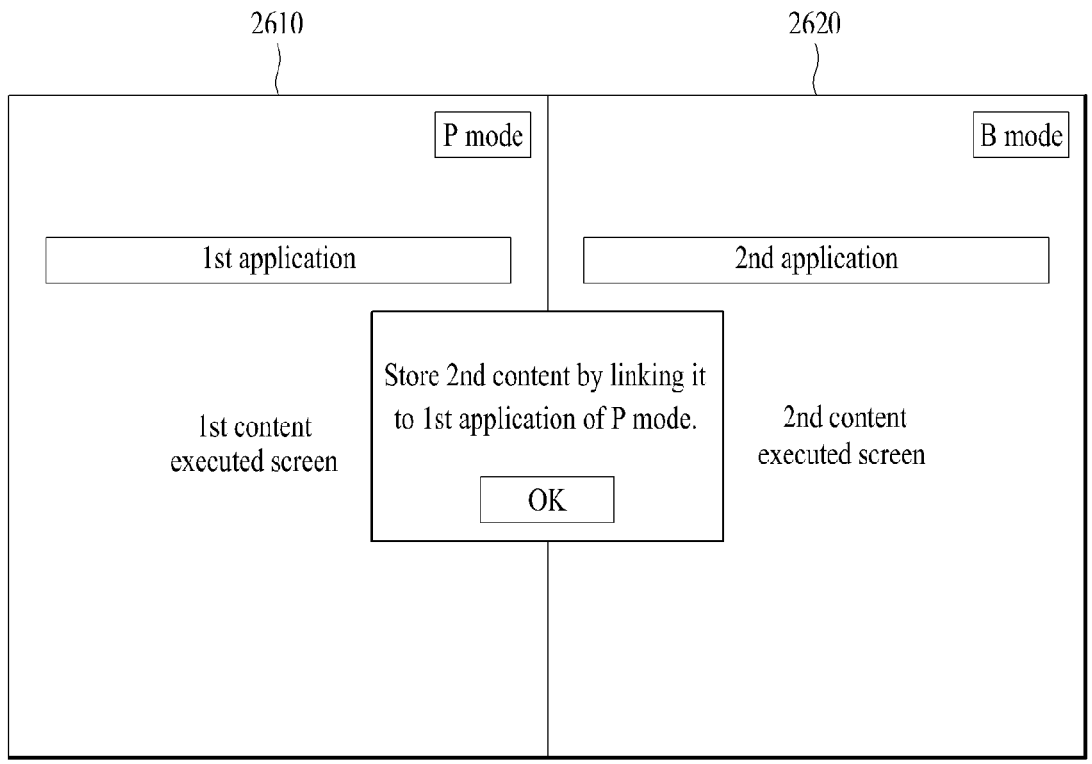
Figure 27B:
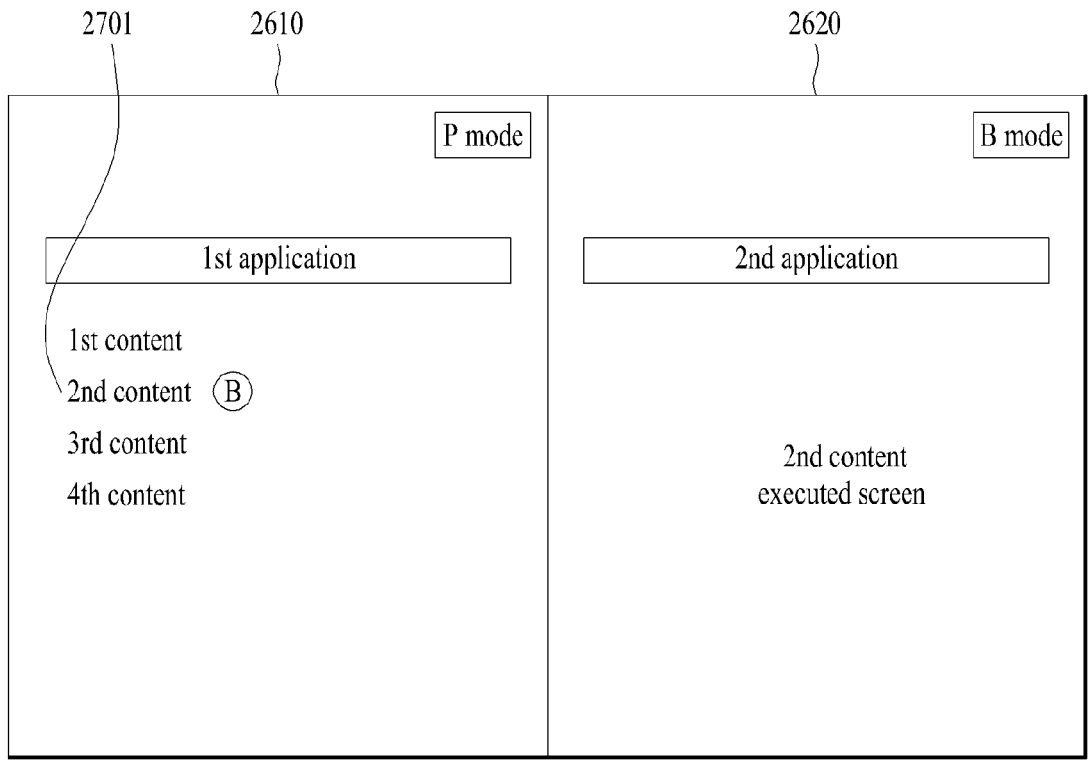

FIGS. 27A and 27B are diagrams for sharing a content according to an embodiment of the present invention. Referring to FIGS. 27A and 27B, when receiving an input of a touch & drag action as a sharing command action from the business mode screen 2620 to the private mode screen 2610, the mobile terminal 100 can limitedly share the second content, which is being displayed on the business mode screen 2620, in the private mode and the business mode to correspond to a prescribed level.

For instance, in accordance with the prescribed level, the mobile terminal 100 limitedly shares the second application itself in the private mode and the business mode or can share the second content related to the second application with the private mode.

In particular, as a result of the determination of the prescribed level, if a sharing of the second content is restricted in FIG. 27A, the mobile terminal 100 outputs information indicating that the second content is not sharable and does not share the second content (FIG. 27A(a)). Alternatively, the mobile terminal 100 can share the second content only if a valid authentication procedure is performed (FIG. 27A(b)).

For instance, in at least one of the case that the second content corresponds to the business mode, the case that a level of the second content is a sharing restriction level, and the case that a level of the second content is higher than that of the private mode, the mobile terminal 100 can determine that the sharing of the second content is restricted.

If the second content is shared in FIG. 27B, the mobile terminal 100 can store the second content in a manner of linking the second content to the first application of the private mode (FIG. 27B(a)). Therefore, the mobile terminal 100 can display the second content within the content list associated with the first application (e.g., identifiably display that this content is brought in the business mode_B) (FIG. 27B(b)). If the second content is selected from the content list, the mobile terminal 100 can output the second content within the private mode screen 2610.

Meanwhile, even if the second content is shared, a portion of the second content can be shared only to correspond to a prescribed level. For instance, it can share a portion of the second of which sharing is allowed, a portion of the second content except a part of which sharing is not allowed, a portion of the second content except a part on which a security level over a predetermined reference is set, a portion designated for a sharing approval by a user, a portion except a part designated as non-sharable by a user and the like.

Moreover, when receiving an input of a touch & drag action from the private mode screen 2610 to the business mode screen 2620 in FIG. 26 (②), the mobile terminal 100 can share the first content in the private mode and the business mode. Occasionally, the mobile terminal 100 can share the first content to correspond to a prescribed level (cf. the former descriptions with reference to FIGS. 27A and 27B).

Figure 28A:
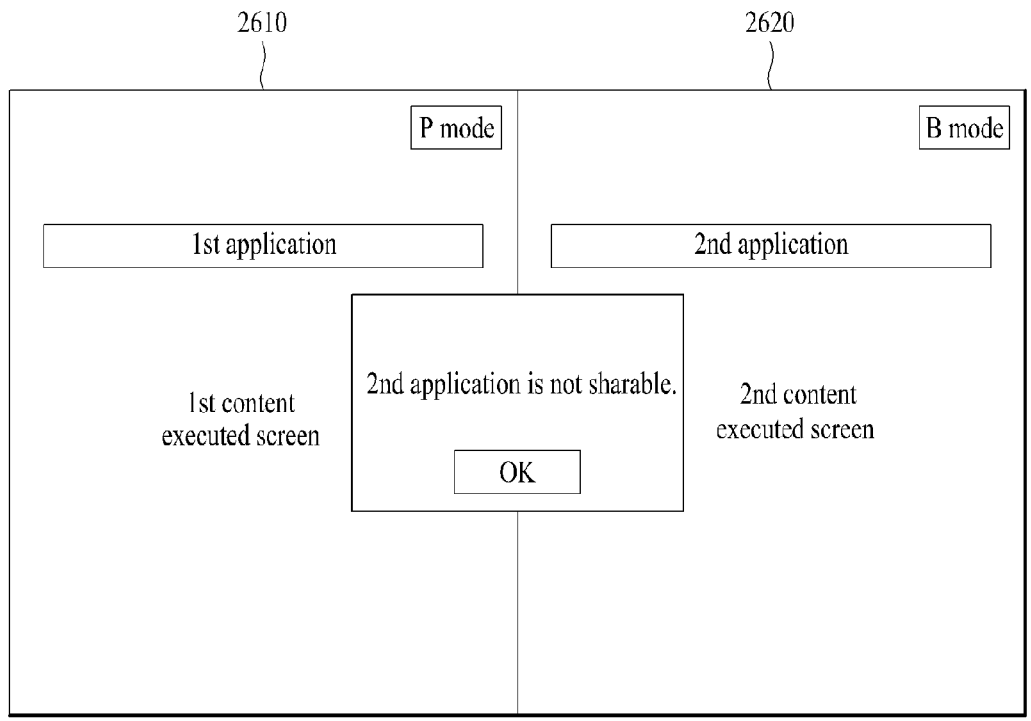
FIGS. 28A and 28B are diagrams for sharing an application according to an embodiment of the present invention.
Figure 28A:
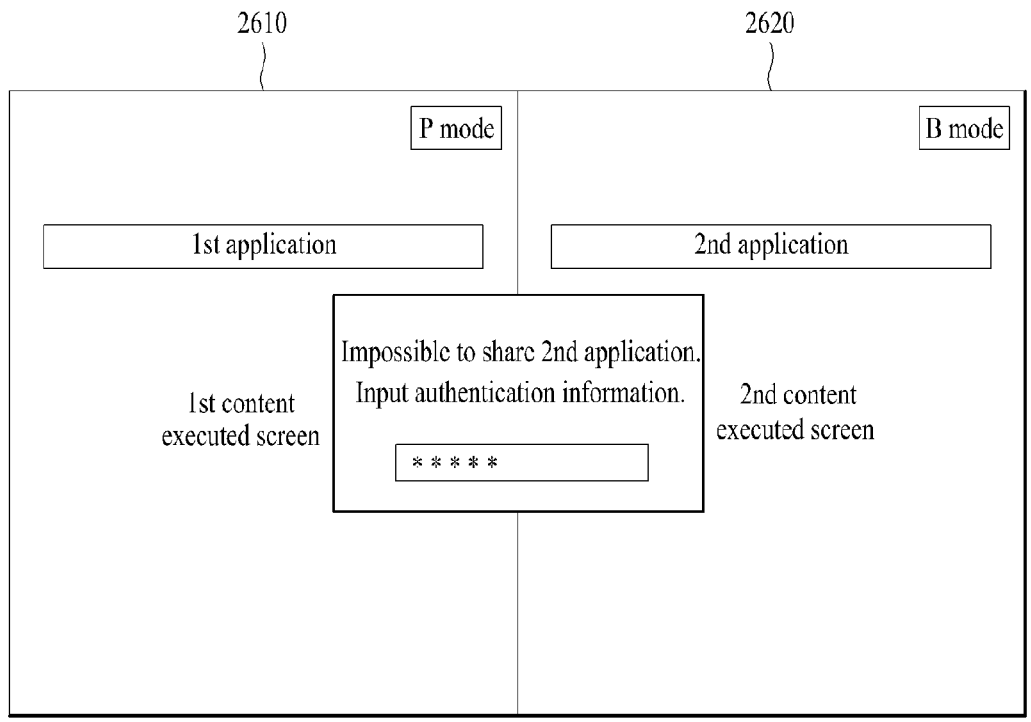
Figure 28B:
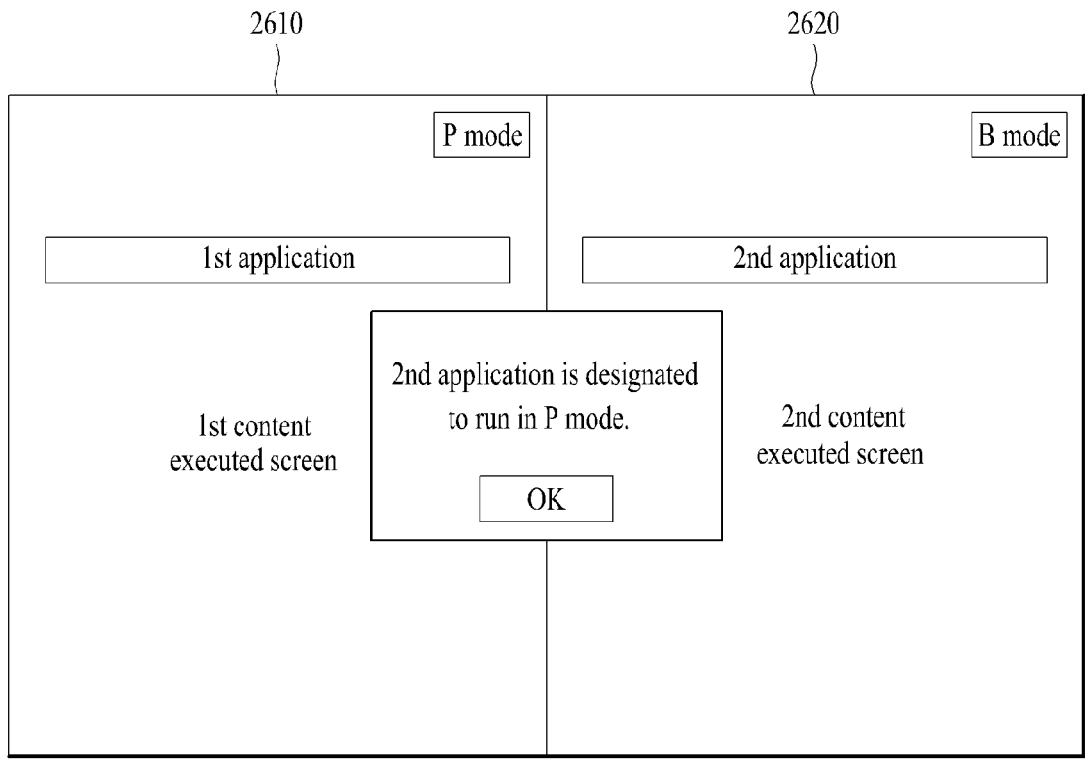
Figure 28B:
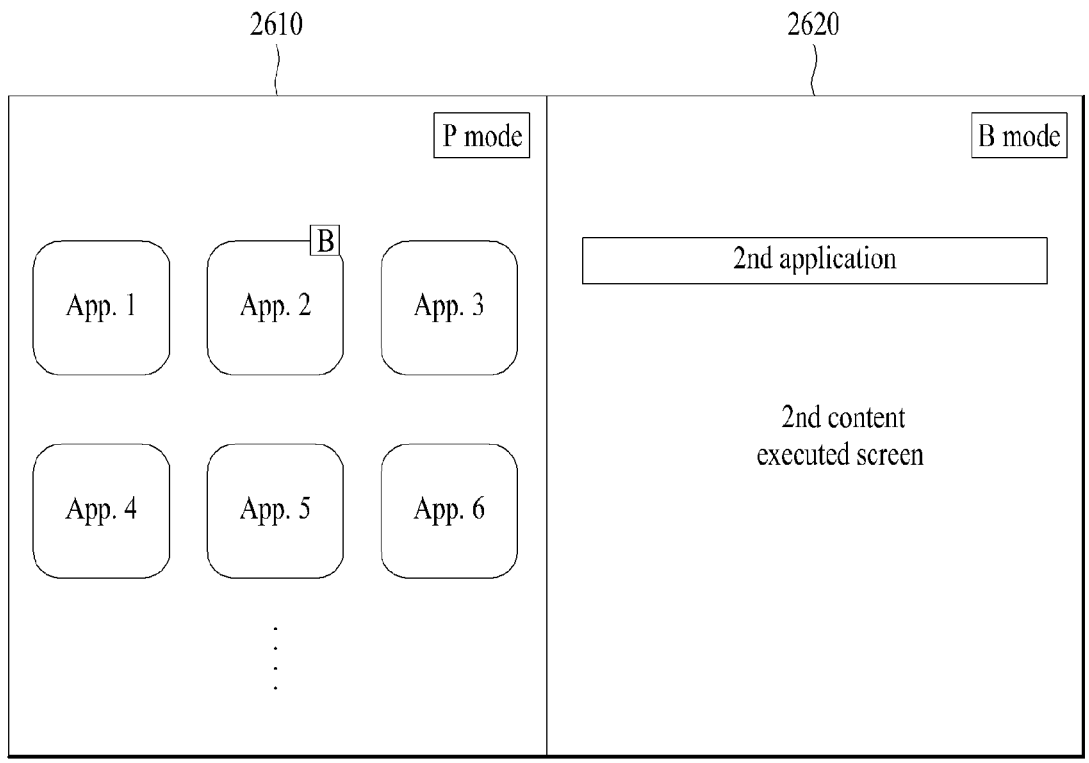

FIGS. 28A and 28B are diagrams for sharing an application according to an embodiment of the present invention. Referring to FIGS. 28A and 28B, when receiving an input of a touch & drag action as a sharing command action, the mobile terminal 100 can share the second application, which is running in the business mode, in the private mode and the business mode to correspond to a prescribed level. In this instance, it is not mandatory for the application to run in the private mode.

In particular, if a sharing of the second application is restricted as a result of the determination of the prescribed level in FIG. 28A, the mobile terminal 100 outputs information indicating that the second application is not sharable and does not share the second application (FIG. 28A(a)). Alternatively, the mobile terminal 100 can share the second application only if a valid authentication procedure is performed (FIG. 28A(b)).

For instance, in at least one of the case that the second application corresponds to the business mode, the case that a level of the second application is a sharing restriction level, and the case that a level of the second application is higher than that of the private mode, the mobile terminal 100 can determine that the sharing of the second application is restricted.

In FIG. 28B, if the mobile terminal 100 shares the second application, the mobile terminal 100 can designate the second application as an application executable in the private mode (FIG. 28B(a)). Therefore, the mobile terminal 100 can display an indicator 2801 of the second application on the home screen of the private mode. If the indicator 2801 of the second application is selected, the mobile terminal 100 can display a running state of the second application within the private mode screen 2610. In doing so, the indicator 2801 of the second application can identifiably indicate that the corresponding application is brought from the business mode.

Meanwhile, even if the second application is shared, some of functions of the second application can be shared to correspond to a prescribed level. For instance, the sharable partial function is determined in accordance with a level per function or a user selection.

Besides, when receiving an input of a touch & drag action from the private mode screen 2610 to the business mode screen 2620 in FIG. 26 (②), the mobile terminal 100 can share the first application in the private mode and the business mode. Occasionally, the mobile terminal 100 can share the first application to correspond to a prescribed level (cf. the former descriptions with reference to FIGS. 28A and 28B).

According to an embodiment of the present invention, while a first or second application is running in a private or business mode, the mobile terminal 100 can have a key (e.g., a key of a toggle type) for an application switching on a private or business mode screen. The mobile terminal 100 can then switch a current application to an application that is going to run by manipulating the key for the application switching.

For instance, when the key for the application switching, which is provided to the private mode screen (or the business mode screen), is manipulated, the mobile terminal 100 stops running the first application. Subsequently, the mobile terminal 100 runs another application, which is not the first application, among applications executable in the private mode (or the business mode) and then displays a corresponding running state of the corresponding application on the private mode screen (1). Alternatively, the mobile terminal 100 can display a running state of an application, which is associated with the first application among the applications executable in the business mode (or the private mode), on the private mode screen (2).

According to an embodiment of the present invention, while a first mode and a second mode are being implemented in different operating systems, respectively (e.g., multi-OS scheme), when receiving an input of a command for sharing a specific application corresponding to the first mode from a user, the mobile terminal 100 can output information indicating that the specific application is not sharable because the first and second modes are implemented in the different operating systems, respectively, under the control of the controller 180 (1). Alternatively, the mobile terminal 100 can output an address information (or a position information) on an application providing server of an application, which provides a function similar/identical to that of the specific application, as an application executable in the second mode under the control of the controller 180.

For instance, the command for sharing the specific application can be input by a touch & drag action from a region for displaying a first information to a region for displaying a second information. Moreover, the address information of the application can be displayed by linking to a corresponding URL and the like.

According to this disclosure, the modes mentioned therein can variously include a religion mode, a hobby mode, a school mode and the like per type in addition to a private mode and a business mode. In addition, a plurality of modes can be set for each type.

According to this disclosure, in determining an application running per mode, it can designate an application in accordance with a user selection. In addition, it is also able to automatically designate an application to a corresponding mode in consideration of a property and type of the corresponding application. For instance, assuming that a mode field exists in a data structure of an application, it can designate an application to a corresponding mode defined in the mode field.

According to this disclosure, in each of a plurality of modes, a user interface related to at least one of a voice based communication and a text based communication can be provided via the display unit 151 under the control of the controller 180. For instance, the voice based communication includes a voice call, a voice based chatting and the like. In another instance, the text based communication can include a message service, a text based chatting and the like. The user interface is displayed as a virtual key form on a touchscreen or can be provided as a button key form. In addition, the user interface provided in each of a plurality of modes can differ in position, shape, size and the like.

Although the mode screen sharing is mentioned in this disclosure, the above-mentioned embodiments is applicable to a sharing of content/data included in a currently displayed screen or a sharing of an application to which content/data included in a currently displayed screen corresponds as well as the mode screen sharing.

According to one embodiment of the present invention, the above-described information sharing method of the mobile terminal can be implemented in a program recorded medium as computer-readable codes. The computer-readable media include all kinds of recording devices in which data readable by a computer system are stored. The computer-readable media include ROM, RAM, CD-ROM, magnetic tapes, floppy discs, optical data storage devices, and the like for example and also include carrier-wave type implementations (e.g., transmission via Internet).

The aforementioned embodiments for the mobile terminal and information sharing method therein are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A mobile terminal, comprising:
    a communication unit configured to communicate with at least one other terminal;
    a memory configured to store at least first and second operating systems including at least first and second modes, respectively; and
    a controller configured to execute the first and second operating systems, to simultaneously display first and second information screens on a display unit of the mobile terminal corresponding to the first and second modes, to receive a sharing signal requesting information from one of the first and second information screens be shared with the other of the first and second information screens, and selectively share the requested information between the first and second information screens based on a predetermined criterion,
    wherein the display unit comprises a touch screen,
    wherein the controller is further configured to:
        display the first information screen on a main region of the touch screen and display at least one transceived event that occurred in the second mode on a sub-region of the touch screen, the main region being positioned on a first side of the touch screen and the sub region being positioned on a second side of the touch screen,
        gradually display at least a part of the second information screen according to a touch input applied on the sub-region, by moving the sub-region from the second side to the first side, so that the first information screen gradually disappears, and
        display at least one transceived event that occurred in the first mode on the sub-region together with the second information screen, while the sub-region is positioned on the first side, and the first information screen is not displayed,
    wherein the at least one transceived event that occurred in the second mode and the at least one transceived event that occurred in the first mode are events in which a user has not previously interacted with, and
    wherein the at least one transceived event that occurred in the second mode displayed in the sub-region disappears while the sub-region is moving.

2. The mobile terminal of claim 1, wherein the first mode is activated and the second mode is not activated, the first mode and the second mode are both activated, or the second mode is activated and the first mode is not activated when the sharing signal is received.

3. The mobile terminal of claim 1, wherein the controller is further configured to simultaneously execute the first and second operating systems or to first execute the first operating system and then execute the second operating system after receiving the switching signal.

4. The mobile terminal of claim 1, wherein the first and second modes are discriminated from each other by at least one of a mode indicator indicating the first or second modes, a database storage region storing information for the first and second modes, a user access authority for accessing the first and second modes, an application configuration for the first and second modes, a content configuration for the first and second modes, a data configuration for the first and second modes and an application for the first and second modes.

5. The mobile terminal of claim 1, wherein the predetermined criteria for sharing the requested information between the first and second information screens includes at least one of a restriction level of the requested information and a restriction level of the first and second modes.

6. The mobile terminal of claim 1, wherein the predetermined criteria for sharing the requested information between the first and second information screens includes a performed authentication procedure, and
    wherein the controller is further configured to selectively share the requested information between the first and second information screens by not allowing the requested information be shared between the first and second information screens, by sharing partial information of the requested information between the first and second information screens, or by sharing all of the requested information between the first and second information screens based on a result of the authentication procedure.

7. The mobile terminal of claim 1, wherein the sharing signal is received when at least one of a command for sharing the requested information is input on the mobile terminal, and the requested information needs to be stored and managed in common with the first and second modes.

8. The mobile terminal of claim 1, wherein the requested information to be shared between the first and second information screens includes information related to a first application executable in the first mode and information related to a second application executable in the second mode.

9. The mobile terminal of claim 8, wherein the controller is further configured to control the display unit to automatically share the requested information when the first and second applications are common applications to both the first and second modes or when the first and second applications have at least one similar or identical function.

10. The mobile terminal of claim 1, wherein the request for sharing the requested information between the first and second information screens corresponds to a copy and paste operation or a cut and paste operation between the first and second information screens.

11. A method of controlling a mobile terminal, the method comprising:
    allowing, via a communication unit of the mobile terminal, with at least one other terminal;
    storing, in a memory of the mobile terminal, at least first and second operating systems including at least first and second modes, respectively;

executing, via a controller of the mobile terminal, the first and second operating systems;
simultaneously displaying, via a display unit of the mobile terminal, first and second information screens corresponding to the first and second modes;
receiving, via the controller, a sharing signal requesting information from one of the first and second information screens be shared with the other of the first and second information screens; and
selectively sharing, via the controller controlling the display unit, the requested information between the first and second information screens based on a predetermined criterion,
wherein the display unit comprises a touch screen,
wherein the method further comprises:
displaying the first information screen on a main region of the touch screen and displaying at least one transceived event that occurred in the second mode on a sub-region of the touch screen, the main region being positioned on a first side of the touch screen and the sub region being positioned on a second side of the touch screen,
gradually displaying at least a part of the second information screen according to a touch input applied on the sub-region, by moving the sub-region from the second side to the first side, so that the first information screen gradually disappears, and
displaying at least one transceived event that occurred in the first mode on the sub-region, while the sub-region together with second information screen, is positioned on the first side, and the first information screen is not displayed,
wherein the at least one transceived event that occurred in the second mode and the at least one transceived event that occurred in the first mode are events in which a user has not previously interacted with, and
wherein the at least one transceived event that occurred in the second mode displayed in the sub region disappears while the sub-region is moving.

12. The method of claim 11, wherein the first mode is activated and the second mode is not activated, the first mode and the second mode are both activated, or the second mode is activated and the first mode is not activated when the sharing signal is received.

13. The method of claim 11, wherein the simultaneously executing step simultaneously executes the first and second operating systems, or first executes the first operating system and then executes the second operating system after receiving the switching signal.

14. The method of claim 11, wherein the first and second modes are discriminated from each other by at least one of a mode indicator indicating the first or second modes, a database storage region storing information for the first and second modes, a user access authority for accessing the first and second modes, an application configuration for the first and second modes, a content configuration for the first and second modes, a data configuration for the first and second modes and an application for the first and second modes.

15. The method of claim 11, wherein the predetermined criteria for sharing the requested information between the first and second information screens includes at least one of a restriction level of the requested information and a restriction level of the first and second modes.

16. The method of claim 11, wherein the predetermined criteria for sharing the requested information between the first and second information screens includes a performed authentication procedure, and
wherein the selectively sharing step selectively shares the requested information between the first and second information screens by not allowing the requested information be shared between the first and second information screens, by sharing partial information of the requested information between the first and second information screens, or by sharing all of the requested information between the first and second information screens based on a result of the authentication procedure.

17. The method of claim 11, wherein the sharing signal is received when at least one of a command for sharing the requested information is input on the mobile terminal, and the requested information needs to be stored and managed in common with the first and second modes.

18. The method of claim 11, wherein the requested information to be shared between the first and second information screens includes information related to a first application executable in the first mode and information related to a second application executable in the second mode.

19. The method of claim 18, wherein the selectively sharing step comprises automatically sharing the requested information when the first and second applications are common applications to both the first and second modes or when the first and second applications have at least one similar or identical function.

20. The method of claim 11, wherein the request for sharing the requested information between the first and second information screens corresponds to a copy and paste operation or a cut and paste operation between the first and second information screens.

* * * * *